US 9,918,021 B2

(12) United States Patent
Tsuchiya et al.

(10) Patent No.: US 9,918,021 B2
(45) Date of Patent: Mar. 13, 2018

(54) IMAGE PROCESSING DEVICE THAT CHANGES EXTENT OF IMAGE ALTERING BY FIRST AND SECOND IMAGE PROCESSING

(71) Applicant: NIKON CORPORATION, Tokyo (JP)

(72) Inventors: Satoshi Tsuchiya, Kawasaki (JP); Koichi Abe, Tokyo (JP); Kaoru Yoshino, Tokyo (JP); Yukio Kubota, Tsurugashima (JP)

(73) Assignee: NIKON CORPORATION, Tokyo (JP)

( * ) Notice: Subject to any disclaimer, the term of this patent is extended or adjusted under 35 U.S.C. 154(b) by 15 days.

(21) Appl. No.: 14/913,609

(22) PCT Filed: Aug. 28, 2014

(86) PCT No.: PCT/JP2014/072612
§ 371 (c)(1),
(2) Date: Apr. 28, 2016

(87) PCT Pub. No.: WO2015/030126
PCT Pub. Date: Mar. 5, 2015

(65) Prior Publication Data
US 2016/0286139 A1    Sep. 29, 2016

(30) Foreign Application Priority Data

Aug. 30, 2013  (JP) .................................. 2013-179597
Nov. 28, 2013  (JP) .................................. 2013-246539
(Continued)

(51) Int. Cl.
*H04N 5/262*    (2006.01)
*G06F 3/0488*    (2013.01)
(Continued)

(52) U.S. Cl.
CPC ........... *H04N 5/2621* (2013.01); *G03B 17/18* (2013.01); *G06F 3/0362* (2013.01);
(Continued)

(58) Field of Classification Search
CPC ............. H04N 5/2621; H04N 5/23222; H04N 5/23293; H04N 5/23216; G06F 3/04842; G06F 3/0362; G06F 3/0488; G03B 17/18
See application file for complete search history.

(56) References Cited

U.S. PATENT DOCUMENTS 8,214,766 B1    7/2012  Berger et al.
8,401,284 B2*   3/2013  Pettigrew ................. H04N 1/62
                                                        382/162
(Continued)

FOREIGN PATENT DOCUMENTS

CN    1720549 A     1/2006
JP    H07-30792 A   1/1995
(Continued)

OTHER PUBLICATIONS

Dec. 21, 2016 Extended European Search Report issued in Patent Application No. 14841208.3.
(Continued)

*Primary Examiner* — Padma Haliyur
(74) *Attorney, Agent, or Firm* — Oliff PLC

(57) ABSTRACT

An image processing device includes: an image processing unit that alters an image by executing first image processing and second image processing on the image; and a processing change unit that changes an extent to which the image is altered through the first image processing and an extent to which the image is altered through the second image processing. The processing change unit raises the extent to which the image is altered through the second image processing when the extent to which the image is altered through the first image processing is lowered.

17 Claims, 52 Drawing Sheets

(30) Foreign Application Priority Data

Nov. 28, 2013 (JP) .................................. 2013-246540
Nov. 28, 2013 (JP) .................................. 2013-246541

(51) Int. Cl.
| | | |
|---|---|---|
| *G03B 17/18* | (2006.01) | |
| *G06F 3/0362* | (2013.01) | |
| *H04N 5/232* | (2006.01) | |
| *G06F 3/0484* | (2013.01) | |

(52) U.S. Cl.
CPC ........ *G06F 3/0488* (2013.01); *G06F 3/04842* (2013.01); *H04N 5/23216* (2013.01); *H04N 5/23222* (2013.01); *H04N 5/23293* (2013.01)

(56) References Cited

U.S. PATENT DOCUMENTS

| | | |
|---|---|---|
| 2006/0139462 A1 | 6/2006 | Fukasawa et al. |
| 2007/0250785 A1 | 10/2007 | Nakamura et al. |
| 2009/0319897 A1 | 12/2009 | Kotler et al. |
| 2010/0177218 A1 | 7/2010 | Ohuchi |
| 2011/0019058 A1 | 1/2011 | Sakai et al. |

FOREIGN PATENT DOCUMENTS

| | | |
|---|---|---|
| JP | 2007-287089 A | 11/2007 |
| JP | 2010-074478 A | 4/2010 |
| JP | 2012-124608 A | 6/2012 |
| JP | 2012-199836 A | 10/2012 |
| JP | 2013-115673 A | 6/2013 |
| WO | 2004/070657 A1 | 8/2004 |

OTHER PUBLICATIONS

Jun. 22, 2017 Office Action issued in Chinese Patent Application No. 201480060062.X.
Dec. 9, 2014 Search Report issued in International Patent Application No. PCT/JP2014/072612.
Oct. 10, 2017 Office Action Issued in Japanese Application No. 2013-179597.
ecember 26, 2017 Office Action issued in Japanese Patent Application No. 2013-179597. X.

\* cited by examiner

FIG.11
(a) 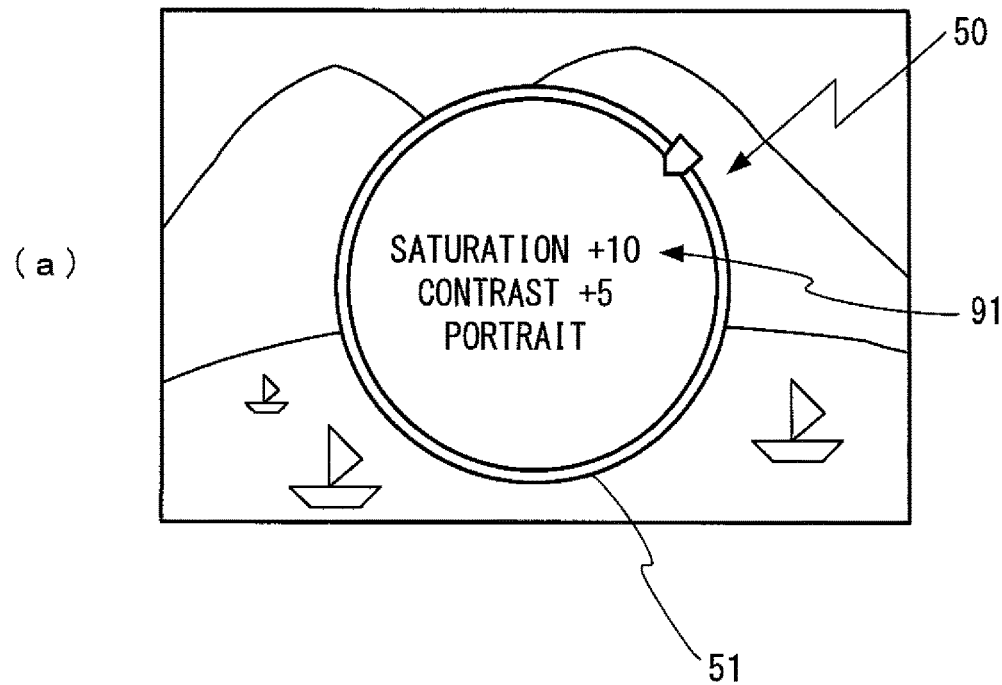
(b) 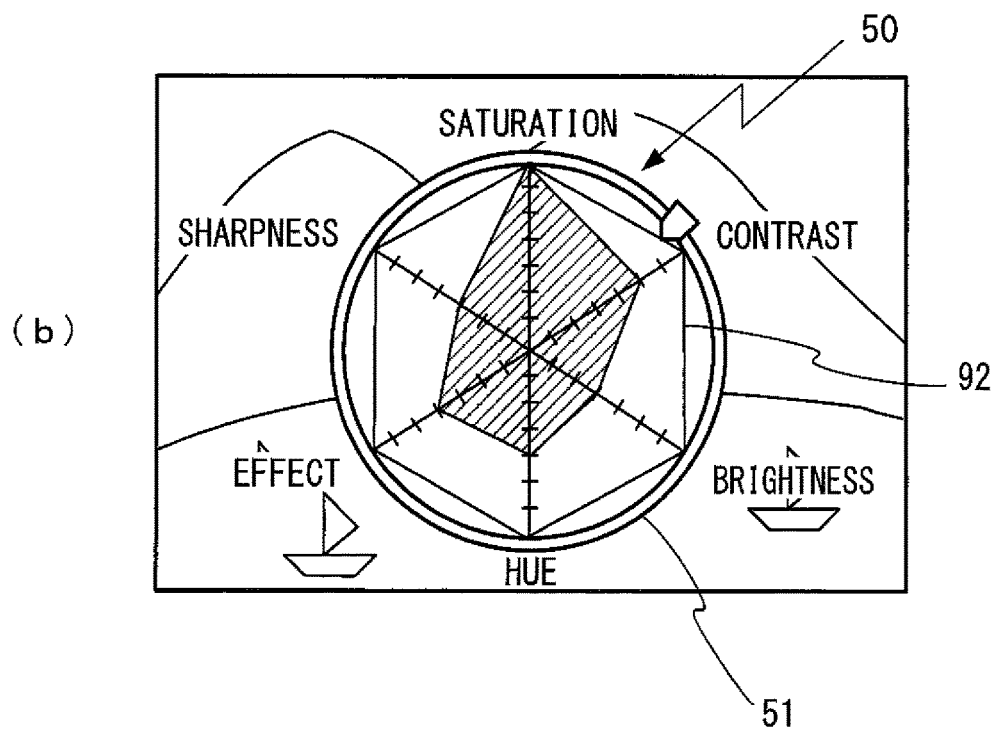

FIG.12
(a) 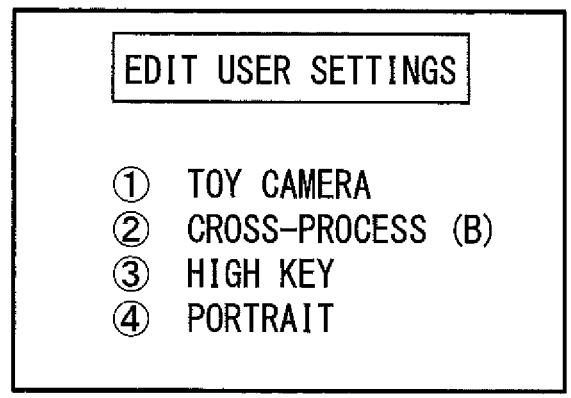
(b) 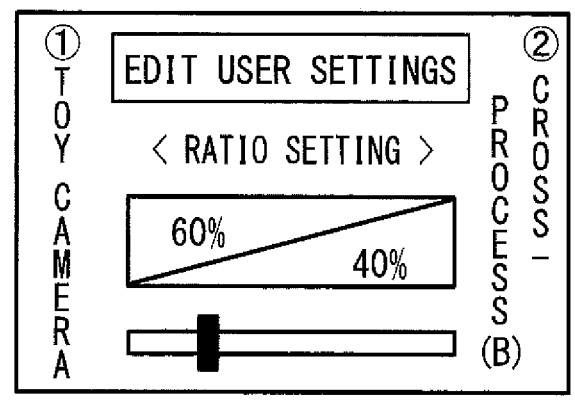
(c) 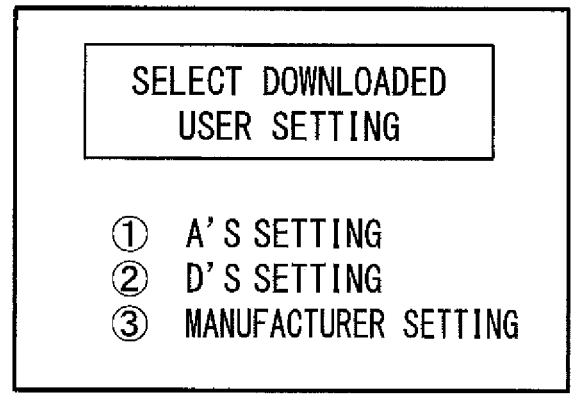

FIG. 17

| CURSOR POSITION IN RING IMAGE | IMAGE PROCESSING ON CAPTURED IMAGE | DIAL IMAGE FUNCTION |
|---|---|---|
| 0TH POSITION | INITIAL IMAGE | PHOTOGRAPHIC SETTING (BRIGHTNESS SETTING OR FOCUS POSITION SETTING) |
| FIRST POSITION | FIRST IMAGE PROCESSING | SWITCH IMAGE PROCESSING SET AS FIRST IMAGE PROCESSING |
| SECOND POSITION THROUGH 16TH POSITION | FIRST IMAGE PROCESSING/ SECOND IMAGE PROCESSING | ALTER MANNER WITH WHICH RATIOS FOR FIRST IMAGE PROCESSING AND SECOND IMAGE PROCESSING ARE ADJUSTED |
| 17TH POSITION | SECOND IMAGE PROCESSING | SWITCH IMAGE PROCESSING SET AS SECOND IMAGE PROCESSING |
| 18TH POSITION THROUGH 32ND POSITION | SECOND IMAGE PROCESSING/ THIRD IMAGE PROCESSING | ALTER MANNER WITH WHICH RATIOS FOR SECOND IMAGE PROCESSING AND THIRD IMAGE PROCESSING ARE ADJUSTED |
| 33RD POSITION | THIRD IMAGE PROCESSING | SWITCH IMAGE PROCESSING SET AS THIRD IMAGE PROCESSING |
| 34TH POSITION THROUGH 48TH POSITION | THIRD IMAGE PROCESSING/ FOURTH IMAGE PROCESSING | ALTER MANNER WITH WHICH RATIOS FOR THIRD IMAGE PROCESSING AND FOURTH IMAGE PROCESSING ARE ADJUSTED |
| 49TH POSITION | FOURTH IMAGE PROCESSING | SWITCH IMAGE PROCESSING SET AS FOURTH IMAGE PROCESSING |
| 50TH POSITION THROUGH 64TH POSITION | FOURTH IMAGE PROCESSING/ FIRST IMAGE PROCESSING | ALTER MANNER WITH WHICH RATIOS FOR FOURTH IMAGE PROCESSING AND FIRST IMAGE PROCESSING ARE ADJUSTED |
| 65TH POSITION | FIRST IMAGE PROCESSING | SWITCH IMAGE PROCESSING SET AS FIRST IMAGE PROCESSING |

FIG.42
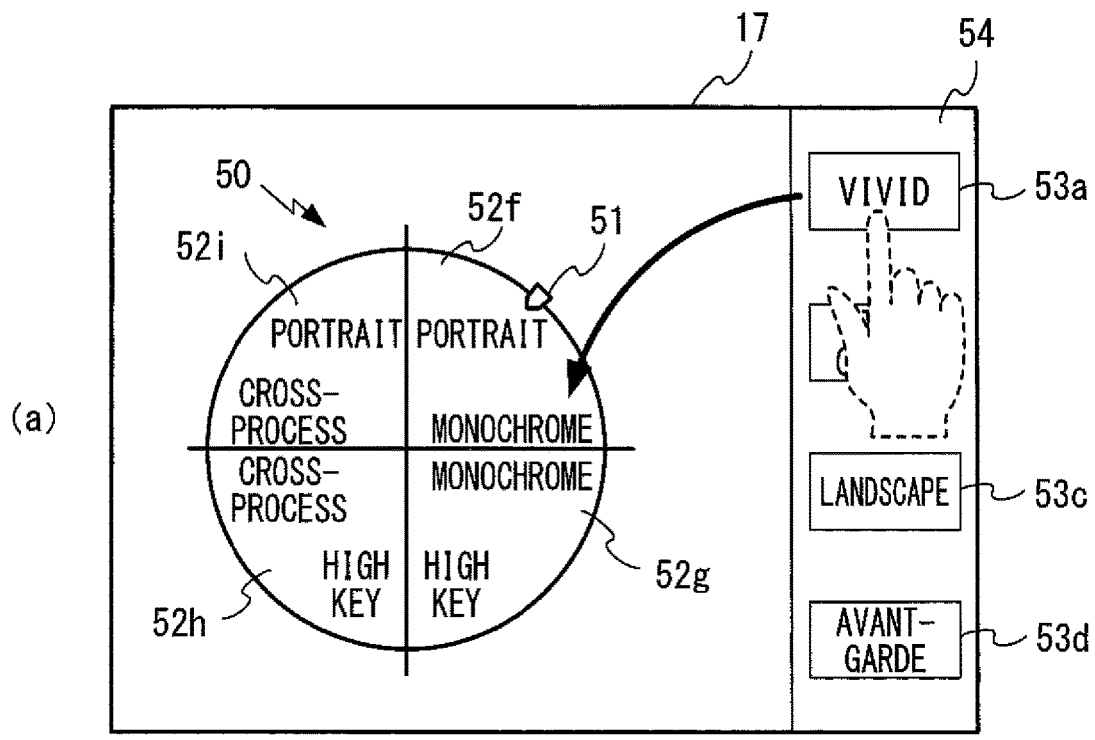
(a)
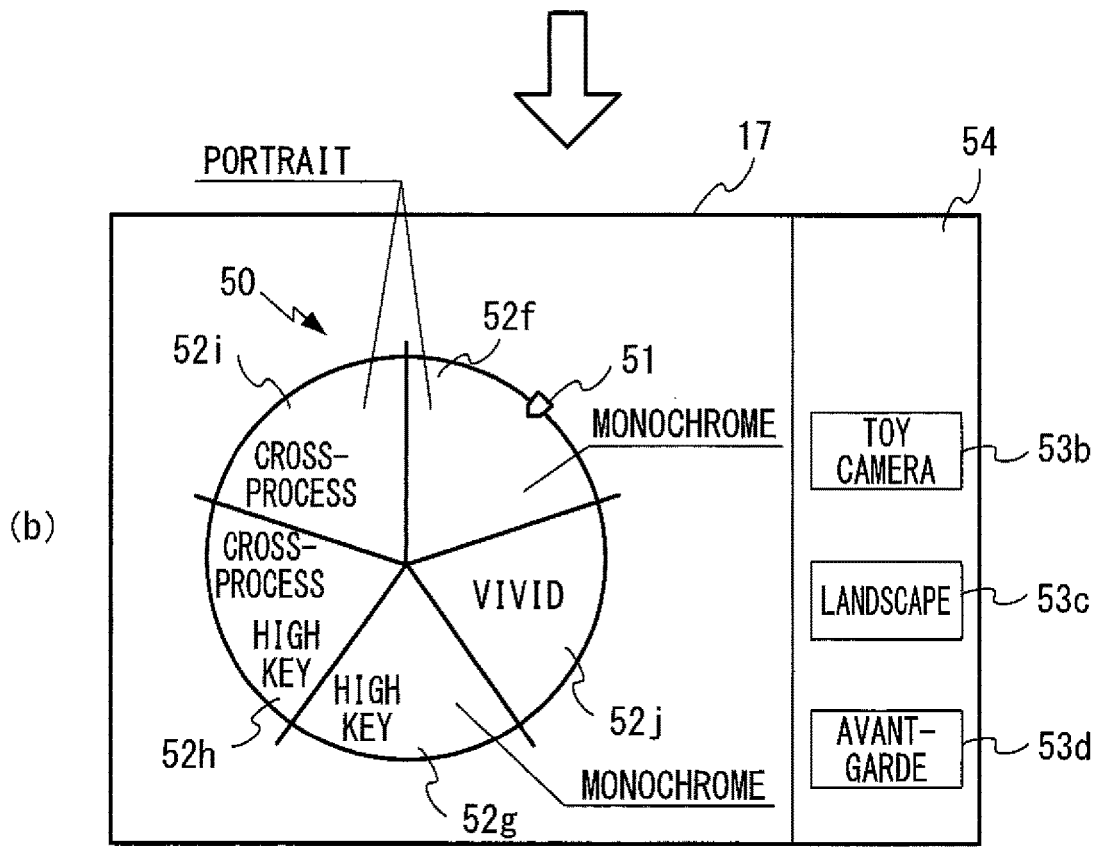
(b)

FIG.43
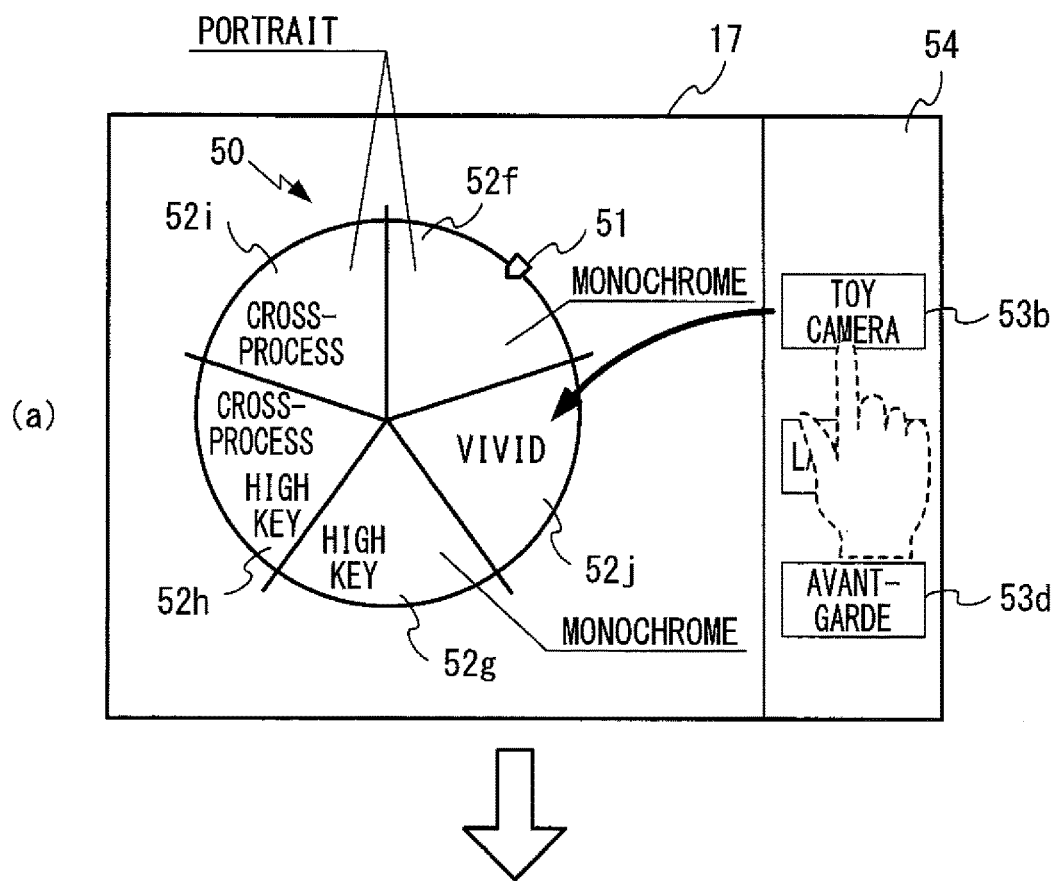
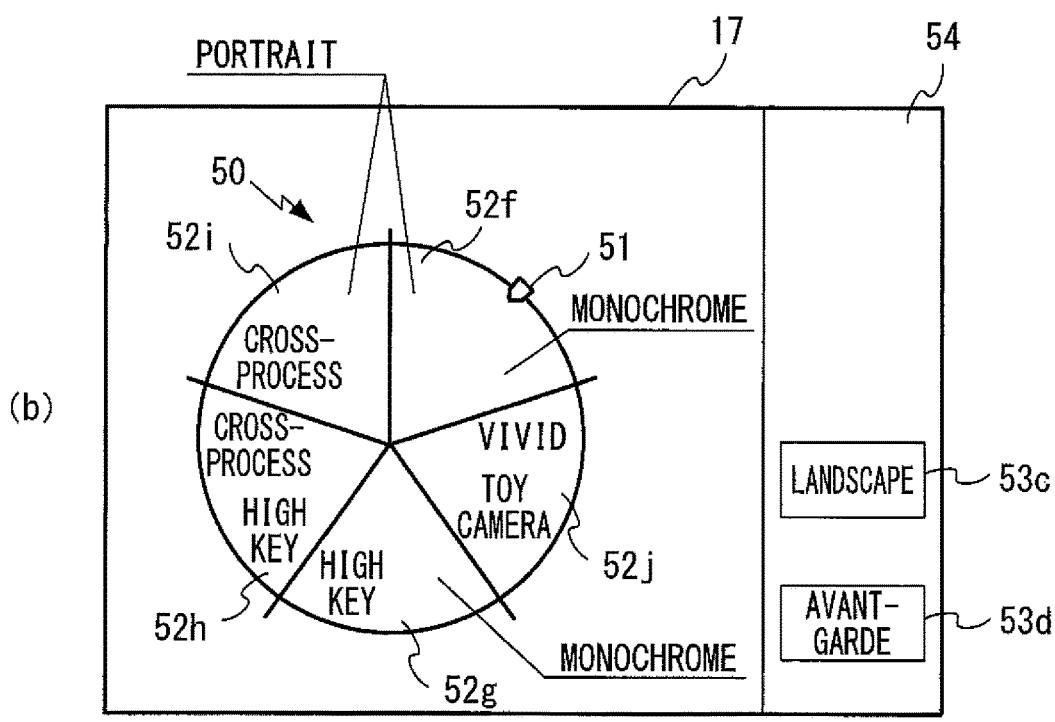

FIG.49
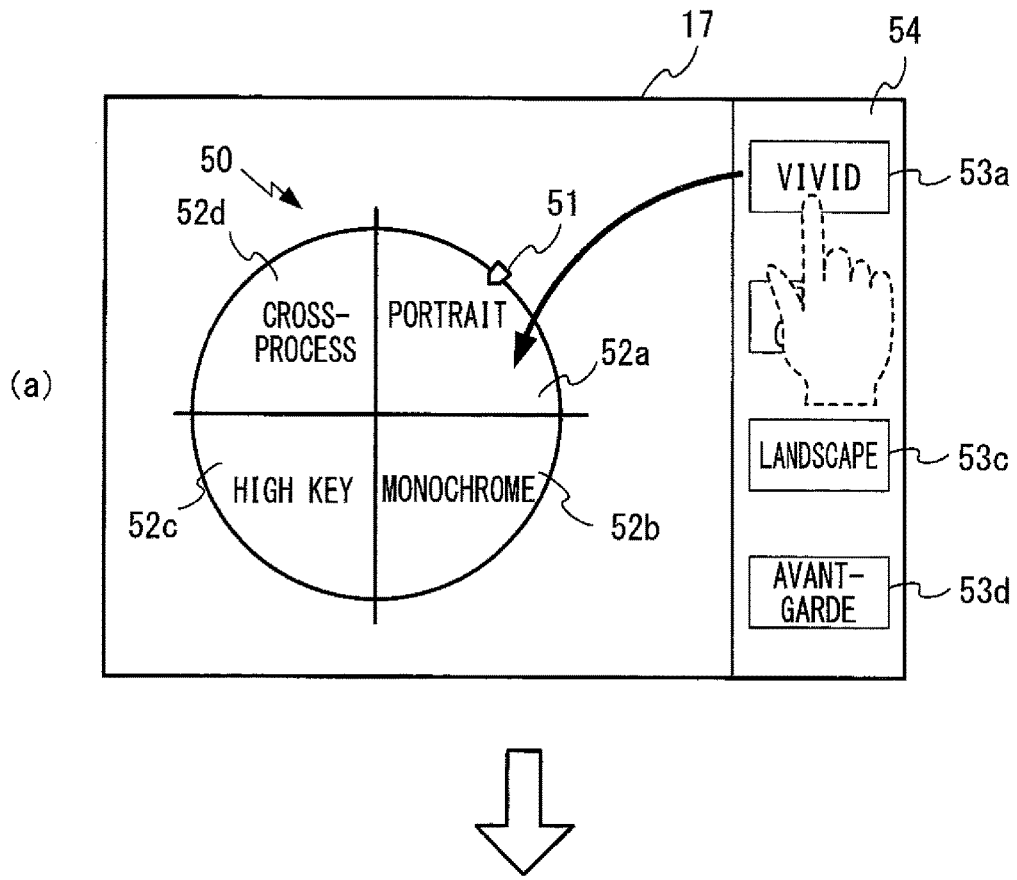
(a)
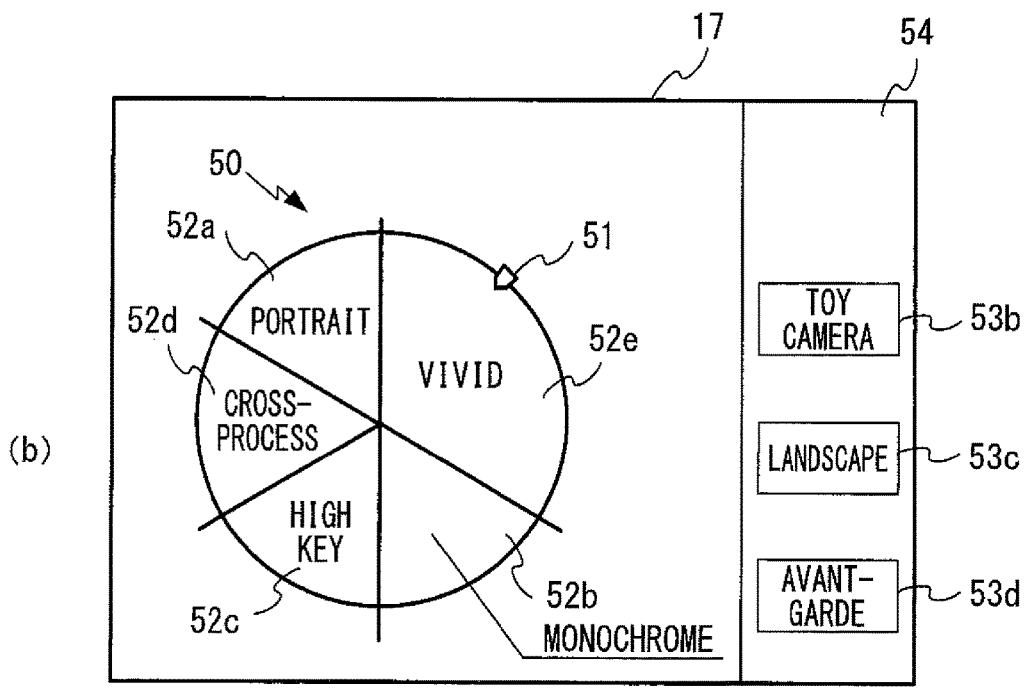
(b)

IMAGE PROCESSING DEVICE THAT CHANGES EXTENT OF IMAGE ALTERING BY FIRST AND SECOND IMAGE PROCESSING

TECHNICAL FIELD

The present invention relates to an image processing device and an image processing program.

BACKGROUND ART

There is a digital camera known in the related art that displays a list of options indicating image effects so as to allow the user to select from a plurality of image effects from a menu in which the user is able to select at least one image effect to be applied among a plurality of image effects available therein (see PTL 1).

In addition, a digital camera in the known art displays both an effects menu for selection of image effects to be applied and a slide menu for adjusting the effect level for a selected image effect (see PTL 1).

CITATION LIST

Patent Literature

PTL 1: Japanese Laid Open Patent Publication No. 2012-124608

SUMMARY OF INVENTION

Technical Problem

The technologies in the related art, as exemplified in PTL 1, require the user to be knowledgeable with regard to the details of a plurality of types of image processing in order to be able to select the optimal image processing for a given photographic scene among the plurality of types of image processing, and a novice user may find the prospect of having to select the right type of image processing for each photographic scene rather daunting.

In other words, the process of image processing setting is bound to be difficult for such a user.

Solution to Problem

An image processing device according to a first aspect of the present invention is preferred to include an image processing unit that alters an image by executing first image processing and second image processing on the image; and a processing change unit that changes an extent to which the image is altered through the first image processing and an extent to which the image is altered through the second image processing. The processing change unit may raise the extent to which the image is altered through the second image processing when the extent to which the image is altered through the first image processing is lowered.

BRIEF DESCRIPTION OF THE DRAWINGS

FIG. 11 Examples of display screens that may be brought up in variation 5

FIG. 12 Examples of display screens that may be brought up in variation 6

FIG. 49 Illustration showing how a setting area is added in variation 2

DESCRIPTION OF EMBODIMENTS

The following is a description of embodiments of the present invention given in reference to drawings.

(First Embodiment)

Figure 1:
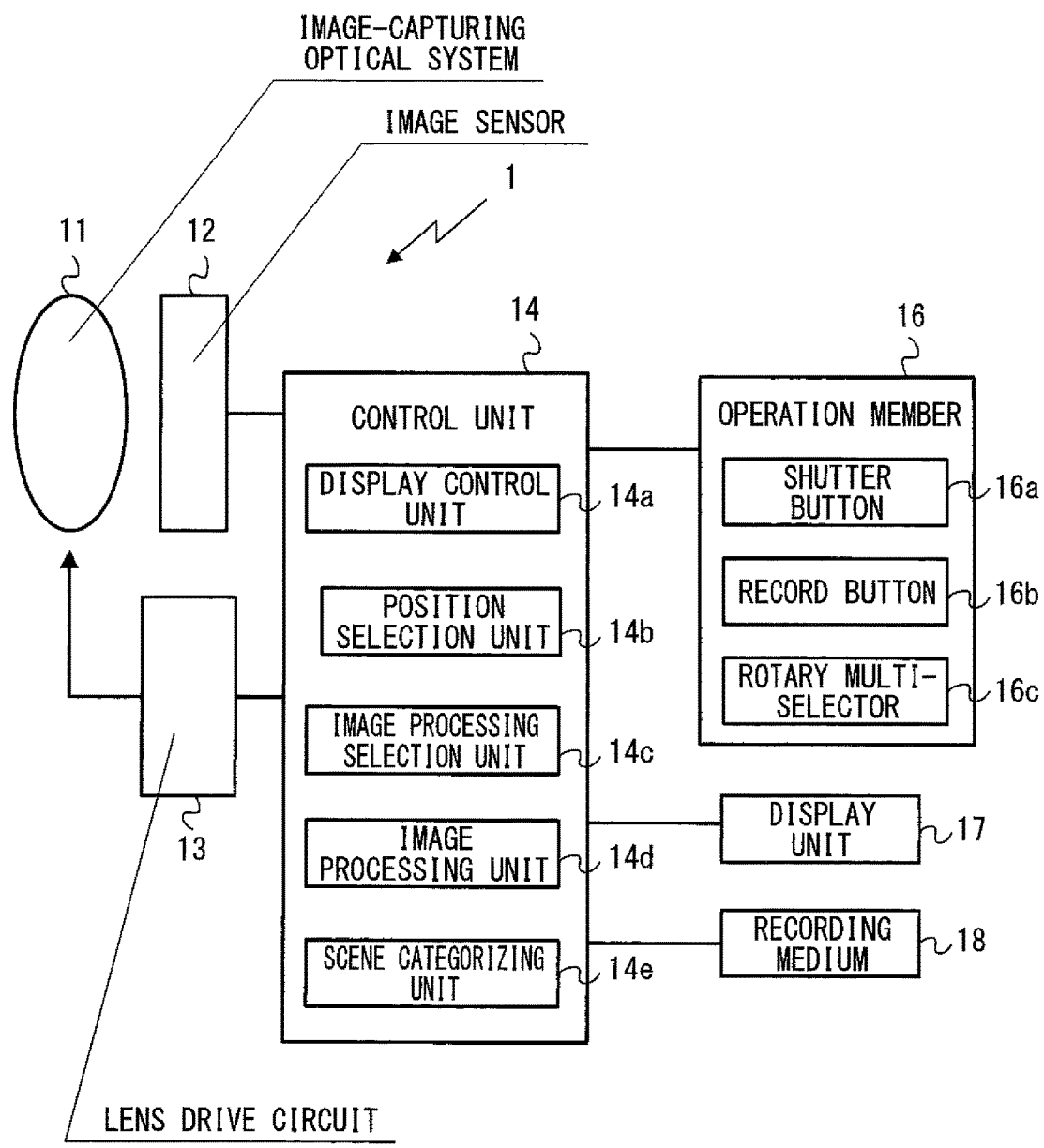
FIG. 1 A block diagram presenting an example of a structure that may be adopted in the digital camera achieved in a first embodiment of the present invention FIG. 2 An example of a display screen FIG. 3 A diagram indicating the image processing selected in correspondence to various cursor positions FIG. 4 Diagrams each indicating a specific image processing combination corresponding to a photographic scene FIG. 5 A flowchart of the processing executed during still image shooting FIG. 6 A flowchart of the image processing executed in correspondence to the cursor position FIG. 7 A flowchart of the processing executed during video shooting FIG. 8 A flowchart of the processing executed in variation 1

FIG. 1 is a block diagram showing the structure of a digital camera 1 achieved in the embodiment. The digital camera 1 comprises an image-capturing optical system 11, an image sensor 12, a lens drive circuit 13, a control unit 14, an operation member 16 and a display unit 17. A recording medium 18 such as a memory card can be loaded into and removed from the digital camera 1.

The image-capturing optical system 11, configured with a plurality of lens groups including a zoom lens and a focusing lens, forms a subject image onto a light-receiving surface of the image sensor 12. It is to be noted that the image-capturing optical system 11 is shown as a single lens in FIG. 1 so as to simplify the illustration.

Under control executed by the control unit 14, the lens drive circuit 13 adjusts the focal length by driving the zoom lens in the image-capturing optical system 11 and also executes focus adjustment by driving the focusing lens in the image-capturing optical system 11.

The image sensor 12, which is an image sensor configured with, for instance, a CMOS image sensor, captures the subject image formed by the image-capturing optical system 11 and outputs image signals obtained through the image-capturing operation to the control unit 14.

The control unit 14 includes a display control unit 14a, a position selection unit 14b, an image processing selection unit 14c, an image processing unit 14d and a scene categorizing unit 14e. The control unit 14, comprising a CPU, a memory and peripheral circuits, fulfills the functions of the various units listed above by executing a control program stored in the memory. The functions of the various units will be described in specific detail later.

The operation member 16 includes a shutter button 16a, a record button 16b and a rotary multi-selector 16c. The operation member 16 further includes a mode selector button, a cross key, an OK button, a display button and the like. In response to an operation of a given member included therein, the operation member 16 outputs an operation signal corresponding to the operation to the control unit 14.

At the display unit 17, configured with a liquid crystal monitor (back side monitor) or the like mounted on the rear surface of the digital camera 1, images captured via the image sensor 12, various types of settings menus and the like are displayed.

As a still image shooting mode or a video-shooting mode is set in response to an operation signal output from the operation member 16, the control unit 14 engages the image sensor 12 in image-capturing processing for live view image at a predetermined frame rate, generates frame images for display from the individual frame images obtained in time series from the image sensor 12 and outputs the display frame images to the display unit 17. As a result, live view image display is provided at the display unit 17.

As the shutter button 16a is pressed all the way down and a still image shooting instruction is thus issued in the still image shooting mode, the control unit 14 engages the image sensor 12 in still image-capturing processing, generates still image data by executing specific image processing on the image signals obtained from the image sensor 12, compresses the still image data in a predetermined format such as JPEG and records the compressed data into the recording medium 18.

As the record button 16b is operated and a video shooting start instruction is thus issued in the video-shooting mode, the control unit 14 engages the image sensor 12 in operation to start video capturing processing and executes specific image processing on the image signals corresponding to each frame output from the image sensor 12. The control unit 14 then compresses the image data resulting from the image processing so as to obtain compressed image data in the MPEG format or in the Motion JPEG format and records the compressed image data into the recording medium 18. Subsequently, as the record button 16b is operated again to issue a video shooting end instruction, the control unit 14 records the compressed image data created up to the video shooting end time point so as to generate a complete video file.

In addition, as a reproduce mode is set in response to an operation signal output from the operation member 16, the control unit 14 reads out and reproduces still image data or video data recorded in the recording medium 18 and displays the reproduced image data at the display unit 17.

At the digital camera 1 achieved in the embodiment, a shooting mode referred to as a creative mode, in which captured images having undergone various types of image processing can be obtained, is available in addition to the normal shooting mode. The following is a description of the creative mode.

Figure 2:
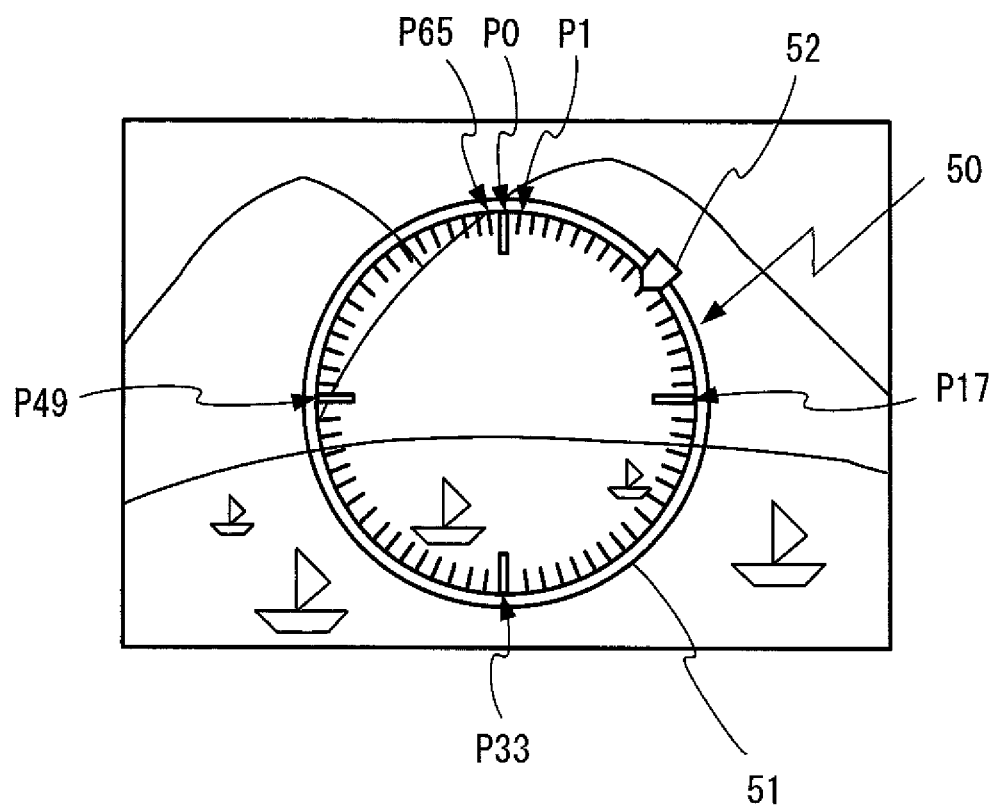

FIG. 2 presents an example of a display screen that may be brought up in the creative mode. In the creative mode, the display control unit 14a in the control unit 14 displays a live view image at the display unit 17. In addition, the display control unit 14a displays an image (hereafter referred to as a ring image) 50, in which image processing to be applied to a captured image is selected, by superimposing the ring image over the live view image. The ring image 50 includes a ring 51 and a cursor 52. The cursor 52 indicates the position on the ring 51 that is currently selected by the position selection unit 14b in the control unit 14. In response to a rotating operation performed by the user at the rotary multi-selector 16c, the position selection unit 14b moves the display position of the cursor 52 (i.e., the selected position) along the ring 51. For instance, as the user turns the rotary multi-selector 16c along the clockwise direction, the position selection unit 14b moves the cursor 52 on the ring 51 at a predetermined speed in the clockwise direction. Also, as the user turns the rotary multi-selector 16c along the counterclockwise direction, the position selection unit 14b moves the cursor 52 on the ring 51 at a predetermined speed in the counterclockwise direction.

The image processing selection unit 14c in the control unit 14 selects the image processing to be applied to the captured image among predetermined four types of image processing (hereafter referred to as first image processing through fourth image processing) in correspondence to the position selected by the position selection unit 14b, i.e., in correspondence to the position of the cursor 52. It is to be noted that specific details with respect to the first image processing through the fourth image processing will be provided later. The image processing unit 14d in the control unit 14 executes the image processing selected by the image processing selection unit 14c on the captured image. The display control unit 14a displays the captured image having undergone the image processing executed by the image processing unit 14d at the display unit 17 as a live view image.

As described above, the user of the digital camera 1 is able to select specific image processing to be applied to the captured image by turning the rotary multi-selector 16c and thus moving the position of the cursor 52, and then view the captured image having undergone the selected image processing in a real-time live view image display. The user of the digital camera 1, having switched to the desired image processing for the captured image by rotating the rotary multi-selector 16c, presses either the shutter button 16a or the record button 16b so as to record still image data or video data resulting from the desired image processing.

Figure 3:
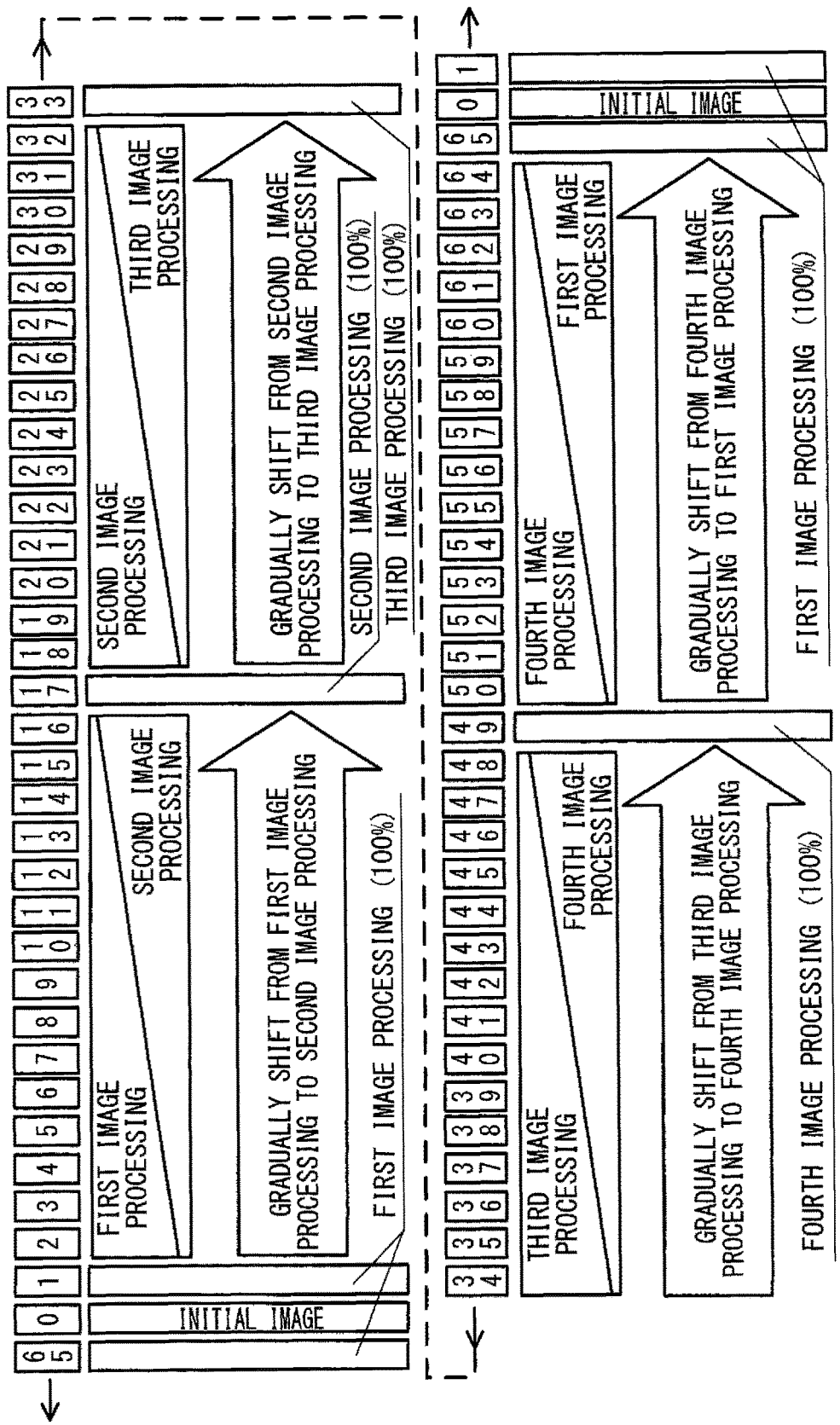

In the ring image 50, 66 positions, a 0th position through a 65th position, are set starting at a point P0 at the top of the ring 51 and moving forward along the clockwise direction, and calibration marks each indicating one of the positions are displayed inside the ring 51. The point P0 at the top of the ring 51 is the 0th position and a position P1 next to the 0th position to the right is the first position. A position P17 set apart from the 0th position P0 by 90° along the clockwise direction is the 17th position. Between the first position P1 and the 17th position P17, 15 positions, i.e., the second position through the 16th position, are set over uniform intervals. A position P33 set apart from the 0th position P0 by 180° is the 33rd position. Between the 17th position P17 and the 33rd position P33, 15 positions, i.e., the 18th position through the 32nd position, are set over uniform intervals. A position P49 set apart from the 0th position P0 by 270° along the clockwise direction is the 49th position. Between the 33rd position P33 and the 49th position P49, 15 positions, i.e., the 34th position through the 48th position, are set over uniform intervals. A position P65 next to the 0th position P0 to the left is the 65th position. Between the 49th position P49 and the 65th position P65, 15 positions, i.e., the 50th position through the 64th position, are set over uniform intervals. FIG. 3 is a diagram indicating specific image processing selected at a given position. In FIG. 3, numerals 0 through 65 indicate the 0th position through the 65th position, and the image processing selected at the position corresponding to a given number is indicated under the number.

At the start of the creative mode, the cursor 52 is displayed at the top point (the 0th position) P0 in the ring 51. At this time, none of the first image processing through the fourth image processing is selected by the image processing selection unit 14c. The image processing unit 14d thus does not execute any of the first image processing through the fourth image processing on the captured image. Accordingly, the captured image, having undergone none of the first image processing through the fourth image processing, i.e., the initial image, is displayed at the display unit 17.

When the cursor 52 is at the first position P1 directly to the right of the 0th position P0, the image processing selection unit 14c selects the first image processing alone and the image processing unit 14d executes the currently selected first image processing alone on the captured image. Thus, as the cursor 52 moves from the 0th position P0 to the first position P1 along the clockwise direction, the live view image on display at the display unit 17 changes from the initial image state to a state having undergone only the first image processing.

When the cursor 52 is at the 17th position P17 set apart from the 0th position P0 by 90° along the clockwise direction, the image processing selection unit 14c selects the second image processing alone and the image processing unit 14d thus executes the currently selected second image processing alone on the captured image. Accordingly, as the cursor 52 moves from the first position P1 to the 17th position P17 along the clockwise direction, the live view image on display at the display unit 17 changes from the state having undergone the first image processing alone to a state having undergone the second image processing alone. The live view image on display at the display unit 17 in this situation gradually changes from the state having undergone the first image processing alone to the state having undergone the second image processing alone over 15 steps. Namely, when the cursor 52 is at a position among the second position through the 16th position, the image processing selection unit 14c selects both the first image processing and the second image processing, and the image processing unit 14d executes both of the currently selected first image processing and second image processing on the captured image (i.e., combined application of the first image processing and the second image processing on the captured image). In this situation, the image processing unit 14d raises the ratio for the first image processing and lowers the ratio for the second image processing if the cursor 52 is closer to the first position P1 but raises the ratio for the second image processing and lowers the ratio for the first image processing if the cursor 52 is closer to the 17th position P17. For instance, when the cursor 52 is at the fifth position, the image processing unit 14d executes the first image processing and the second image processing on the captured image at a ratio of 75% to 25%. When the cursor 52 is at the ninth position, the image processing unit 14d executes the first image processing and the second image processing on the captured image at a ratio of 50% to 50%. And when the cursor 52 is at the 13th position, the image processing unit 14d executes the first image processing and the second image processing at a ratio of 25% to 75%. It is to be noted that the exclusive execution of the first image processing on the captured image in correspondence to the first position P1 taken by the cursor 52 is equivalent to executing the first image processing at a ratio of 100%. In addition, the exclusive execution of the second image processing on the captured image in correspondence to the 17th position P17 taken by the cursor 52 is equivalent to executing the second image processing at a ratio of 100%. Furthermore, the first image processing executed at, for instance, a ratio of 75% means that relative to the extent of the change represented by a ratio of 100% occurring in the captured image having undergone the first image processing alone, i.e., having undergone the first image processing executed at the 100% ratio, the first image processing is executed so that the captured image changes to an extent that is 75%.

When the cursor 52 is at the 33rd position P33 set apart from the 0th position P0 by 180°, the image processing selection unit 14c selects the third image processing alone and the image processing unit 14d thus executes the currently selected third image processing alone on the captured image. Accordingly, as the cursor 52 moves from the 17th position P17 to the 33rd position P33 along the clockwise direction, the live view image on display at the display unit 17 changes from the state having undergone the second image processing alone to a state having undergone the third image processing alone. The live view image on display at the display unit 17 in this situation gradually changes from the state having undergone the second image processing alone to the state having undergone the third image processing alone over 15 steps. Namely, when the cursor 52 is at a position among the 18th position through the 32nd position, the image processing selection unit 14c selects both the second image processing and the third image processing, and the image processing unit 14d executes both of the currently selected second image processing and the third image processing on the captured image. In this situation, the image processing unit 14d raises the ratio for the second image processing and lowers the ratio for the third image processing if the cursor 52 is closer to the 17th position P17 but raises the ratio for the third image processing and lowers the ratio for the second image processing if the cursor 52 is closer to the 33rd position P33.

When the cursor 52 is at the 49th position P49 set apart from the 0th position P0 by 270° along the clockwise direction, the image processing selection unit 14c selects the fourth image processing alone and the image processing unit 14d thus executes the currently selected fourth image processing alone on the captured image. Accordingly, as the cursor 52 moves from the 33rd position P33 to the 49th position P49 along the clockwise direction, the live view image on display at the display unit 17 changes from the state having undergone the third image processing alone to a state having undergone the fourth image processing alone. The live view image on display at the display unit 17 in this situation gradually changes from the state having undergone the third image processing alone to the state having undergone the fourth image processing alone over 15 steps. Namely, when the cursor 52 is at a position among the 34th position through the 48th position, the image processing selection unit 14c selects both the third image processing and the fourth image processing, and the image processing unit 14d executes both of the currently selected third image processing and the fourth image processing on the captured image. In this situation, the image processing unit 14d raises the ratio for the third image processing and lowers the ratio for the fourth image processing if the cursor 52 is closer to the 33rd position P33 but raises the ratio for the fourth image processing and lowers the ratio for the third image processing if the cursor 52 is closer to the 49th position P49.

When the cursor 52 is at the 65th position P65 directly to the left of the 0th position P0, the image processing selection unit 14c selects the first image processing alone and the image processing unit 14d executes the currently selected first image processing alone on the captured image. Thus, as the cursor 52 moves from the 49th position P49 to the 65th position P65 along the clockwise direction, the live view image on display at the display unit 17 changes from the state having undergone the fourth image processing alone to the state having undergone the first image processing alone. In this situation, the live view image on display at the display unit 17 gradually changes from the state having undergone the fourth image processing alone to the state having undergone the first image processing alone in 15 steps. Namely, when the cursor 52 is at a position among the 50th position through the 64th position, the image processing selection unit 14c selects both the fourth image processing and the first image processing, and the image processing unit 14d executes both of the currently selected fourth image processing and first image processing on the captured image. In this situation, the image processing unit 14d raises the ratio for the fourth image processing and lowers the ratio for the first image processing if the cursor 52 is closer to the 49th position P49 but raises the ratio for the first image processing and lowers the ratio for the fourth image processing if the cursor 52 is closer to the 65th position P65.

In addition, as the cursor 52 moves from the 65th position P65 to the 0th position P0 along the clockwise direction, the live view image on display at the display unit 17 reverts from the image state having undergone only the first image processing to the initial image state.

As described above, while the cursor 52 moves from the 0th position P0 over a full cycle along the clockwise direction, the image processing applied to the captured image, assuming the initial image state at the beginning of the cycle, is continuously modified in the order of: the first image processing, the second image processing, the third image processing and the fourth image processing, and shifts back to the first image processing before the captured image reverts to the initial image state. It is to be noted that as the cursor 52 moves over a full cycle along the counterclockwise direction, the image processing applied to the captured image changes in the reverse order from the order in which the image processing changes when the cursor 52 moves over a full cycle along the clockwise direction as described above. In addition, the cursor 52 does not need to move over a full cycle and the cursor 52 may move along the clockwise direction over half a cycle and then move along the counterclockwise direction so as to reverse the change having been made in the image processing.

The digital camera 1 described above enables two different types of image processing to be executed on the captured image at varying ratios, as well as a single type of image processing, among the first image processing through the fourth image processing, through a simple user operation of turning the rotary multi-selector 16c.

Next, the contents of the first image processing through the fourth image processing set in correspondence to various positions on the ring image 50, will be described in specific detail. It is to be noted that the following description will be given by assuming that the image processing may be executed to create an image by adjusting parameters such as the saturation, the contrast and the white balance or to achieve a specific filter effect such as a softening effect or a toy camera effect with peripheral darkening. In the creative mode, the scene categorizing unit 14e in the control unit 14 executes scene categorization processing in order to categorize the photographic scene. In the ring image 50, four types of image processing corresponding to the determined photographic scene category are set as the first image processing through the fourth image processing. In other words, the contents of the first image processing through the fourth image processing set in the ring image 50 are altered in correspondence to the photographic scene categorized through the processing.

Photographic scenes are sorted by the scene categorizing unit 14e into a "portrait" category for photographic scenes capturing human subjects, a "close-up" category for photographic scenes capturing subjects in close proximity, a "landscape" category for photographic scenes capturing landscapes and an "other" category for photographic scenes that are not "portrait", "close-up' or "landscape". It is to be noted that these categories simply represent examples and a photographic scene may be categorized as any of various other photographic scenes. Photographic scenes are categorized by adopting a method of the known art. For instance, the scene categorizing unit 14e is able to categorize a photographic scene based upon information generated based upon the image signals provided by the image sensor 12 (e.g., the luminance or the color balance (R/G ratio, B/G ratio)) or camera setting information (e.g., the focal length at the image-capturing optical system 11 or the photographic magnification factor).

Figure 4:
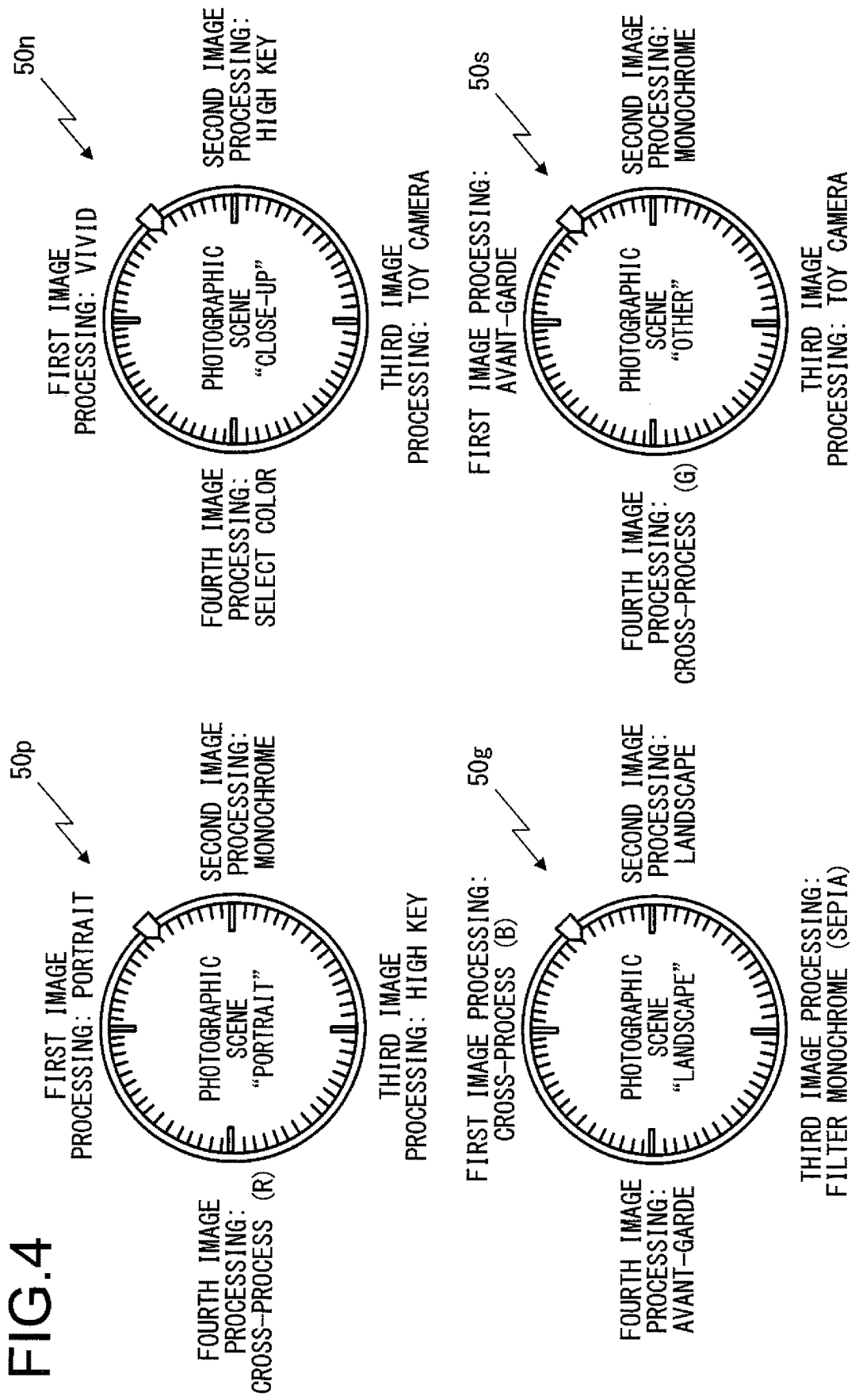

FIG. 4 shows combinations of the first image processing through the fourth image processing, each combination set in correspondence to the various photographic scene categories. At the digital camera 1, four types of image processing, suited for each specific photographic scene category, are set in advance as the first image processing through the fourth image processing. For instance, "portrait", "monochrome", "high key" and "cross-process (R)" are set respectively as the first image processing, the second image processing, the third image processing and the fourth image processing in a ring image 50p for the photographic scene "portrait". In addition, "vivid", "high key", "toy camera" and "select color" are set respectively as the first image processing, the second image processing, the third image processing and the fourth image processing in a ring image 50n for the photographic scene "close-up". "cross-process (B)", "landscape", "filter monochrome (sepia)" and "avant-garde" are set respectively as the first image processing, the second image processing, the third image processing and the fourth image processing in a ring image 50g for the photographic scene "landscape". "avant-garde", "monochrome", "toy camera" and "cross-process (G)" are set respectively as the first image processing, the second image processing, the third image processing and the fourth image processing in a ring image 50s for the photographic scene "other". It is to be noted that while FIG. 4 includes text indicating the photographic scene categories and the contents of the first image processing through the fourth image processing so as to facilitate the explanation, such text is not actually displayed and only the ring 51 and the cursor 52 are displayed on the display screen at the display unit 17, as shown in FIG. 2. Namely, the ring images 50p, 50n, 50g and 50s are displayed as the same image (i.e., with uniform display contents) on the display screen of the display unit 17 regardless of the photographic scene category.

"portrait" is image processing executed to create an image with flattering skin tones for human subjects. "monochrome" is image processing executed to create an image expressed with black and white gradations only. "high key" is image processing executed to create an image achieving high luminance over the entire image plane with less shadow. "cross-process (R)","cross-process (G)" and "cross-process (B)" are each executed to achieve an image effect simulating one that is conventionally realized through cross-processing (a silver halide film photographic process through which positive film is developed as a negative). It is to be noted that an image with a reddish tinge is obtained through "cross-process (R)", an image with a greenish tinge is obtained through "cross-process (G)" and an image with a bluish tinge is obtained through "cross-process (B)". "vivid" is image processing executed to create a high-contrast image with vivid colors. "toy camera" is image processing executed to achieve an image effect conventionally realized in an image captured through a toy camera. "select color is image processing executed to achieve an image effect in which colors other than a specific color are rendered in monochrome. "landscape" is image processing executed to create an image optimized for landscapes such as nature and street scenes. "filter monochrome (sepia)" is image processing executed to create an image expressed with sepia-colored gradations alone. "avant-garde" is image processing executed to create a unique image by further raising the contrast and the saturation relative to "vivid".

It is to be noted that specific types of image processing are set in advance in combination for the first image processing and the second image processing that are applied to the captured image together and gradually shift from one to the other, i.e., from the first image processing to the second image processing or from the second image processing to the first image processing, so as to ensure that the two types of image processing in the combination facilitate dual application and gradual shift. The same principle applies to the combination of the second image processing and the third image processing, the combination of the third image processing and the fourth image processing and the combination of the fourth image processing and the first image processing.

In addition, as the position of the cursor 52 moves, the live view image on display at the display unit 17 in the state of the initial image at the beginning, first changes into the state having undergone the first image processing at the digital camera 1. For this reason, image processing best suited for each photographic scene category, image processing through which a prominent change is to manifest relative to the initial image or the like is set for the first image processing. For instance, in the ring image 50p for the photographic scene "portrait", the image processing "portrait" optimal for images with human subjects, is set as the first image processing. In addition, "cross-process (B)", through which a marked change is to manifest relative to the initial image, is set as the first image processing in the ring image 50g for the photographic scene "landscape".

Furthermore, by anticipating that the user is more likely to turn the rotary multi-selector 16c along the clockwise direction rather than along the counterclockwise direction, different types of image processing are set as the first image processing through the fourth image processing in the order starting with the highest recommendation level and moving toward lower recommendation levels. For instance, as the cursor 52 moves along the clockwise direction on the ring image 50p for the photographic scene "portrait", image processing selected for the captured image changes in the order of: "portrait" set for the first image processing, "monochrome" set for the second image processing, "high key" set for the third image processing and "cross-process (R)" set for the fourth image processing. This means that the image processing recommendation level for the captured image in the photographic scene category "portrait" becomes lower in the order of "portrait", "monochrome", "high key" and "cross-process (R)".

It is to be noted that information indicating the combinations of types of image processing set as the first image processing through the fourth image processing in the ring image 50 is stored in advance in a memory (not shown) in the digital camera 1 in correspondence to each photographic scene category, and the first image processing through the fourth image processing are set in the ring image 50 based upon this information and the results of scene categorization.

Figure 5:
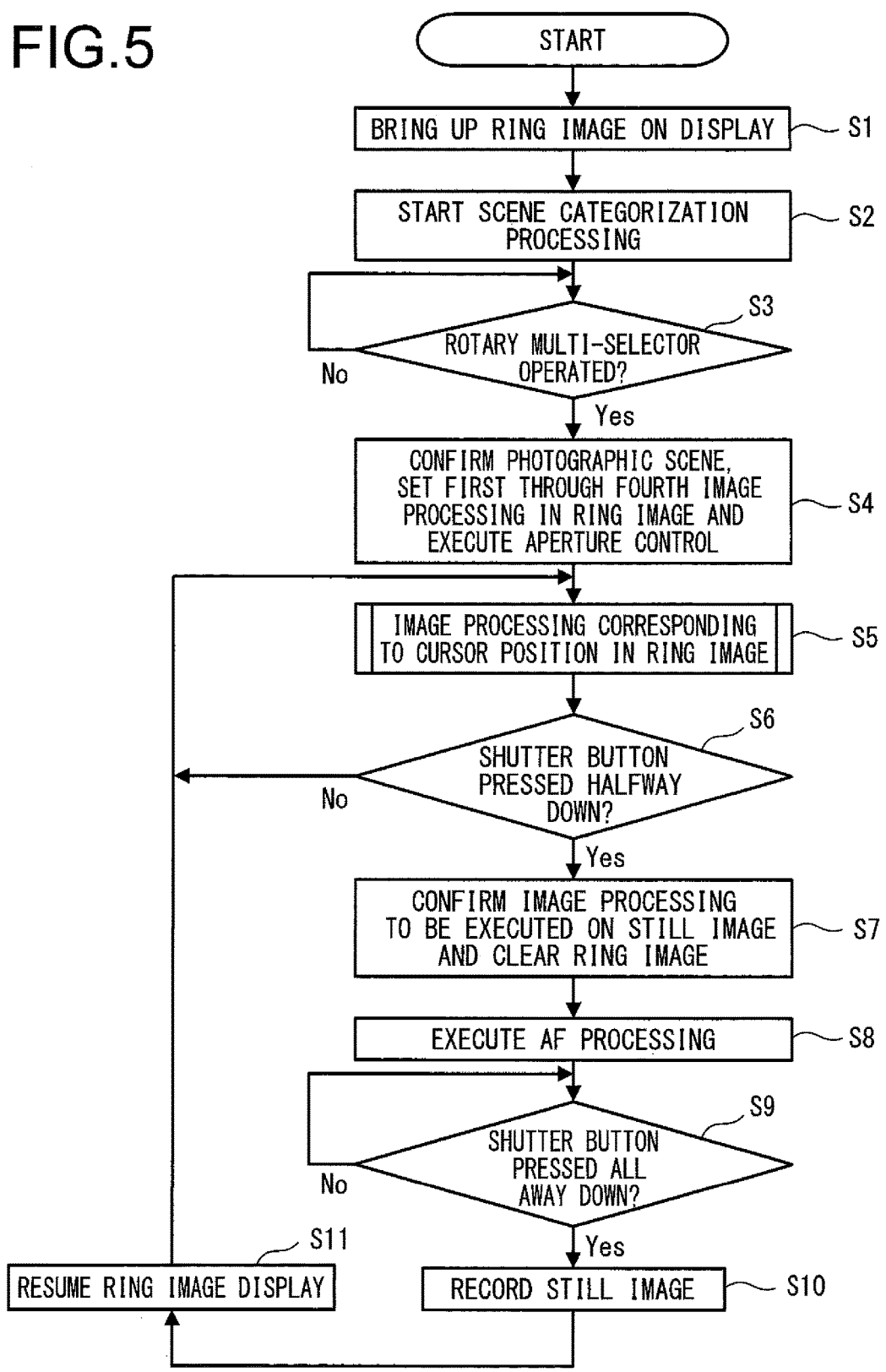

Next, the flow of the processing executed by the control unit 14 in the creative mode will be explained. FIG. 5 presents a flowchart of the processing executed when shooting a still image in the creative mode. As the still image shooting mode is switched to the creative mode, the control unit 14 brings up a live view image on display and also starts up a program enabling the processing shown in FIG. 5, which is stored in a memory (not shown), so as to start the processing in FIG. 5.

In step S1, the display control unit 14a brings up on display the ring image 50, and the operation proceeds to step S2.

In step S2, the scene categorizing unit 14e in the control unit 14 starts scene categorization processing for photographic scene categorization, and then the operation proceeds to step S3. It is to be noted that the scene categorization processing is repeatedly executed over predetermined time intervals. In addition, the control unit 14 adjusts focus on a given subject by repeatedly executing AF (autofocus) processing so as to ensure that the scene categorization processing is executed correctly.

In step S3, the control unit 14 makes a decision as to whether or not the rotary multi-selector 16c has been rotated. If the rotary multi-selector 16c has not been rotated, the control unit 14 makes a negative decision in step S3. In this case, the control unit 14 repeats the processing in step S3 and continues to execute the scene categorization processing. If, on the other hand, the rotary multi-selector 16c has been rotated, the control unit 14 makes an affirmative decision in step S3 and the operation proceeds to step S4.

In step S4, the scene categorizing unit 14e suspends the scene categorization processing and confirms the photographic scene category, determined at the time point at which the rotary multi-selector 16c was rotated, as photographic scene categorization results. The control unit 14 then sets the first image processing through the fourth image processing corresponding to the photographic scene category thus confirmed in the ring image 50 as has been explained earlier in reference to FIG. 4.

The control unit 14 also controls the aperture number at the image-capturing optical system 11 in correspondence to the photographic scene category confirmed in step 54. The optimal aperture setting corresponding to each photographic scene category is stored in advance in a memory (not shown) in the digital camera 1 in the embodiment. For instance, the maximum aperture number is selected in correspondence to the photographic scene "portrait" and the aperture number F8 is selected in correspondence to the photographic scene "landscape". The control unit 14 controls the aperture number at the image-capturing optical system 11 so as to achieve the aperture number selected in correspondence to the photographic scene category having been confirmed as described above. In the subsequent live view image/still image-capturing processing, the control unit 14 executes exposure control (control of the shutter speed, the ISO sensitivity and the like) in an aperture-priority mode.

In step S5, the control unit 14 executes processing so as to apply the image processing corresponding to the position of the cursor 52, to the captured image, as explained earlier. The flow of this processing will be now described in reference to the flowchart presented in FIG. 6. In step S51, the position selection unit 14b moves the cursor 52 (i.e., the selected position) in response to the rotation of the rotary multi-selector 16c, and the operation proceeds to step S52.

In step S52, the image processing selection unit 14c selects the image processing to be applied to the captured image in correspondence to the position of the cursor 52, as has been explained in reference to FIGS. 2 and 3, before the operation proceeds to step S53.

In step S53, the image processing unit 14d executes the image processing having been selected in step S52, on the captured image and the operation proceeds to step S54.

In step S54, the display control unit 14a brings up the captured image having undergone the image processing executed by the image processing unit 14d, on display at the display unit 17. Through this process, the live view image having undergone the selected image processing in step S53 is brought up on display at the display unit 17. Subsequently, the control unit 14 ends the processing in FIG. 6 and proceeds to step S6 in FIG. 5.

In step S6, the control unit 14 makes a decision as to whether or not the shutter button 16a has been pressed halfway down. If the shutter button 16a has not been pressed halfway down, the control unit 14 makes a negative decision in step S6 and the operation returns to step S5. Namely, until the shutter button 16a is pressed halfway down, the control unit 14 repeatedly executes the image processing corresponding to the position of the cursor 52 (see FIG. 6). If, on the other hand, the shutter button 16a has been pressed halfway down, the control unit 14 makes an affirmative decision in step S6 and the operation proceeds to step S7.

In step S7, the image processing selection unit 14c confirms the image processing, set in correspondence to the position taken by the cursor 52 at the time point at which the shutter button 16a was pressed halfway down (i.e., the image processing applied to the captured image at the time point), as the image processing to be applied to the still image. The display control unit 14a then clears the ring image 50 from the display, before the operation proceeds to step S8.

In step S8, the control unit 14 executes AF processing in an automatic mode switchover AF mode for automatic switchover of the AF mode from a single AF mode, in which a fixed focus position is assumed, to a continuous AF mode, in which the focus position follows a moving subject or vice versa, and then the operation proceeds to step S9. In the automatic mode switchover AF mode, the focus position is fixed once focus is adjusted onto the subject at the time point at which the shutter button 16a is pressed halfway down. Then, if the subject moves and the distance between the digital camera 1 and the subject changes, the AF mode automatically switches to the continuous AF mode so as to keep focus on the subject.

In step S9, a decision is made as to whether or not the shutter button 16a has been pressed all the way down. If the shutter button 16a has not been pressed all the way down, the control unit 14 makes a negative decision in step S9 and repeatedly executes the processing in step S9. If, on the other hand, the shutter button 16a has been pressed all the way down, the control unit 14 makes an affirmative decision in step S9 and the operation proceeds to step S10.

In step S10, the control unit 14 engages the image sensor 12 in still image-capturing processing. The image processing unit 14d executes the image processing having been confirmed in step S7 on captured image data obtained through this image-capturing processing. The control unit 14 then records the captured image data having undergone the image processing into the recording medium 18 as still image data, and then the operation proceeds to step S11.

In step S11, the control unit 14 brings up the live view image and the ring image 50 on display again, before the operation returns to step S5. Namely, even after the still image shooting operation ends, the settings for the first image processing through the fourth image processing, having been set in step S4, are sustained in the ring image 50. In addition, the position of the cursor 52 in effect in step S5 is sustained. These settings are sustained so as to ensure that the user wishing to shoot the next still image under the same conditions immediately after the first still image is shot and can perform the continuous shooting operation smoothly without allowing any changes that would result in a still image undergoing different image processing, with respect to the first image processing through the fourth image processing set in the ring image 50 or the position of the cursor 52.

The user, wishing to alter settings for the first image processing through the fourth image processing in the ring image 50 up on display only needs to press down the OK button in the operation member 16 to reset the first image processing through the fourth image processing. As the OK button is pressed while the ring image 50 is on display, the control unit 14 clears (resets) the current settings for the first image processing through the fourth image processing in the ring image 50. The position selection unit 14*b* resets the cursor 52 to the initial position (0th position) P0. The control unit 14 then starts the processing in FIG. 5 again, starting in step S2. Namely, the scene categorizing unit 14*e* starts scene categorization processing. Subsequently, as the rotary multi-selector 16*c* is rotated, the control unit 14 sets the first image processing through the fourth image processing corresponding to the photographic scene category determined at the time point at which the rotary multi-selector 16*c* was rotated in the ring image 50.

It is to be noted that if the user does not operate the rotary multi-selector 16*c* even once before pressing the shutter button 16*a* halfway down in the creative mode, the control unit 14 clears the ring image 50 from the display and executes processing similar to that executed in the normal mode. Namely, the control unit 14 executes AF processing in the automatic mode switchover AF mode. Then, as the shutter button 16*a* is pressed all the way down, the control unit 14 engages the image sensor 12 in still image-capturing processing and records the resulting captured image data into the recording medium 18 as still image data. The control unit 14 then returns to step S1 in FIG. 5 to start the processing again.

Next, in reference to the flowchart presented in FIG. 7, the flow of the processing executed when shooting video in the creative mode will be described. As the video-shooting mode is switched to the creative mode, the control unit 14 brings up a live view image on display and starts up a program enabling the processing in FIG. 7, which is stored in a memory (not shown) so as to start the processing in FIG. 7.

In steps S21 through S25, the control unit 14 executes processing similar to that executed in steps S11 through S15 in FIG. 5 explained earlier. Namely, as in the still image shooting mode, the image processing selection unit 14*c* selects the image processing to be applied to the captured image in correspondence to the position of the cursor 52 at the ring image 50 in the video-shooting mode.

In step S26, the control unit 14 makes a decision as to whether or not the record button 16*b* has been pressed down. If the record button 16*b* has not been pressed down, the control unit 14 makes a negative decision in step S26 and the processing returns to step S25. Namely, until the record button 16*b* is pressed, the control unit 14 repeatedly executes the image processing corresponding to the position of the cursor 52 (see FIG. 6).

Once the record button 16*b* is pressed, the control unit 14 makes an affirmative decision in step S26 and the operation proceeds to step S27.

In step S27, the image processing selection unit 14*c* confirms the image processing set in correspondence to the position taken by the cursor 52 at the time point at which the record button 16*b* was pressed down as the image processing to be applied to the video. The display control unit 14*a* then clears the ring image 50 from the display, before the operation proceeds to step S28.

In step S28, the control unit 14 starts shooting video before the operation proceeds to step S29. During the video shooting operation, the image processing unit 14*d* executes the image processing having been confirmed in step S27 on the image data for each of the frames in the video being shot.

In step S29, the control unit 14 starts AF processing in an AF mode, in which focus is adjusted onto a given subject through repeated AF processing, and then the operation proceeds to step S30.

In step S30, a decision is made as to whether or not the shutter button 16*a* has been pressed all the way down. If the shutter button 16*a* has not been pressed all the way down, the control unit 14 makes a negative decision in step S30 and the operation proceeds to step S32. If, on the other hand, the shutter button 16*a* has been pressed all the way down, the control unit 14 makes an affirmative decision in step S30 and the operation proceeds to step S31.

In step S31, the control unit 14 executes a still image shooting operation as part of the video shooting operation, and then the operation proceeds to step S32. At this time, the image processing unit 14*d* executes the image processing having been confirmed in step S27 on the frame image data corresponding to the image captured at the time point at which the shutter button 16*a* was pressed all the way down. The control unit 14 records the frame image data having undergone the image processing as still image data into a memory (not shown) for temporary storage.

In step S32, the control unit 14 makes a decision as to whether or not the record button 16*b* has been pressed down. If the record button 16*b* has not been pressed down, the control unit 14 makes a negative decision in step S32 and the operation returns to step S30. Until the record button 16*b* is pressed, the control unit 14 repeatedly executes the processing in steps S30 through S32 corresponding to the position of the cursor 52 (see FIG. 6). Once the record button 16*b* is pressed, the control unit 14 makes an affirmative decision in step S32 and the operation proceeds to step S33.

In step S33, the control unit 14 ends the video shooting operation. The control unit 14 records a series of frame image data corresponding to the frames captured during a period elapsing between step S26, in which it was decided that the record button 16*b* had been pressed down and step S32, in which it is decided that the record button 16*b* has been pressed down again, which has undergone the image processing confirmed in step S27, as a single set of video data, into the recording medium 18. In addition, it records the still image data having been temporarily stored into the memory (not shown) in step S31 into the recording medium 18 as well. The control unit 14 then proceeds to step S34.

In step S34, the control unit 14 brings up the live view image and the ring image 50 up on display again, before the operation returns to step S25.

It is to be noted that if the user does not operate the rotary multi-selector 16c even once before pressing down the record button 16b in the creative mode, the control unit 14 clears the ring image 50 from the display and executes processing similar to that executed in the normal mode. Namely, the control unit 14 starts a video shooting operation and starts executing AF processing in the AF mode in which focus is adjusted to a given subject through repeated AF processing. If the shutter button 16a is pressed all the way down during the video shooting operation, the control unit 14 executes a still image shooting operation as part of the video shooting operation. As the record button 16b is pressed again, the control unit 14 ends the video shooting operation and records a series of frame image data corresponding to the frames captured during the period of time elapsing between the time point at which the record button 16b was first pressed down and the time point at which the record button 16b is pressed again, into the recording medium 18 as video data. Subsequently, the control unit 14 returns to step S21 in FIG. 7 to start the processing again.

The following advantages and operations are achieved through the first embodiment described above.

(1) The scene categorizing unit 14e in the digital camera 1 categorizes the photographic scene in a captured image obtained via the image sensor 12 as "portrait", "close-up", "landscape" or "other". If the photographic scene categorized by the scene categorizing unit 14e is "portrait", the display control unit 14a displays the ring image 50, which enables selection of at least one type of image processing among the first image processing through the fourth image processing ("portrait", "monochrome", "high key" and "cross-process (R)") corresponding to "portrait" at the display unit 17. The image processing selection unit 14c selects at least one type of image processing among the first image processing through the fourth image processing in response to a user operation performed on the ring image 50. The image processing unit 14d executes the image processing selected by the image processing selection unit 14c on the captured image. It is to be noted that specific image processing is executed for photographic scenes categorized as "close-up", "landscape" and "other" through similar procedures. The structure adopted in the digital camera 1 as described above allows it to display the ring image 50 for selection of the image processing optimal for each photographic scene category. As a result, the user is able to select desired image processing among the specific types of image processing suited for the current photographic scene.

(2) The image processing selection unit 14c in the digital camera 1 selects the first image processing "portrait" when the first position P1 is selected on the ring image 50p for the photographic scene "portrait" via the position selection unit 14b. It selects the second image processing "monochrome" when the 17th position P7 is selected. It selects both the first image processing "portrait" and the second image processing "monochrome" when a position between the first position P1 and the 17th position P17 is selected. In the range over which both the first image processing "portrait" and the second image processing "monochrome" are selected via the image processing selection unit 14c, the image processing unit 14d raises the ratio for the first image processing "portrait" and lowers the ratio for the second image processing "monochrome" if the position selected by the position selection unit 14b is closer to the first decision P1. If, on the other hand, the position selected by the position selection unit 14b is closer to the 17th position P17, the ratio for the second image processing "monochrome" is raised and the ratio for the first image processing "portrait" is lowered. It is to be noted that the same principle applies with regard to the ring image 50n for the photographic scene "close-up", the ring image 50g for the photographic scene "landscape" and the ring image 50s for the photographic scene "other". At the digital camera 1 structured as described above, the live view image on display at the display unit 17 smoothly changes from the state having undergone the first image processing to the state having undergone the second image processing as the position selected by the position selection unit 14b (the position of the cursor 52) moves from the first position P1 toward the 17th position P17. The user simply needs to rotate the rotary multi-selector 16c to apply the first image processing and the second image processing in combination on the captured image by varying their ratios as well as to apply either the first image processing or the second image processing alone to the captured image. Thus, types of image processing (e.g., for image creation and for image effects), set as options in, for instance, different settings menus and thus cannot be selected at the same time at a digital camera in the related art, can be selected once and can be applied in combination to the captured image at the digital camera 1 achieved in the embodiment. In addition, while the user will need to perform a complex operation to select image processing in a settings menu assuming a hierarchical structure, the user of the digital camera 1 achieved in the embodiment only needs to perform a simple operation of moving the cursor 52 on a single ring image 50. Furthermore, since changes in the image processing can be verified in real-time on the live view image at the digital camera 1 in the embodiment, even a novice user is able to easily find and set the image processing he likes.

(3) The image processing selection unit 14c in the digital camera 1 does not select any of the first image processing through the fourth image processing "portrait", "monochrome", "high key" and "cross-process (R)" when the 0th position P0 next to the first position P1 in the ring image 50p for the photographic scene "portrait" is selected by the position selection unit 14b. The image processing unit 14d accordingly does not execute any of the first image processing through the fourth image processing on the captured image. It is to be noted that the same principle applies with regard to the ring image 50n for the photographic scene "close-up", the ring image 50g for the photographic scene "landscape" and the ring image 50s for the photographic scene "other". At the digital camera 1 adopting this structure, the captured image to which none of the first image processing through the fourth image processing is applied, i.e., the initial image, is displayed at the display unit 17 as long as the position selected by the position selection unit 14b (the position of the cursor 52) is the 0th position P0. In addition, as the position of the cursor 52 moves from the 0th position P0 to the first position P1, the captured image on display at the display unit 17 shifts from the initial image state to the state having undergone the first image processing alone. This shift signals to the user that a change in the image processing has started.

(4) The ring 51 and the cursor 52 are displayed in the ring image 50p for the photographic scene "portrait" at the digital camera 1. The ring 51 and the cursor 52 are also displayed in the ring image 50n for the photographic scene "close-up", the ring image 50g for the photographic scene "landscape" and the ring image 50s for the photographic scene "other". As the cursor 52 moves over a full cycle along the ring 51, the user is able to intuitively grasp the change in the image processing, i.e., the shift from the initial image state to the first image processing, to the second image processing, to the third image processing, to the fourth image processing and then back to the first image processing before reverting to the initial image state. In other words, the user is able to set the image processing to be applied to the captured image with ease through an intuitive rotating operation of the rotary multi-selector 16c.

(Variation 1)

In the embodiment described above, the cursor 52 is made to move on the ring image 50 in response to a rotating operation performed at the rotary multi-selector 16c. However, the present invention is not limited to this example and the cursor 52 may instead be made to move on the ring image 50 in response to a touch operation performed at a touch panel included in the digital camera 1.

Figure 8:
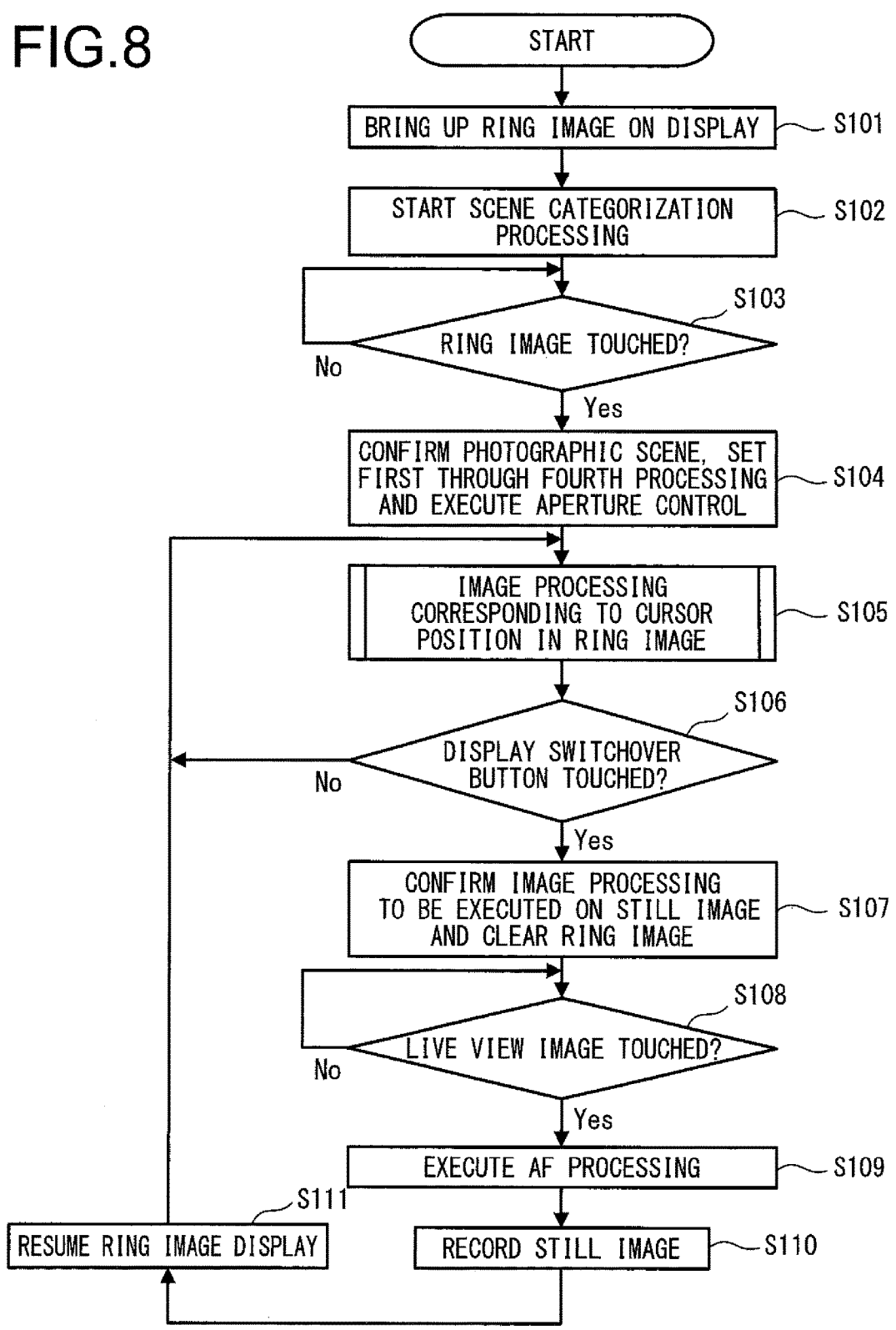

FIG. 8 presents a flowchart of the processing executed when shooting a still image in the creative mode in variation 1. It is to be noted that the processing in FIG. 8 is executed in conjunction with a function commonly referred to as a touch shutter function, whereby the shutter is released in response to a touch operation performed on the live view image. As the still image shooting mode is switched to the creative mode, the control unit 14 brings up a live view image on display and also starts up a program enabling the processing shown in FIG. 8, which is stored in a memory (not shown), so as to start the processing in FIG. 8.

Figure 9:
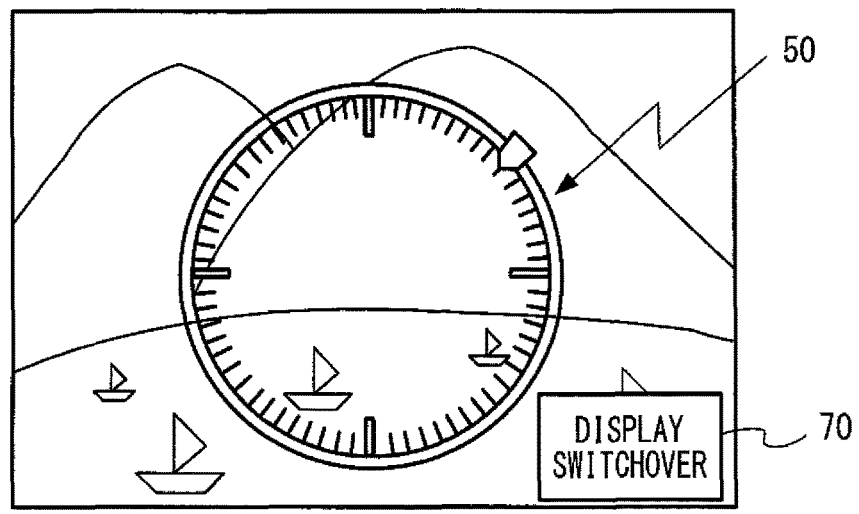
FIG. 9 An example of a display screen that may be brought up in variation 1

In step S101, the display control unit 14a brings up on display the ring image 50 as in step S1 in FIG.5, and the operation proceeds to step S102. At this time, a display switchover button 70 is displayed, in addition to the ring image 50 and the cursor 52, at the display unit 17, as shown in FIG. 9. This display switchover button 70 is a button selected when the user wishes to clear the ring image 50.

In step S102, the control unit 14 starts scene categorization processing as in step S2 in FIG. 5 explained earlier and then the operation proceeds to step S103.

In step S103, the control unit 14 makes a decision as to whether or not a touch operation has been performed on the ring image 50 via the touch panel. If a touch operation has not been performed on the ring image 50, the control unit 14 makes a negative decision in step S103. In this case, the control unit 14 repeats the processing in step S103 and continues to execute the scene categorization processing. If, on the other hand, the rotary multi-selector 16c has been rotated, the control unit 14 makes an affirmative decision in step S103 and the operation proceeds to step S104.

In step S104, the scene categorizing unit 14e suspends the scene categorization processing and confirms the photographic scene category, determined at the time point at which the touch operation was performed on the ring image 50, as photographic scene categorization results. The control unit 14 then sets the first image processing through the fourth image processing corresponding to the photographic scene category thus confirmed and executes aperture control as in step S4 in FIG. 5 explained earlier, before the operation proceeds to step S105.

In step S105 the control unit 14 executes processing so as to apply the image processing corresponding to the position of the cursor 52 on the ring image 50 to the captured image, as in step S4 in FIG. 5 explained earlier and the operation proceeds to step S106. It is to be noted that in response to a touch operation performed on the ring 51, the control unit 14 in variation 1 moves the cursor 52 at a predetermined speed toward the position at which the ring 51 has been touched and stops the cursor 52 at that position. While the position of the cursor 52 moves, the image processing applied to the captured image continuously changes in correspondence to the position of the cursor 52.

In step S106, the control unit 14 makes a decision as to whether or not a touch operation has been performed on the display switchover button 70 via the touch panel. If no touch operation has been performed on the display switchover button 70, the control unit 14 makes a negative decision in step S106 and the operation returns to step S106. Namely, until the display switchover button 70 is touched, the control unit 14 repeatedly executes the image processing corresponding to the position taken by the cursor 52 on the ring image 50. If a touch operation has been performed on the display switchover button 70, the control unit 14 makes an affirmative decision in step S106 and the operation proceeds to step S107.

In step S107, the image processing selection unit 14c confirms the image processing set in correspondence to the position taken by the cursor 52 at the time point at which the switchover button 70 was touched as the image processing to be applied to the still image. The display control unit 14a then clears the ring image 50 from the display, before the operation proceeds to step S108.

In step S108, the control unit 14 makes a decision as to whether or not a touch operation has been performed on the live view image via the touch panel. If no touch operation has been performed on the live view image, the control unit 14 makes a negative decision in step S108 and repeatedly executes the processing in step S108. If, on the other hand, a touch operation has been performed on the live view image, the control unit 14 makes an affirmative decision in step S108 and the operation proceeds to step S109.

In step S109, the control unit 14 executes AF processing so as to adjust focus onto the position that has been touched through the touch operation described above, and then the operation proceeds to step S110.

In step S110, the control unit 14 executes image-capturing processing so as to obtain image data to be recorded, executes the image processing having been confirmed in step S107 on the captured image data thus obtained and records the image data into the recording medium 18 as still image data, as in step S10 in FIG. 5 described earlier. The operation then proceeds to step S111.

In step S111, the control unit 14 brings up the live view image and the ring image 50 up on display again, before the operation returns to step S105.

It is to be noted that while the ring image 50 is cleared via the display switchover button 70 in the example described above in reference to FIG. 8, the ring image 50 may instead be cleared from the display in response to, for instance, a predetermined gesture operation (e.g., a touch operation performed as if to flick away the ring image 50) performed via the touch panel. In addition, the ring image 50 may be brought up on display in response to a gesture operation performed via the touch panel as if to draw a circle on the live view image.

(Variation 2)

The digital camera 1 at which the cursor 52 in the ring image 50 is made to move in response to a rotating operation performed at the rotary multi-selector 16c may include a display switchover button 70. In this digital camera, display clear control is executed to clear the ring image 50 in response to a user operation performed at the display switchover button 70 when the presence of the ring image 50 on display compromises visual access to the live view image, e.g., when the ring image 50 is displayed over the face of a subject. While the ring image 50 is not on display, the image processing applied to the captured image may be altered in response to a rotating operation performed at the rotary multi-selector 16e.

(Variation 3)

In addition, the digital camera 1 may include a tilt detection sensor (e.g., an acceleration sensor) capable of detecting an inclination of the casing of the digital camera 1, so as to move the cursor 52 in the ring image 50 in response to an action of tilting the digital camera 1. In such a case, the control unit 14 moves the cursor 52 along the clockwise direction if the user tilts the digital camera 1 so as to turn the right side of the digital camera 1 downward and moves the cursor 52 along the counterclockwise direction if the user tilts the digital camera 1 so as to turn the left side thereof downward.

(Variation 4)

The digital camera 1 may include a focus ring used to manually move the focus lens, and in such a case, the cursor 52 in the ring image may be made to move in response to an operation performed at the focus ring. When this digital camera is set in the creative mode, the focus ring is used as an operation member via which the cursor 52 in the ring image 50 is moved, instead of as the operation member used to move the focus lens. In the creative mode, the control unit 14 moves the cursor 52 along the clockwise direction if, for instance, the focus ring is rotated along the clockwise direction and moves the cursor 52 along the counterclockwise direction if the focus ring is rotated along the counterclockwise direction.

(Variation 5)

Figure 10:
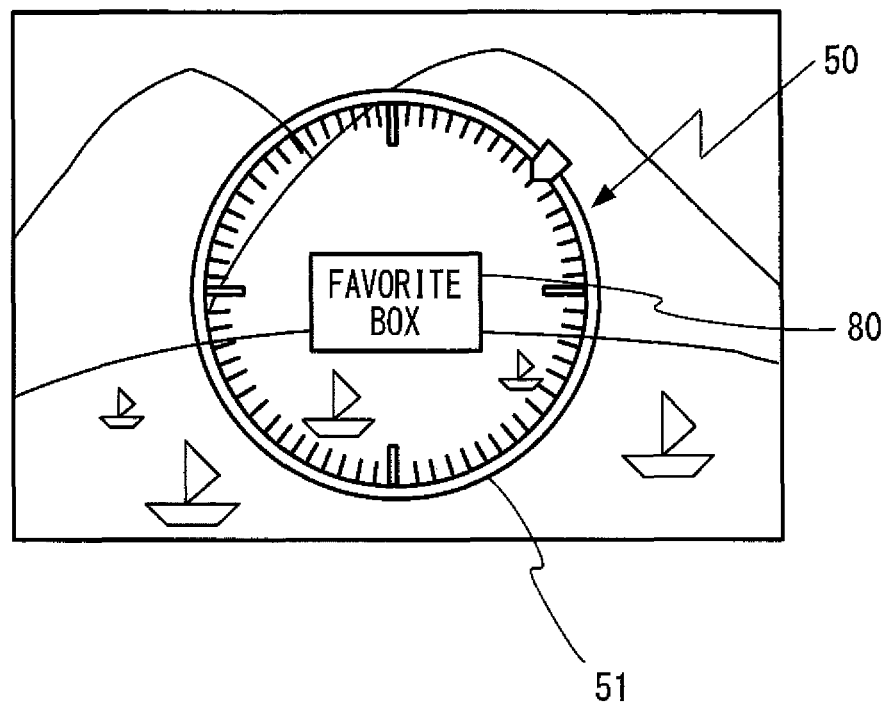
FIG. 10 An example of a display screen that may be brought up in variation 4

The digital camera 1 may further have a function that allows a favorite image processing setting to be registered and called up. The control unit 14 in such a digital camera displays a favorite BOX icon 80 inside the ring 51 in the ring image 50, as shown in FIG. 10. The user, having selected desired image processing as the image processing to be applied to the captured image by rotating the rotary multi-selector 16c, then performs a drag-and-drop operation of moving the cursor 52 to the icon 80 via the touch panel. In response, the control unit 14 registers the image processing set in correspondence to the position of the cursor 52 as a favorite image processing setting and stores the setting details into a memory (not shown). For instance, the user may perform the drag-and-drop operation when the cursor 52 is at the position corresponding to the "portrait" ratio of 75% and "monochrome" ratio of 25%, and in such a case, the control unit 14 records the setting for "portrait" 75% "monochrome" 25% as a favorite image processing setting.

In addition, as the user touches the icon 80 via the touch panel, the control unit 14 calls up the favorite image processing setting having been registered as described above from the memory, displays the cursor 52 at the position corresponding to the image processing setting, and executes the image processing on the captured image based upon the image processing setting. It is to be noted that a plurality of favorite image processing settings may be registered, and in such a case, a selection screen allowing selection of a specific image processing setting to be called up may be brought up on display at the display unit 17 in response to a touch operation performed at the icon 80. In addition, an image processing setting having been registered in a photographic scene in the same category as the current photographic scene may be called up, or a registered image processing setting may be called up regardless of whether or not it corresponds to the photographic scene category of the current photographic scene. Furthermore, details of a registered favorite image processing setting may be adjusted later.

(Variation 6)

At the digital camera 1, information indicating the contents of the image processing set in correspondence to the current position of the cursor 52 (i.e., the image processing currently applied to the captured image) may be displayed at the display unit 17 so that the user is able to verify the details of the image processing. In response to an operation performed at, for instance, a display switchover operation member (e.g., a display button), the control unit 14 may display text information 91 (e.g., "saturation +10, contrast +5, portrait") indicating the details of the currently selected image processing, inside the ring 51 in the ring image 50, as shown in FIG. 11(a). As an alternative, the control unit 14 may display a radar chart 92 indicating the details of the currently selected image processing inside the ring 51 in the ring image 50, as shown in FIG. 11(b). The radar chart 92 in the example presented in FIG. 11(b) is an equilateral hexagonal radar chart that indicates numerical values for six factors, i.e., saturation, contrast, brightness, hue, effect and sharpness. The information providing the details of the currently selected image processing setting will help the user select the same image processing setting by using an image processing settings menu or the like even in the normal shooting mode, in which the ring image 50 is not displayed.

(Variation 7)

In the digital camera 1 achieved in the embodiment described above, preselected combinations of image processing are set in the ring image 50. As an alternative, the user may be allowed to select image processing combinations to be set in the ring image 50. In the following description, an image processing combination selected for the ring image 50 by the user will be referred to as a user setting.

For instance, in a user settings editing screen such as that shown in FIG. 12(a), the user may freely select four different types of image processing in combination to be set in the ring image 50 and the user may freely edit the names indicating the contents of the image processing. The image processing that may be set in the ring image 50 in this digital camera 1 may be image processing imported into the digital camera 1 via an application program or the like, as well as the image processing available as factory settings in the digital camera 1.

In addition, the ratios for the first image processing and the second image processing, for instance, may be edited freely in a user settings editing screen such as that shown in FIG. 12(b).

Furthermore, user setting information, indicating a user setting created by the user may be posted to the public on the Internet to enable user setting information exchange with other users. For instance, user setting information indicating a user setting created by another user may be downloaded into the digital camera 1 and the user setting in the downloaded information may be selected for the ring image 50 in a selection screen such as that shown in FIG. 12(c).

Moreover, the digital camera 1 may have a learning function that enables automatic adjustment of the ratios of the image processing to be applied to the captured image. In such a case, the digital camera 1 should be structured so that the learning function can be turned on/off. When the learning function is on, the control unit 14 may store a history of the image processing selected by the user for shooting operations into a memory (not shown) and may raise the ratio for a specific type of processing executed with high frequency.

(Variation 8)

The control unit 14 may alter the order with which the four types of image processing are set in the ring image 50 in correspondence to the direction along which the cursor 52 moves, so that the order in which the image processing applied to the captured image shifts, remains the same regardless of whether the cursor 52 is moving along the clockwise direction or the counterclockwise direction. For instance, an order: "portrait", "monochrome", "high key", and "cross-process (R)", may be set for the photographic scene "portrait". If the rotary multi-selector 16*c* is rotated along the clockwise direction at the time point at which the photographic scene category is confirmed, the control unit 14 sets the first image processing through the fourth image processing in the order of "portrait", "monochrome", "high key" and "cross-process (R)" in the ring image 50. In this situation, the cursor 52 is moving along the clockwise direction and the image processing shifts in the order of: "portrait", "monochrome", "high key" and "cross-process (R)". If, on the other hand, the rotary multi-selector 16*c* is rotated along the clockwise direction at the time point at which the photographic scene category is confirmed, the control unit 14 sets the first image processing through the fourth image processing in the order of "portrait", "cross-process (R)", "high key" and "monochrome", in the ring image 50. In this situation, the cursor 52 is moving along the counterclockwise direction and the image processing shifts in the order of: "portrait", "monochrome", "high key" and "cross-process (R)". As a result, regardless of whether the cursor 52 moves along the clockwise direction or along the counterclockwise direction, the image processing applied to the captured image shifts in the same order.

(Variation 9)

In the embodiment described above, the display contents in the ring image 50 themselves do not change even when the actual contents of the first image processing through the fourth image processing set in the ring image 50 change for a different photographic scene category. As an alternative, the control unit 14 may alter the color of the ring image 50 for a new photographic scene category in correspondence to which the contents of the first image processing through the fourth image processing set in the ring image 50 change. Furthermore, the control unit 14 may display text indicating the contents of the first image processing through the fourth image processing set in the ring image 50 near the ring image 50.

(Variation 10)

In the embodiment described above, the ring image 50 is brought up on display once the creative mode is selected so as to execute the image processing corresponding to the position of the cursor 52. However, the present invention is not limited to this example and the control unit 14 may bring up the ring image 50 on display in response to a predetermined user operation performed in the normal shooting mode so as to execute the image processing corresponding to the position of the cursor 52.

(Variation 11)

In the embodiment described above, the image processing to be applied to the captured image is selected from four types of processing (the first image processing through the fourth image processing) in correspondence to the position to which the cursor 52 is moved in the ring image 50. However, the number of image processing options for the captured image is not limited to four, and there may be two or three image processing options or there may be five or more image processing options.

(Variation 12)

In the embodiment described above, the image processing to be applied to the captured image is selected in the ring image 50. However, the present invention is not limited to this example and an image that includes, for instance, a bar instead of a ring and a cursor may be displayed and the image processing to be applied to the captured image may be selected in correspondence to the position of the cursor on the bar.

(Variation 13)

In the embodiment described above, the cursor 52 is displayed as a mark that indicates the position selected by the position selection unit 14*b*. However, an icon, for instance, instead of the cursor 52 may be used as the mark that indicates the position selected by the position selection unit 14*b*. Furthermore, the color of a specific calibration mark may be altered or the particular graduation marker may be flashed in the ring image 50 so as to allow it to function as the mark that indicates the position selected by the position selection unit 14*b*.

(Variation 14)

Figure 6:
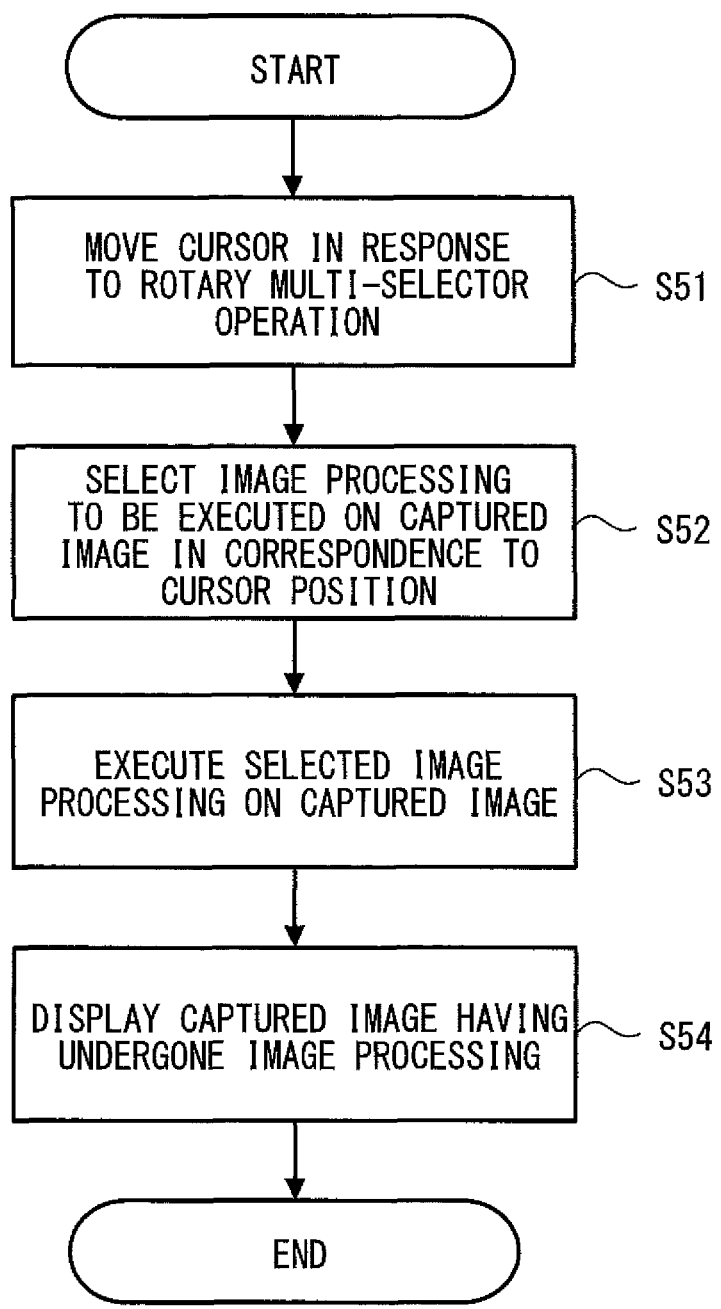
Figure 7:
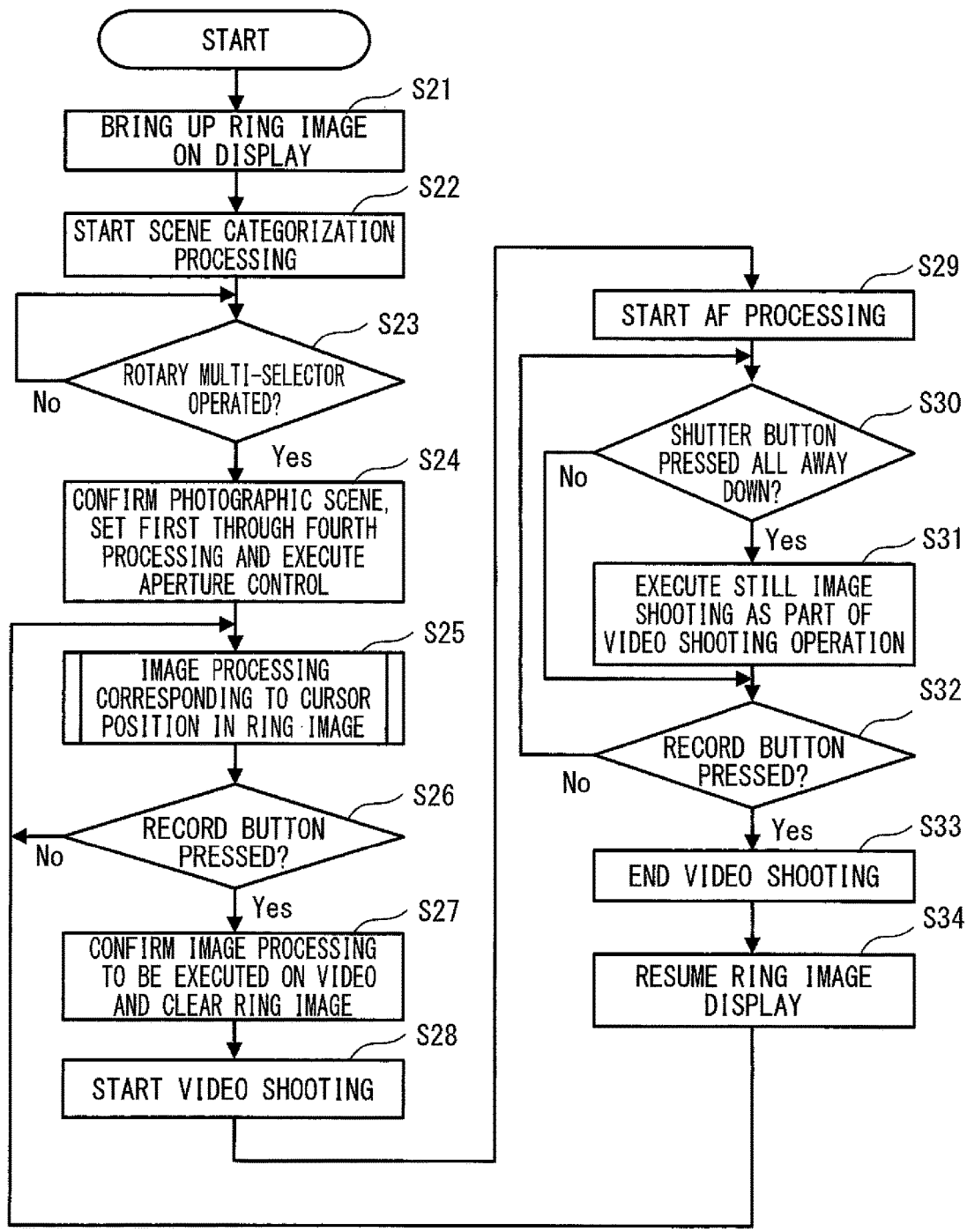
Figure 13:
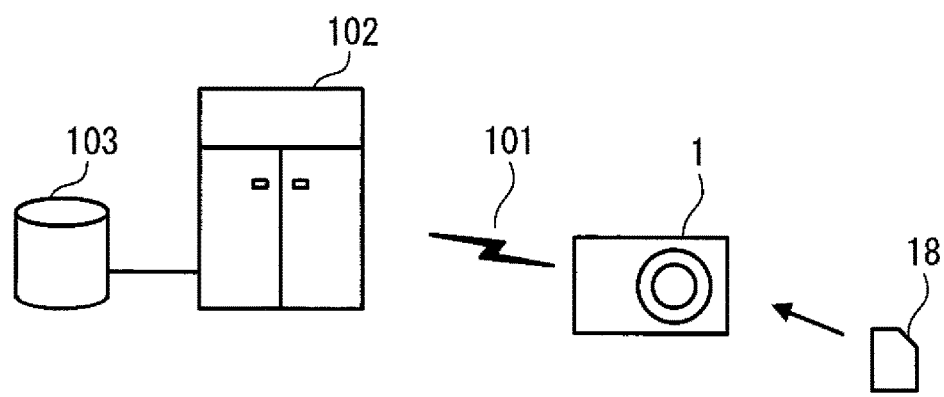
FIG. 13 An illustration showing how a program may be provided

In the embodiment described above, the processing described in reference to FIG. 5 through FIG. 7 is executed as the control unit 14 executes a program recorded in a memory (not shown). This program may be provided in advance at the time of product shipment or it may be provided in a recording medium such as a memory card or on a data signal via the Internet after product shipment. FIG. 13 shows how the program may be provided. The digital camera 1 receives the program product via the recording medium 18 such as a memory card. The digital camera 1 also has a function that allows it to connect with a communication line 101. A computer 102 is a server computer that provides the program stored in a recording medium such as a hard disk 103. The communication line 101 may be a communication network such as the Internet or a personal computer communication network, or it may be a dedicated communication line or the like. The computer 102 reads out the program stored in the hard disk 103 and then transmits the program to the digital camera 1 via the communication line 101. Namely, the program embodied as a data signal on a carrier wave is transmitted via the communication line 101. In other words, the program may be provided as a computer-readable computer program product assuming any of various modes including a recording medium and a data signal (carrier wave).

(Variation 15)

While the present invention is adopted in a digital camera in the first embodiment described above, the present invention is not limited to this example and it may be adopted in another type of image-capturing device (e.g., an electronic device with an image-capturing means such as a portable terminal with a camera installed therein).

(Second Embodiment)

Figure 14:
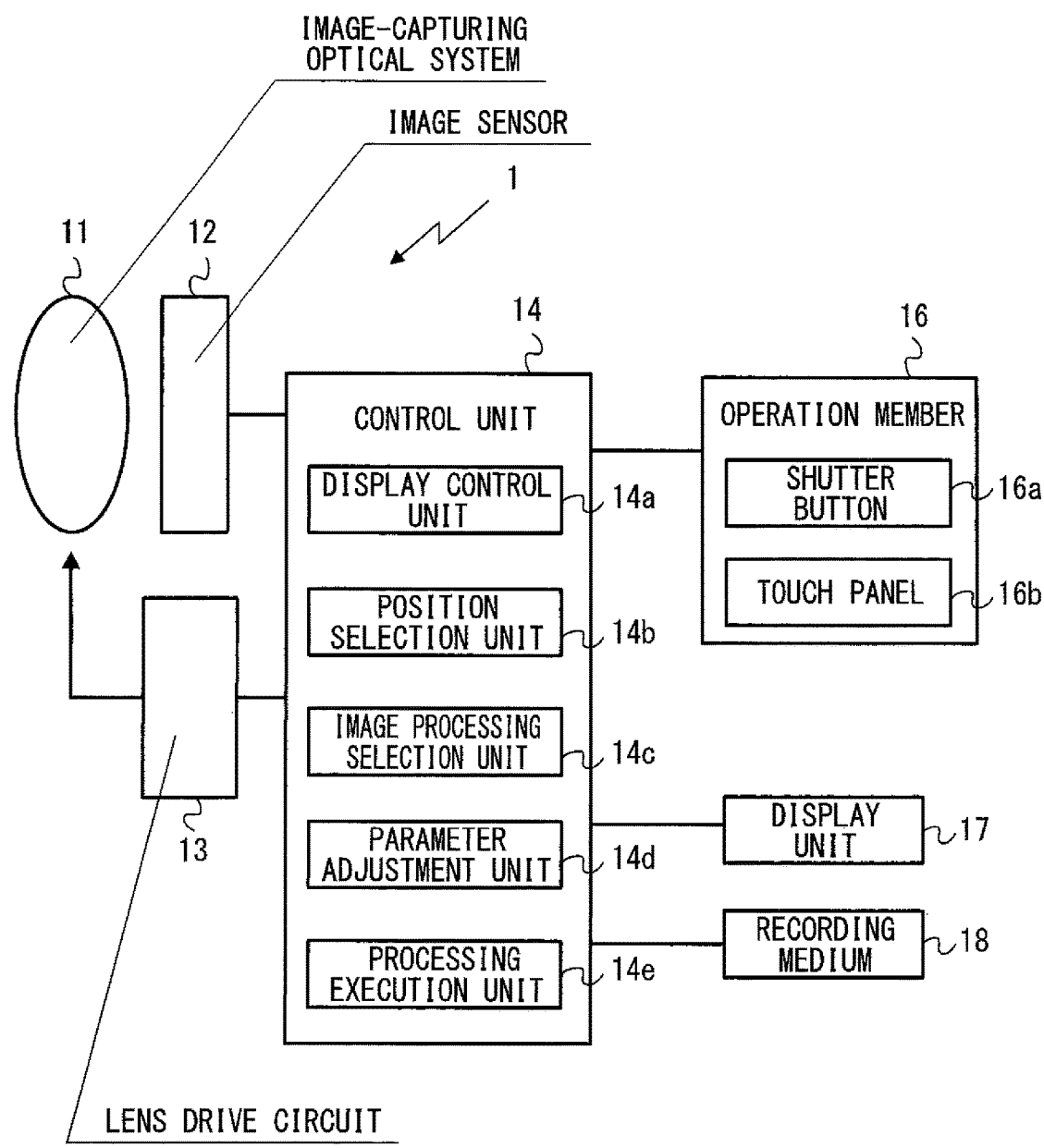
FIG. 14 A block diagram presenting an example of a structure that may be adopted in the digital camera achieved in a second embodiment of the present invention FIG. 15 An illustration of a ring image FIG. 16 An illustration of a dial image FIG. 17 A diagram indicating the functions available via the dial image in correspondence to various cursor positions taken in the ring image FIG. 18 Diagrams each presenting a change curve used to adjust the ratios of two types of image processing FIG. 19 A flowchart of the processing executed in the creative mode FIG. 20 A flowchart of the processing in continuation from FIG. 19

FIG. 14 is a block diagram showing the structure of a digital camera 1B achieved in the second embodiment. While the structure shown in FIG. 14 only partially differs from that in FIG. 1, it will be described as a separate embodiment. It is to be noted that the description given in reference to the current embodiment applies to all the elements in FIG. 14 even though some of them are assigned with the same reference numerals as those in FIG. 1.

The digital camera 1B comprises an image-capturing optical system 11, an image sensor 12, a lens drive circuit 13, a control unit 14, an operation member 16 and a display unit 17. A recording medium 18 such as a memory card can be loaded into and removed from the digital camera 1B.

The image-capturing optical system 11, configured with a plurality of lens groups including a zoom lens and a focusing lens, forms a subject image onto a light-receiving surface of the image sensor 12. It is to be noted that the image-capturing optical system 11 is shown as a single lens in FIG. 1 so as to simplify the illustration.

Under control executed by the control unit 14, the lens drive circuit 13 adjusts the focal length by driving the zoom lens in the image-capturing optical system 11 and also executes focus adjustment by driving the focusing lens in the image-capturing optical system 11.

The image sensor 12, which is an image sensor configured with, for instance, a CMOS image sensor, captures the subject image formed by the image-capturing optical system 11 and outputs image signals obtained through the image-capturing operation to the control unit 14.

The control unit 14 includes a display control unit 14a, a position selection unit 14b, an image processing unit 14c, a parameter adjustment unit 14d and a processing execution unit 14e. The control unit 14, comprising a CPU, a memory and peripheral circuits, fulfills the functions of the various units listed above by executing a control program stored in the memory. The functions of the various units will be described in detail later.

The operation member 16 includes a shutter button 16a and a touch panel 16b disposed on the display unit 17. The touch panel 16b detects a contact position at which a contacting object, such as a touch pen or a finger, comes into contact with the touch panel 16b and outputs the contact position thus detected to the control unit 14. The operation member 16 further includes a record button, a mode selector button, a cross key, an OK button, a display button and the like. The operation member 16 outputs an operation signal corresponding to a user operation to the control unit 14.

At the display unit 17, configured with a liquid crystal monitor (back side monitor) or the like mounted on the rear surface of the digital camera 1B, images captured via the image sensor 12, various types of settings menus and the like are displayed.

In a shooting mode set in response to an operation signal output from the operation member 16, the control unit 14 engages the image sensor 12 in live view image-capturing processing at a predetermined frame rate, generates frame images for display from the individual frame images obtained in time series from the image sensor 12 and outputs the display frame images to the display unit 17. As a result, real-time live view image display is provided at the display unit 17.

As the shutter button 16a is pressed all the way down and a still image shooting instruction is thus issued in the shooting mode, the control unit 14 engages the image sensor 12 in still image-capturing processing, generates still image data by executing specific image processing on the image signals obtained from the image sensor 12, compresses the still image data in a predetermined format such as JPEG and records the compressed data into the recording medium 18.

In addition, as the reproduce mode is set in response to an operation signal output from the operation member 16, the control unit 14 reads out and reproduces still image data or video data recorded in the recording medium 18 and displays the reproduced data at the display unit 17.

At the digital camera 1B achieved in the embodiment, a shooting mode referred to as a creative mode is available in addition to the normal shooting modes. The following is a description of the creative mode.

Figure 15:
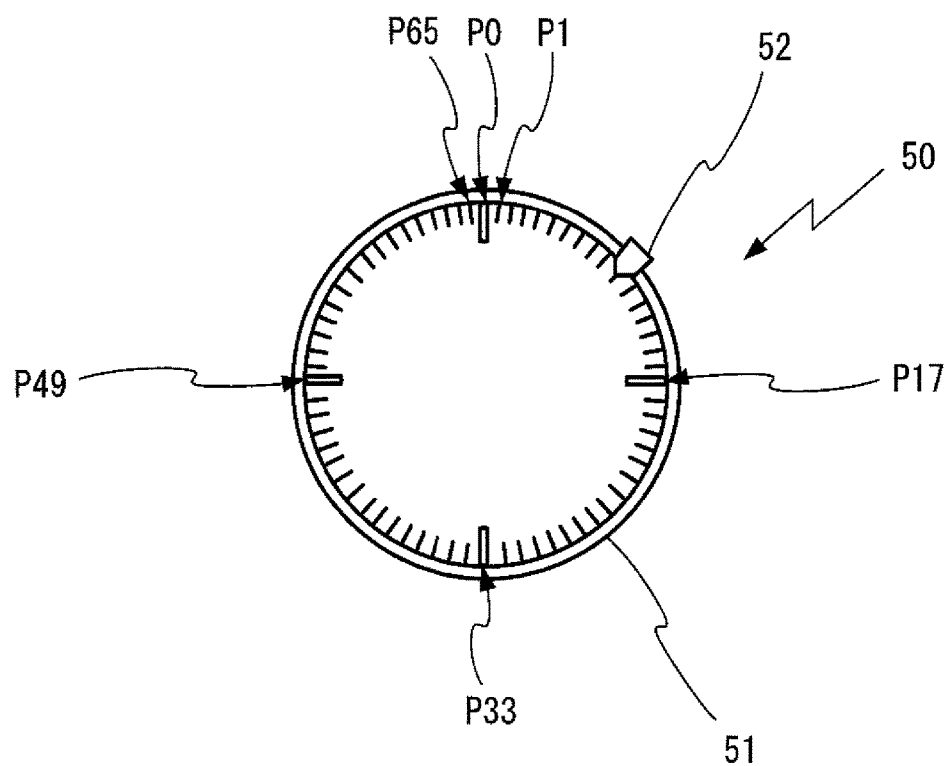

In the creative mode, the display control unit 14a in the control unit 14 displays an image (hereafter referred to as a ring image) 50, by which image processing to be applied to a captured image is selected at the display unit 17, as shown in FIG. 15. The ring image 50 includes a ring 51 and a cursor 52. The cursor 52 indicates the position on the ring 51 that is currently selected by the position selection unit 14b in the control unit 14. The position selection unit 14b moves the selected position (the position at which the cursor 52 is displayed) along the ring 51 in response to a drag operation performed by touching the display position of the cursor 52 with a finger and moving the cursor while maintaining contact with the touch panel 16b.

The image processing unit 14c in the control unit 14 selects one type of image processing or two types of image processing from four types of image processing (hereafter referred to as first image processing through fourth image processing) set in the ring image 50 in correspondence to the position selected by the image selection unit 14b (i.e., the position at which the cursor 52 is displayed). The image processing unit 14c executes the selected image processing on the live view image on display at the display unit 17.

In the ring image 50, 66 positions, a 0th position through a 65th position, are set starting at a point P0 at the top of the ring 51 and moving forward along the clockwise direction, and calibration marks each indicating one of the positions are displayed inside the ring 51. The point P0 at the top of the ring 51 is the 0th position and a position P1 next to the 0th position to the right is the first position. A position P17 set apart from the 0th position P0 by 90° along the clockwise direction is the 17th position. Between the first position P1 and the 17th position P17, 15 positions, i.e., the second position through the 16th position, are set over uniform intervals. A position P33 set apart from the 0th position P0 by 180° is the 33rd position. Between the 17th position P17 and the 33rd position P33, 15 positions, i.e., the 18th position through the 32nd position, are set over uniform intervals. A position P49 set apart from the 0th position P0 by 270° along the clockwise direction is the 49th position. Between the 33rd position P33 and the 49th position P49, 15 positions, i.e., the 34th position through the 48th position, are set over uniform intervals. A position P65 next to the 0th position P0 to the left is the 65th position. Between the 49th position P49 and the 65th position P65, 15 positions, i.e., the 50th position through the 64th position, are set over uniform intervals. The image processing selected at a given position taken by the cursor 52 is the same as that selected in the first embodiment, as has been explained in reference to FIG. 3.

At the start of the creative mode, the cursor 52 is displayed at the top point (the 0th position) P0 in the ring 51. Namely, the 0th position is selected by the position selection unit 14b at this time. In this situation, the image processing unit 14c does not execute any of the first image processing through the fourth image processing on the captured image. Accordingly, the captured image, having undergone none of the first image processing through the fourth image processing, i.e., the initial image, is displayed at the display unit 17.

When the cursor 52 is at the first position P1 directly to the right of the 0th position P0, i.e., when the first position P1 is selected by the position selection unit 14b, the image processing unit 14c executes the first image processing alone (i.e., at the ratio of 100% for the first image processing) on the captured image. Thus, as the cursor 52 moves from the 0th position P0 to the first position P1 along the clockwise direction, the live view image on display at the display unit 17 changes from the initial image state to a state having undergone the first image processing.

When the cursor 52 is at the 17th position P17, set apart from the 0th position P0 by 90° along the clockwise direction, i.e. when the 17th position P17 is selected by the position selection unit 14*b*, the image processing unit 14*c* executes the second image processing alone on the captured image (i.e., at the ratio of 100% for the second image processing). Accordingly, as the cursor 52 moves from the first position P1 to the 17th position P17 along the clockwise direction, the live view image on display at the display unit 17 changes from the state having undergone the first image processing alone to a state having undergone the second image processing alone. The live view image on display at the display unit 17 in this situation gradually changes from the state having undergone the first image processing alone to the state having undergone the second image processing alone over 16 steps. Namely, when the cursor 52 is at a position among the second position through the 16th position (i.e., when the position currently selected by the position selection unit 14*b* is between the first position P1 through the 17th position P17), the image processing unit 14*c* executes both the currently selected first image processing and the second image processing on the captured image (i.e., application of the first image processing and the second image processing on the captured image in combination).

The image processing unit 14*c* adjusts the ratios for the first image processing and the second image processing in correspondence to the position of the cursor 52 (i.e., the position selected by the position selection unit 14*b*). In more specific terms, the image processing unit 14*c* adjusts the ratios so as to lower the ratio for the first image processing and raise the ratio for the second image processing as the position of the cursor 52 moves toward the 17th position P17. Moreover, the image processing unit 14*c* adjusts the ratios so as to raise the ratio for the first image processing and lower the ratio for the second image processing as the position of the cursor 52 moves toward the first position P1. For instance, when the cursor 52 is at the fifth position, the image processing unit 14*c* executes the first image processing and the second image processing on the captured image at a ratio of 75% to 25%. When the cursor 52 is at the ninth position, the image processing unit 14*c* executes the first image processing and the second image processing on the captured image at a ratio of 50% to 50%. When the cursor 52 is at the 13th position, the image processing unit 14*d* executes the first image processing and the second image processing on the captured image at a ratio of 25% to 75%. It is to be noted that the first image processing executed at, for instance, a ratio of 75% means that relative to the extent of the change represented by a ratio of 100%, occurring in the captured image having undergone the first image processing alone, i.e., having undergone the first image processing executed at the 100% ratio, the first image processing is executed so that the captured image changes to an extent that is 75%.

When the cursor 52 is at the 33rd position P33 set apart from the 0th position P0 by 180°, i.e., when the 33rd position P33 is selected by the position selection unit 14*b*, the image processing unit 14*c* executes the third image processing alone on the captured image. Accordingly, as the cursor 52 moves from the 17th position P17 to the 33rd position P33 along the clockwise direction, the live view image on display at the display unit 17 changes from the state having undergone the second image processing alone to a state having undergone the third image processing alone.

The live view image on display at the display unit 17 in this situation gradually changes from the state having undergone the second image processing alone to the state having undergone the third image processing alone over 16 steps. Namely, when the cursor 52 is at a position among the 18th position through the 32nd position (i.e., when the position currently selected by the position selection unit 14*b* is between the 17th position P17 and the 33rd position P33), the image processing unit 14*c* executes both the second image processing and the third image processing on the captured image. In this situation, the image processing unit 14*c* adjusts the image processing ratios so as to lower the ratio for the second image processing and raise the ratio for the third image processing as the position of the cursor 52 moves from the 17th position P17 toward the 33rd position P33. In addition, the image processing unit 14*c* adjusts the image processing ratios so as to raise the ratio for the second image processing and lower the ratio for the third image processing as the position of the cursor 52 moves from the 33rd position P33 toward the 17th position P17.

When the cursor 52 is at the 49th position P49 set apart from the 0th position P0 by 270° along the clockwise direction, i.e., when the 49th position P49 is selected by the position selection unit 14*b*, the image processing unit 14*c* executes the fourth image processing alone on the captured image. Accordingly, as the cursor 52 moves from the 33rd position P33 to the 49th position P49 along the clockwise direction, the live view image on display at the display unit 17 changes from the state having undergone the third image processing alone to a state having undergone the fourth image processing alone.

The live view image on display at the display unit 17 in this situation gradually changes from the state having undergone the third image processing alone to the state having undergone the fourth image processing alone over 16 steps. Namely, when the cursor 52 is at a position among the 34th position through the 48th position (i.e., when the position currently selected by the position selection unit 14*b* is between the 33rd position P33 and the 49th position P49), the image processing unit 14*c* executes both the third image processing and the fourth image processing on the captured image. In this situation, the image processing unit 14*c* adjusts the image processing ratios so as to lower the ratio for the third image processing and raise the ratio for the fourth image processing as the position of the cursor 52 moves from the 33rd position P33 toward the 49th position P49. In addition, the image processing unit 14*c* adjusts the image processing ratios so as to raise the ratio for the third image processing and lower the ratio for the fourth image processing as the position of the cursor 52 moves from the 49th position P49 toward the 33rd position P33.

When the cursor 52 is at the 65th position P65 directly to the left of the 0th position P0, i.e., when the 65th position P65 is selected by the position selection unit 14*b*, the image processing unit 14*c* executes the first image processing alone on the captured image. Thus, as the cursor 52 moves from the 49th position P49 to the 65th position P65 along the clockwise direction, the live view image on display at the display unit 17 changes from the state having undergone the fourth image processing alone to the state having undergone the first image processing alone.

The live view image on display at the display unit 17 in this situation gradually changes from the state having undergone the fourth image processing alone to the state having undergone the first image processing alone over 16 steps. Namely, when the cursor 52 is at a position among the 50th position through the 64th position (i.e., when the position currently selected by the position selection unit 14*b* is between the 49th position P49 and the 65th position P65), the image processing unit 14*c* executes both the fourth image processing and the first image processing on the captured image. In this situation, the image processing unit 14c adjusts the image processing ratios so as to lower the ratio for the fourth image processing and raise the ratio for the first image processing as the position of the cursor 52 moves from the 49th position P49 toward the 65th position P65. In addition, the image processing unit 14c adjusts the image processing ratios so as to raise the ratio for the fourth image processing and lower the ratio for the first image processing as the position of the cursor 52 moves from the 65th position P65 toward the 49th position P49.

In addition, as the cursor 52 moves from the 65th position P65 to the 0th position P0 along the clockwise direction, the live view image on display at the display unit 17 reverts from the image state having undergone only the first image processing to the initial image state.

As described above, as the cursor 52 moves from the 0th position P2 over a full cycle along the clockwise direction, the image processing executed on the captured image, assuming the initial image state at the beginning of the cycle, is continuously modified in the order of: the first image processing, the second image processing, the third image processing and the fourth image processing, and shifts back to the first image processing before the captured image reverts to the initial image state. In addition, as the cursor 52 moves over a full cycle along the counterclockwise direction, the image processing applied to the captured image changes in the reverse order from the order in which the image processing changes when the cursor 52 moves over a full cycle along the clockwise direction as described above. Furthermore, the cursor 52 does not need to move over a full cycle and the cursor 52 may move along the clockwise direction over half a cycle and then move along the counterclockwise direction so as to reverse the change having been made in the image processing.

Next, the contents of the first image processing through the fourth image processing set in correspondence to various positions in the ring image 50, will be described in further detail. It is to be noted that the following description will be given by assuming that the image processing may be executed to create an image by adjusting parameters such as the saturation, the contrast and the white balance or to achieve a specific effect such as a softening effect or a toy camera effect with peripheral darkening. In the creative mode, scene categorization processing is executed to categorize the photographic scene and four types of image processing corresponding to the photographic scene category thus determined are set in the ring image 50 as the first image processing through the fourth image processing. In other words, the contents of the first image processing through the fourth image processing set in the ring image 50 are altered in correspondence to the photographic scene category determined through the processing.

Photographic scenes are sorted into a "portrait" category for photographic scenes capturing human subjects, a "close-up" category for photographic scenes capturing subjects in close proximity, a "landscape" category for photographic scenes capturing landscapes and an "other" category for photographic scenes that are not "portrait", "close-up' or "landscape". It is to be noted that these categories simply represent examples and a photographic scene may be categorized as any of various other photographic scenes. Photographic scenes are categorized by adopting a method of the known art. For instance, the control unit 14 is able to categorize photographic scenes based upon information generated based upon the image signals provided by the image sensor 12 (e.g., the luminance or the color balance (R/G ratio, B/G ratio)) or camera setting information (e.g., the focal length at the image-capturing optical system 11 or the photographic magnification factor).

In reference to FIG. 4, combinations of image processing set for the first image processing through the fourth image processing in correspondence to the various photographic scene categories will be described. At the digital camera 1B, four types of image processing, suited for each specific photographic scene category, are set in advance as the first image processing through the fourth image processing. For instance, "portrait", "monochrome", "high key" and "cross-process (R)" are set respectively as the first image processing, the second image processing, the third image processing and the fourth image processing in a ring image 50p for the photographic scene "portrait". "vivid", "high key", "toy camera" and "select color" are set respectively as the first image processing, the second image processing, the third image processing and the fourth image processing in a ring image 50n for the photographic scene "close-up". "cross-process (B)", "landscape", "filter monochrome (sepia)" and "avant-garde" are set respectively as the first image processing, the second image processing, the third image processing and the fourth image processing in a ring image 50g for the photographic scene "landscape". "avant-garde", "monochrome", "toy camera" and "cross-process (G)" are set respectively as the first image processing, the second image processing, the third image processing and the fourth image processing in a ring image 50s for the photographic scene "other". It is to be noted that while FIG. 4 includes text indicating the photographic scene categories and the contents of the first image processing through the fourth image processing to facilitate the explanation, such text is not actually displayed and only the ring 51 and the cursor 52 are displayed on the display screen at the display unit 17. Namely, the ring images 50p, 50n, 50g and 50s are displayed as the same image (i.e., with uniform display contents) on the display screen of the display unit 17 regardless of the photographic scene category.

"portrait" is image processing executed to create an image with flattering skin tones for human subjects. "monochrome" is image processing executed to create an image expressed with black and white gradations only. "high key" is image processing executed to create an image achieving high luminance over the entire image plane with less shadow. "cross-process (R)", "cross-process (G)" and "cross-process (B)" are each executed to achieve an image effect simulating an effect that is conventionally realized through cross-processing (a silver halide film photographic process in which positive film is developed as a negative). It is to be noted that an image with a reddish tinge is obtained through "cross-process (R)" image processing, an image with a greenish tinge is obtained through "cross-process (G)" and an image with a bluish tinge is obtained through "cross-process (B)". "vivid" is image processing executed to create a high-contrast image with vivid colors. "toy camera" is image processing executed to achieve an image effect conventionally realized in an image captured through a toy camera. "select color is image processing executed to achieve an image effect in which colors other than a specific color are rendered as monochrome. "landscape" is image processing executed to create an image optimized for landscapes such as nature and street scenes. "filter monochrome (sepia)" is image processing executed to create an image expressed with sepia-colored gradations alone. "avant-garde" is image processing executed to create a unique image by further raising the contrast and the saturation relative to "vivid".

It is to be noted that information indicating the combinations of types of image processing set as the first image processing through the fourth image processing in the ring image 50 is stored in advance in a memory (not shown) in the digital camera 1B in correspondence to each photographic scene category, and the first image processing through the fourth image processing are set in the ring image 50 based upon this information and the results of scene categorization.

Figure 16:
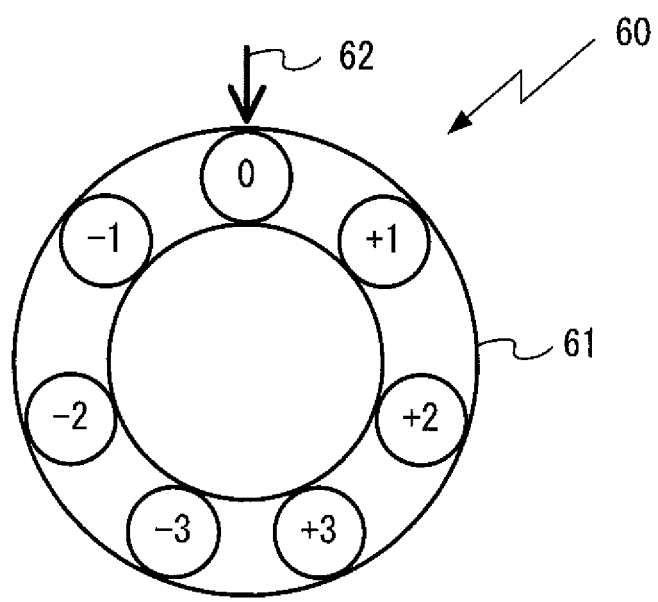

In addition, in the creative mode, the display control unit 14a brings up a dial image 60 such as that shown in FIG. 16 on display at the display unit 17. The dial image 60 is made up with a dial 61 with numerical values "−3" through "+3" displayed therein and an arrow mark 62. The parameter adjustment unit 14d in the control unit 14 rotates the dial 61 in response to a drag operation performed at the dial 61 on the touch panel 16b and selects the numerical value closest to the arrow mark 62 at the dial 61 as a value setting in the dial image 60.

Next, the functions available through the dial image 60 will be described in reference to FIGS. 17. As FIG. 17 indicates, when the cursor 52 is at the 0th position P0 in the ring image 50, a photographic setting function allowing selection of photographic settings in the digital camera 1B is assigned to the dial image 60. As a photographic setting, a brightness setting (e.g., an exposure setting) or a focus position setting may be selected.

When an exposure setting function is assigned to the dial image 60, the processing execution unit 14e in the control unit 14 executes exposure setting processing so as to set exposure for the captured image in correspondence to the value setting selected in the dial image 60. For instance, when the value of the setting is "0", the processing execution unit 14e selects optimal exposure as the exposure setting for the captured image. When the value setting is a positive value ("+1", "+2" or "+3"), the processing execution unit 14e determines that the captured image is to be overexposed relative to the optimal exposure and selects a setting so that the captured image is brightened to a greater extent if the value setting in the dial image is greater. When the value setting is a negative value ("−1", "−2" or "−3"), the processing execution unit 14e determines that the captured image is to be underexposed relative to the optimal exposure and selects a setting so that the captured image is darkened to a greater extent if the value setting in the dial image is smaller, i.e., if the absolute value of the value setting is greater.

When a focus position setting function is assigned to the dial image 60, the processing execution unit 14e in the control unit 14 executes focus position setting processing so as to set the focus position for the captured image in correspondence to the value setting selected in the dial image 60. For instance, when the value of the setting is "0", the processing execution unit 14e sets the focus position so as to adjust focus on a subject detected through subject detection processing. When the value setting is a positive value ("+1", "+2" or "+3"), the processing execution unit 14e determines that the focus position is to be set so as to achieve a back focusing state relative to that corresponding to the value setting "0" and selects a setting so that the focus position is adjusted further back if the value setting is greater. When the value setting is a negative value ("−1", "−2" or "−3"), the processing execution unit 14e determines that the focus position is to be set so as to achieve a front focusing state relative to that corresponding to the value setting "0" and selects a setting so that the focus position is adjusted further to the front if the value setting is greater.

As explained earlier, the live view image on display at the display unit 17 is the initial image when the cursor 52 is at the 0th position P0 in the ring image 50. As the user performs an operation on the dial image 60 to adjust a photographic setting in this state, the adjustment in the photographic setting is reflected in the initial image on display as the live view image. Thus, the user is able to perform an operation on the dial image 60 to adjust the photographic setting to a desired setting while checking the adjustment results on the live view image.

It is to be noted that the user may be allowed to select in advance in, for instance, a settings menu in the digital camera 1B so as to designate either the exposure setting function or the focus position setting function as the function available through the dial image 60 when the cursor 52 is at the 0th position P0.

In addition, the function assigned to the dial image 60 when the cursor 52 is at the first position P1 in the ring image 50 is a function that allows switchover of image processing to be set as the first image processing in the ring image 50. The processing execution unit 14e executes processing for switching the image processing set as the first image processing in correspondence to the value setting at the dial image 60. When the photographic scene is categorized as "portrait", the image processing "portrait" is set as the first image processing in the ring image 50. As long as the setting value in the dial image is "0", the processing execution unit 14e sustains "portrait" for the first image processing (i.e., it does not alter the contents of the first image processing). When the setting value is "+1", the processing execution unit 14e selects "vivid" as the first image processing, when the setting value is "+2", the processing execution unit 14e selects "toy camera" as the first image processing, and when the setting value is "+3", the processing execution unit 14e selects "select color" as the first image processing. In addition, when the setting value is "−1", the processing execution unit 14e selects "cross-process (B)" as the first image processing, when the setting value is "−2", the processing execution unit 14e selects "filter monochrome (sepia)" as the first image processing, and when the setting value is "−3", the processing execution unit 14e selects "avant-garde" as the first image processing. Namely, unless the value setting is "0", the processing execution unit 14e switches the image processing designated as the first image processing.

As explained earlier, the live view image having undergone the first image processing alone is brought up on display at the display unit 17 when the cursor 52 is at the first position P1 in the ring image 50. As the user performs an operation on the dial image 60 in this state to switch the image processing to be set as the first image processing in the ring image 50, the switch is reflected in the live view image. As a result, the user is able to switch the first image processing set in the ring image 50 to desired image processing by performing an operation on the dial image 60 while checking the results of the switch on the live view image.

The function assigned to the dial image 60 when the cursor 52 is at a position among the second position through the 16th position in the ring image 50 (i.e., a position between the first position P1 and the 17th position P17) is a function that allows adjustment in the manner with which the image processing unit 14c alters the ratio for the first image processing and the ratio for the second image processing in correspondence to the position of the cursor 52. Based upon the value setting in the dial image 60, the processing execution unit 14e executes processing for adjustment of the manner with which the ratios for the first image processing and the second image processing change.

Figure 18:
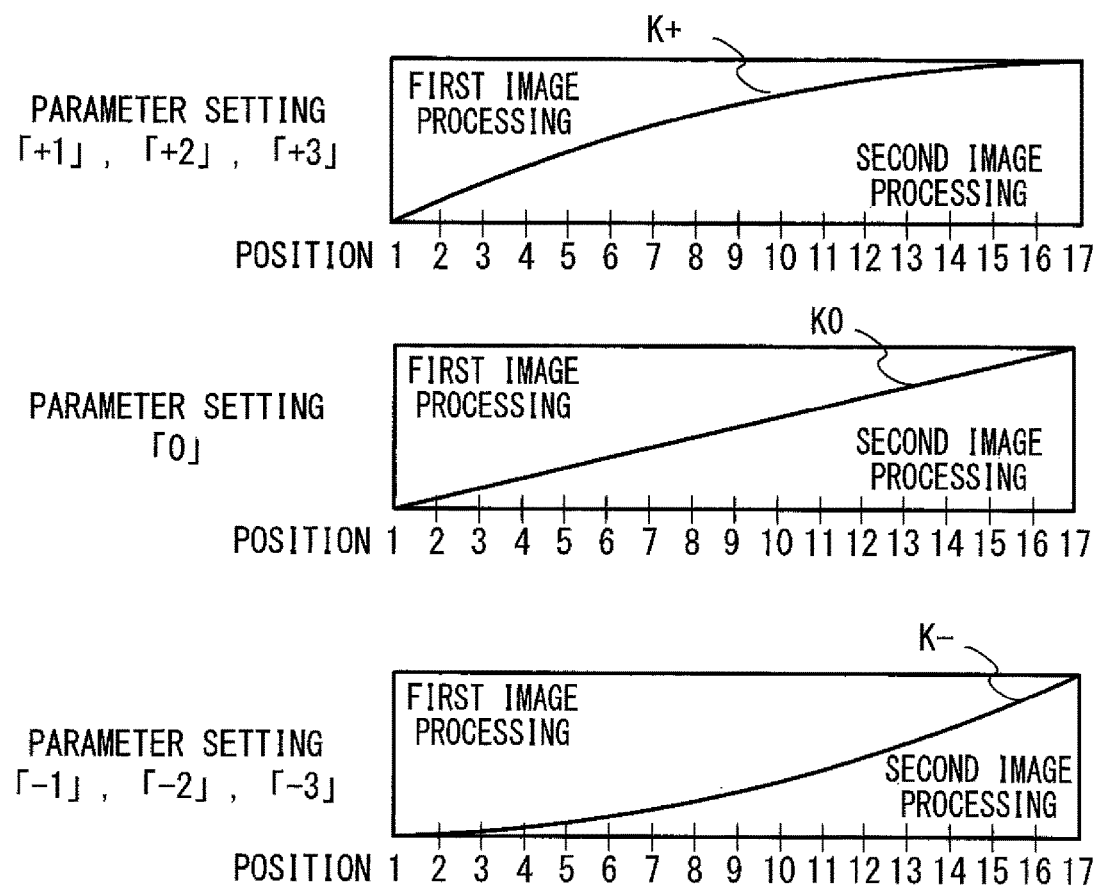

FIG. 18 presents diagrams each showing a change curve based upon which the ratios for the first image processing and the second image processing are changed. The figure provides three different change curves K0, K+ and K−. In FIG. 18, positions on the ring image 50 are indicated along the horizontal axis. The ratio for the first image processing is indicated on the side of the vertical axis upward relative to the change curve, whereas the ratio for the second image processing is indicated on the side of the vertical axis downward relative to the change curve. In each change curve, the ratio for the first image processing is 100% and the ratio for the second image processing is 0% at the first position P1 and the ratio for the first processing is 0% and the ratio for the second image processing is 100% at the 17th position P17.

When the value setting is "0", the processing execution unit 14e changes the ratios for the first image processing and the second image processing as indicated by the change curve K0. The change curve K0 is actually a straight line. Accordingly, when the image processing ratios change as indicated by the change curve K0, the ratio for the first image processing changes rectilinearly from 100% to 0% and the ratio for the second image processing also changes rectilinearly from 0% to 100% as the cursor 52 moves from the first position P1 to the 17th position P17. Namely, the live view image undergoes a change with a uniform proportion to the extent to which the cursor 52 moves.

When the value setting is on the positive side ("+1", "+2" or "+3"), the processing execution unit 14e alters the ratios for the first image processing and the second image processing as indicated by the change curve K+. The change curve K+ projects upward, as shown in FIG. 18. Accordingly, while the image processing ratios change as indicated by the change curve K+ as the cursor 52 moves from the first position P1 to the 17th position P17, the ratio for the first image processing is lowered (i.e., the ratio for the second image processing is raised) faster relative to the change curve K0. Namely, when the cursor 52 is at a position closer to the first position P1, the extent to which the live view image changes relative to the distance over which the cursor 52 moves is greater, whereas when the cursor 52 is at a position closer to the 17th position P17, the extent to which the live view image changes relative to the distance over which the cursor 52 moves is smaller.

When the value setting is on the negative side ("−1", "−2" or "−3"), the processing execution unit 14e alters the ratio for the first image processing and the second image processing as indicated by the change curve K−. The change curve K− projects downward, as shown in FIG. 18. Accordingly, while the image processing ratios change as indicated by the change curve K− as the cursor 52 moves from the first position P1 to the 17th position P17, the ratio for the first image processing is lowered (i.e., the ratio for the second image processing is raised) slower relative to the change curve K0. Namely, when the cursor 52 is at a position closer to the first position P1, the extent to which the live view image changes relative to the distance over which the cursor 52 moves is smaller, whereas when the cursor 52 is at a position closer to the 17th position P17, the extent to which the live view image changes relative to the distance over which the cursor 52 moves is greater.

This function allows the user to adjust the manner with which the ratios for the first image processing and the second image processing are altered as desired by performing an operation on the dial image 60 when the cursor 52 is at a position among the second position through the 16th position in the ring image 50.

In addition, the function assigned to the dial image 60 when the cursor 52 is at the 17th position P17 in the ring image 50 is a function that allows switchover of image processing to be set as the second image processing in the ring image 50. Namely the processing execution unit 14e executes processing for switching the image processing set as the second image processing in correspondence to the value setting at the dial image 60. Since this processing is similar to that executed when the cursor 52 is at the first position P1, it will not be described in specific detail.

The function assigned to the dial image 60 when the cursor 52 is at a position among the 18th position through the 32nd position in the ring image 50 is a function that allows adjustment in the manner with which the image processing unit 14c alters the ratios for the second image processing and the ratio for the third image processing in correspondence to the position of the cursor 52. Namely, based upon the value setting in the dial image 60, the processing execution unit 14e executes processing for adjustment of the manner with which the ratios for the second image processing and the third image processing change. Since this processing is similar to that executed when the cursor 52 is at a position among the second position P2 through the 16th position P16, it will not be described in specific detail.

In addition, the function assigned to the dial image 60 when the cursor 52 is at the 33rd position P33 in the ring image 50 is a function that allows switchover of image processing to be set as the third image processing in the ring image 50. Namely the processing execution unit 14e executes processing for switching the image processing set as the third image processing in correspondence to the value setting at the dial image 60. Since this processing is similar to that executed when the cursor 52 is at the first position P1, it will not be described in specific detail.

The function assigned to the dial image 60 when the cursor 52 is at a position among the 34th position through the 48th position in the ring image 50 is a function that allows adjustment in the manner with which the image processing unit 14c alters the ratio for the third image processing and the ratio for the fourth image processing in correspondence to the position of the cursor 52. Namely, based upon the value setting in the dial image 60, the processing execution unit 14e executes processing for adjustment of the manner with which the ratios for the third image processing and the fourth image processing change. Since this processing is similar to that executed when the cursor 52 is at a position among the second position P2 through the 16th position P16, it will not be described in specific detail, In addition, the function assigned to the dial image 60 when the cursor 52 is at the 49th position P49 in the ring image 50 is a function that allows switchover of image processing to be set as the fourth image processing in the ring image 50. Namely the processing execution unit 14e executes processing for switching the image processing set as the fourth image processing in correspondence to the value setting at the dial image 60. Since this processing is similar to that executed when the cursor 52 is at the first position P1, it will not be described in specific detail, The function assigned to the dial image 60 when the cursor 52 is at a position among the 50th position through the 64th position in the ring image 50 is a function that allows adjustment in the manner with which the image processing unit 14*c* alters the ratio for the fourth image processing and the ratio for the first image processing in correspondence to the position of the cursor 52. Namely, based upon the value setting in the dial image 60, the processing execution unit 14*e* executes processing for adjustment of the manner with which the ratios for the fourth image processing and the first image processing change. Since this processing is similar to that executed when the cursor 52 is at a position among the second position P2 through the 16th position P16, it will not be described in specific detail.

In addition, the function assigned to the dial image 60 when the cursor 52 is at the 65th position P65 in the ring image 50 is a function that allows switchover of image processing to be set as the first image processing in the ring image 50. Namely the processing execution unit 14*e* executes processing for switching the image processing set as the first image processing in correspondence to the value setting at the dial image 60. Since this processing is similar to that executed when the cursor 52 is at the first position P1, it will not be described in specific detail.

As described above, different functions are assigned to the dial image 60 depending upon the position taken by the cursor 52 in the ring image 50, i.e., the position selected by the position selection unit 14*b*.

Next, the flow of the processing executed by the control unit 14 in the creative mode will be explained in reference to the flowchart presented in FIG. 19 and FIG. 20. As the shooting mode is switched to the creative mode, the control unit 14 brings up a live view image display and also starts up a program enabling the processing shown in FIG. 19 and FIG. 20, which is stored in a memory (not shown) so as to start the processing in FIG. 19 and FIG. 20.

In step S1, the display control unit 14*a* brings up on display the ring image 50, and the operation proceeds to step S2.

The control unit 14 starts scene categorization processing for photographic scene categorization, and then the operation proceeds to step S3. It is to be noted that the scene categorization processing is repeatedly executed over predetermined time intervals. In addition, the control unit 14 adjusts focus on a given subject by repeatedly executing AF (autofocus) processing so as to ensure that the scene categorization processing is executed correctly.

In step S3, the control unit 14 makes a decision as to whether or not a drag operation has been performed with the cursor 52 in the ring image 50 via the touch panel 16*b*. If a drag operation has not been performed, the control unit 14 makes a negative decision in step S3. In this case, it repeatedly executes the processing in step S3 and continues to execute the scene categorization processing. If, on the other hand, a drag operation has been performed, the control unit 14 makes an affirmative decision in step S3 and the operation proceeds to step S4.

In step S4, the scene control unit 14 suspends the scene categorization processing and confirms the photographic scene category, determined at the time point at which the drag operation was performed, as photographic scene categorization results. The control unit 14 then sets the first image processing through the fourth image processing corresponding to the photographic scene category thus confirmed in the ring image 50 as has been explained earlier in reference to FIG. 4.

The control unit 14 also controls the aperture number at the image-capturing optical system 11 in correspondence to the photographic scene category confirmed in step S4. The optimal aperture setting corresponding to each photographic scene category is stored in advance in a memory (not shown) in the digital camera 1B in the embodiment. For instance, the maximum aperture number is selected in correspondence to the photographic scene "portrait" and the aperture number F8 is selected in correspondence to the photographic scene "landscape". The control unit 14 controls the aperture number at the image-capturing optical system 11 so as to achieve the aperture number selected in correspondence to the photographic scene category having been confirmed as described above. In the subsequent live view image/still image-capturing processing, the control unit 14 executes exposure control (control of the shutter speed, the ISO sensitivity and the like) in an aperture-priority mode.

Figure 21:
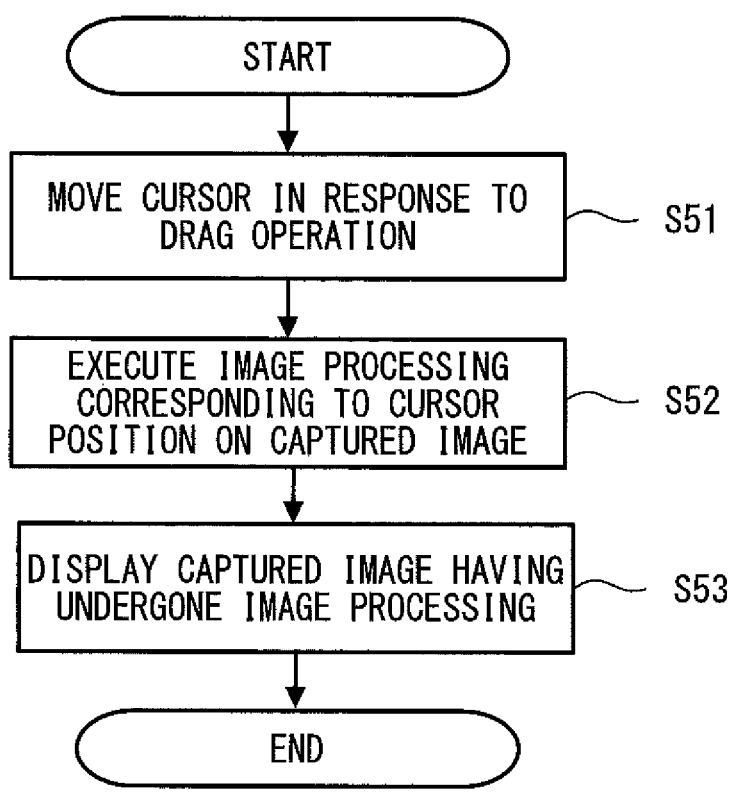
FIG. 21 A flowchart of the image processing executed in correspondence to the cursor position in the ring image FIG. 22 A flowchart of the processing executed in correspondence to the value setting selected in the dial image FIG. 23 A block diagram presenting an example of a structure that may be adopted in the digital camera achieved in a third embodiment of the present invention FIG. 24 An illustration of a ring image FIG. 25 A diagram indicating the image processing selected in correspondence to various cursor positions FIG. 26 Diagrams each indicating an image processing combination corresponding to a specific subject type FIG. 27 An illustration of the processing executed to adjust the display size of the ring image FIG. 28 A flowchart of the processing executed in the creative mode FIG. 29 A flowchart of the image processing executed in correspondence to the cursor position FIG. 30 A flowchart of the processing executed to adjust the display size of the ring image FIG. 31 A flowchart of the processing in continuation from FIG. 30

In step S5, the control unit 14 executes processing so as to apply the image processing corresponding to the position of the cursor 52 in the ring image 50, to the captured image, as explained earlier. The flow of this processing will be now described in reference to the flowchart presented in FIG. 21. In step S51, the position selection unit 14*b* moves the cursor 52 (i.e., the selected position) in response to a drag operation performed with the cursor 52 in the ring image 50, and the operation proceeds to step S52.

In step S52, the image processing unit 14*c* executes the image processing corresponding to the positions of the cursor 52, on the captured image as has been explained in reference to FIG. 15 and FIG. 3, and the operation proceeds to step S53.

In step S53, the display control unit 14*a* brings up the captured image having undergone the image processing executed by the image processing unit 14*c* on display at the display unit 17 as a live view image. Subsequently, the control unit 14 ends the processing in FIG. 21 and proceeds to step S6 in FIG. 19.

Figure 22:
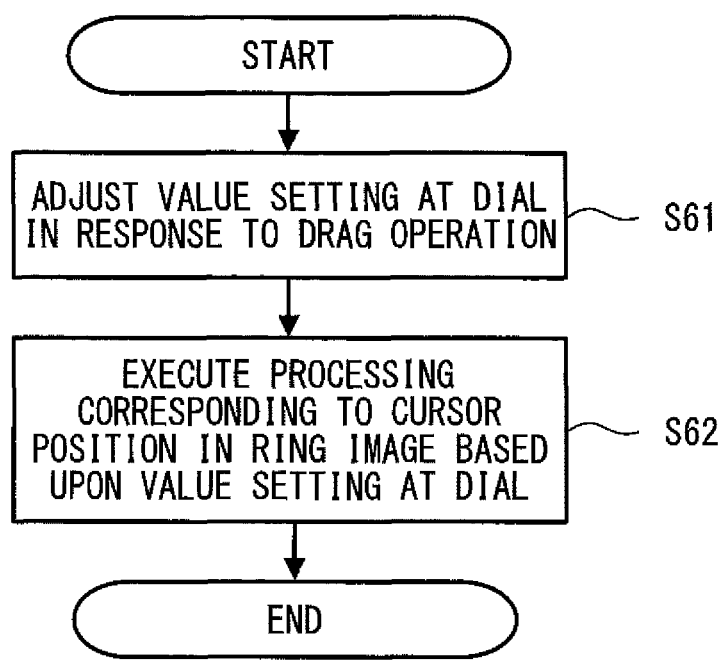

In step S6, the control unit 14 executes the processing corresponding to the value setting in the dial image 60 as explained earlier. The flow of this processing will be described in reference to the flowchart presented in FIG. 22. In step S61, the parameter adjustment unit 14*d* adjusts the value setting in the dial image 60 by rotating the dial 61 in response to a drag operation performed on the dial 61 in the dial image 60, and then the operation proceeds to step S62.

In step S62, the processing execution unit 14*e* executes the processing corresponding to the position of the cursor 52 in the ring image 50, i.e., corresponding to the position selected by the position selection unit 14*b*, based upon the value setting in the dial image 60, as has been explained earlier in reference to FIG. 17. The control unit 14 then ends the processing in FIG. 22 and proceeds to step S7 in FIG. 20.

In step S7, the control unit 14 makes a decision as to whether or not the shutter button has been pressed halfway down. If the shutter button has not been pressed halfway down, the control unit 14 makes a negative decision in step S7 and the operation returns to step S5. Namely, until the shutter button is pressed halfway down, the control unit 14 repeatedly executes the image processing corresponding to the position of the cursor 52 in the ring image 50 (see FIG. 21) and the processing corresponding to the value setting in the dial image 60 (see FIG. 22). If, on the other hand, the shutter button has been pressed halfway down, the control unit 14 makes an affirmative decision in step S7 and the operation proceeds to step S8.

In step S8, the image processing unit 14*c* confirms the image processing set in correspondence to the position taken by the cursor 52 at the time point at which the shutter button 16*a* was pressed halfway down (i.e., the image processing applied to the captured image at the time point) as the image processing to be applied to the still image. The display control unit 14a then clears the ring image 50 and the dial image 60 from the display, before the operation proceeds to step S9.

In step S9, the control unit 14 executes AF processing in an automatic mode switchover AF mode for automatic switchover of the AF mode from a single AF mode in which a fixed focus position is assured to a continuous AF mode, in which the focus position follows a moving subject, or vice versa, and then the operation proceeds to step S10. In the automatic mode switchover AF mode, the focus position is fixed once focus is adjusted onto the subject at the time point at which the shutter button 16a is pressed halfway down. Then, if the subject moves and the distance between the digital camera 1B and the subject changes, the AF mode automatically switches to the continuous AF mode so as to keep focus on the subject.

In step S10, a decision is made as to whether or not the shutter button has been pressed all the way down. If the shutter button has not been pressed all the way down, the control unit 14 makes a negative decision in step S10 and repeatedly executes the processing in step S10. If, on the other hand, the shutter button has been pressed all the way down, the control unit 14 makes an affirmative decision in step S10 and the operation proceeds to step S11.

In step S11, the control unit 14 engages the image sensor 12 in still image-capturing processing. The image processing unit 14c executes the image processing having been confirmed in step S8 on captured image data obtained through this image-capturing processing. The control unit 14 then records the captured image data having undergone the image processing into the recording medium 18 as still image data, and then the operation proceeds to step S12.

Figure 19:
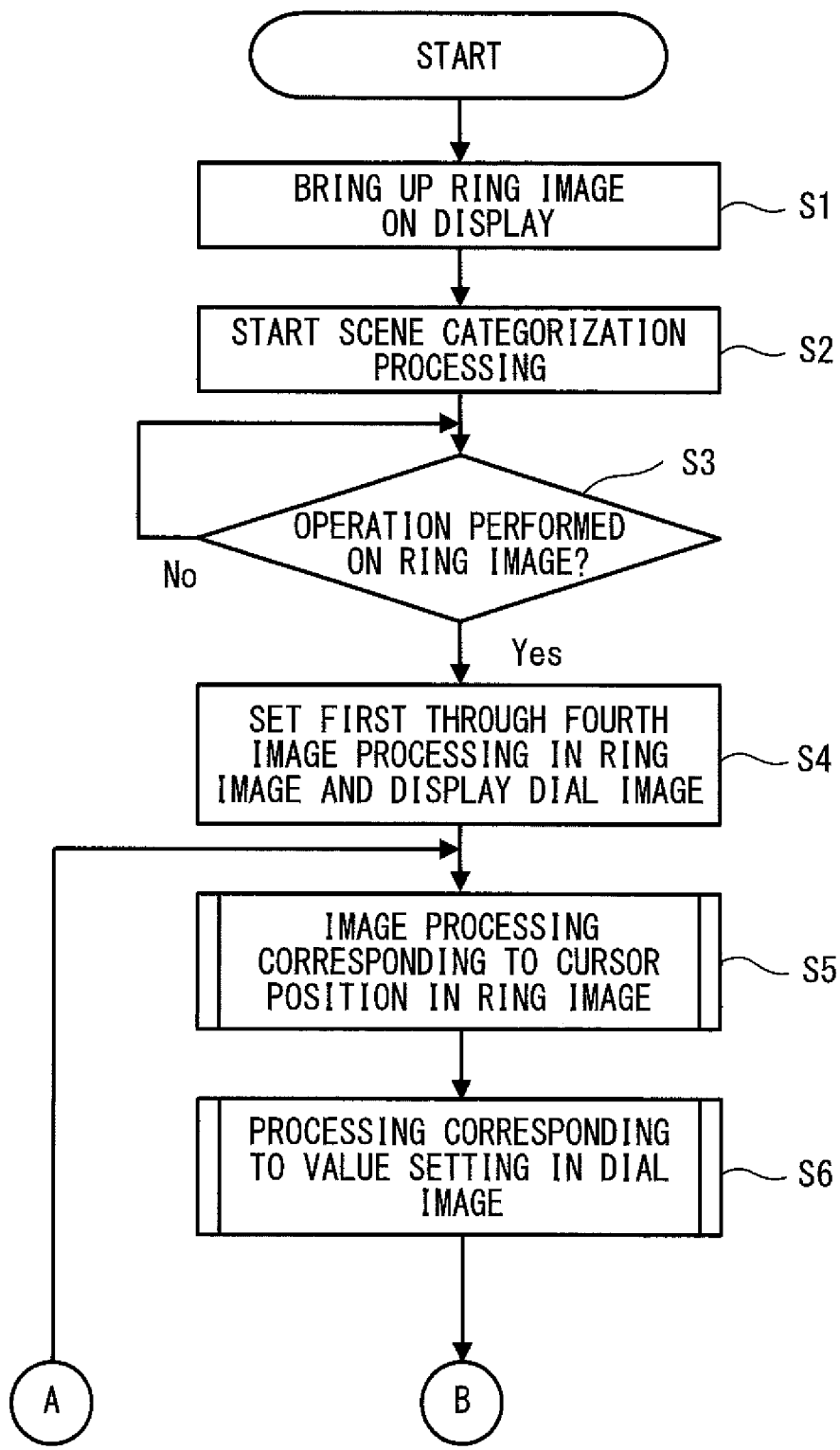
Figure 20:
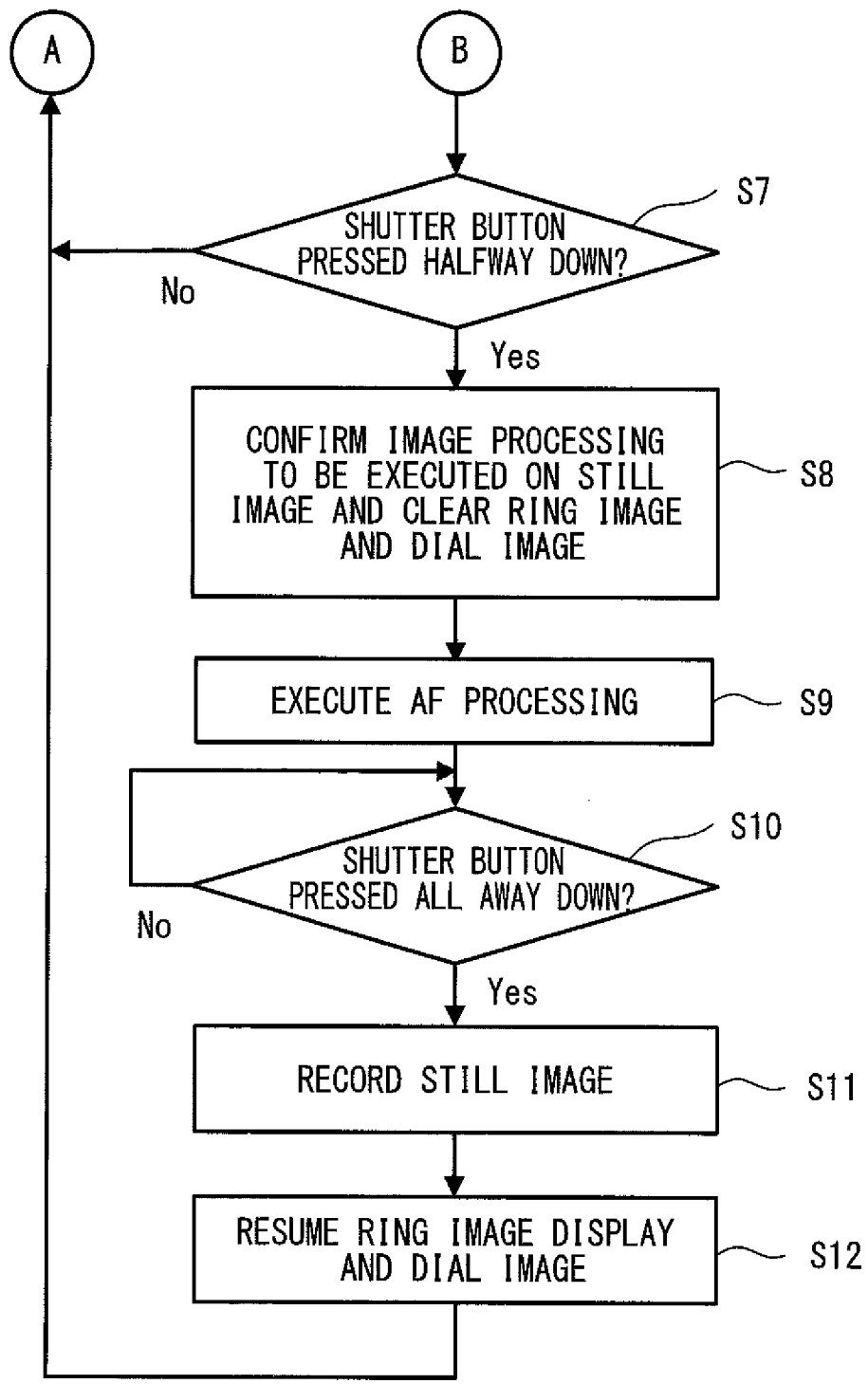

In step S12, the control unit 14 brings up the live view image, the ring image 50 and the dial image 60 on display again, before the operation returns to step S5 in FIG. 19. Namely, even after the still image shooting operation ends, the settings for the first image processing through the fourth image processing, having been set in step S4, are sustained in the ring image 50. These measures are taken so as to preempt confusion that the user is likely to experience if the contents of the first image processing through the fourth image processing set in the ring image 50 changed for each still image shooting operation.

The user, wishing to alter settings for the first image processing through the fourth image processing in the ring image 50 up on display only needs to press down the OK button in the operation member 16 to reset the first image processing through the fourth image processing. As the OK button is pressed while the ring image 50 is on display, the control unit 14 clears (resets) the current settings for the first image processing through the fourth image processing in the ring image 50. The position selection unit 14b resets the cursor 52 to the initial position (0th position) P0. Subsequently, the control unit 14 resumes the processing in FIG. 5, starting in step S2.

It is to be noted that if the user does not perform a drag operation with the cursor 52 in the ring image 50 even once before pressing the shutter button 16a halfway down in the creative mode, the control unit 14 clears the ring image 50 from the display and executes processing similar to that executed in the normal mode. Namely, the control unit 14 executes AF processing in the automatic mode switchover AF mode described earlier. Subsequently, as the shutter button 16a is pressed all the way down, the control unit 14 engages the image sensor 12 in still image-capturing processing and records the resulting captured image data into the recording medium 18 as still image data. The control unit 14 then returns to step S1 in FIG. 19 to start the processing again.

The following advantages and operations are achieved through the second embodiment described above.

The image processing unit 14c in the digital camera 1B changes the image processing to be applied to the captured image in correspondence to the position of the cursor 52 in the ring image 50, i.e., in correspondence to the position selected by the position selection unit 14b. In addition, the display control unit 14a brings up the dial image 60, which is used to adjust a parameter (value setting) for specific processing, other than the first image processing through the fourth image processing, to be executed on the captured image, on display at the display unit 17. In response to a drag operation performed on the dial image 60, the perimeter adjustment unit 14d adjusts the parameter (value setting). The processing execution unit 14e executes the specific processing by using the parameter (value setting) having been adjusted by the parameter adjustment unit 14d. Different types of processing are executed as the specific processing when the 0th position P0 is selected by the position selection unit 14b, when a position among the first position P1, the 17th position P17, the 33rd position P33, the 49th position P49 and the 65th position P65 is selected by the position selection unit 14b and when a position among the second position through the 16th position, the 18th position through the 32nd position, the 34th position through the 48th position and the 50th position through the 64th position is selected by the position selection unit 14b. The specific processing executed when the 0th position P0 is selected by the position selection unit 14b is the photographic setting processing explained earlier. The specific processing executed when a position among the first position P1, the 17th position P17, the 33rd position P33, the 49th position P49 and the 65th position P65 is selected by the position selection unit 14b, is the processing for switching to the corresponding processing set as the first image processing through the fourth image processing set in the ring image 50. The specific processing executed when a position among the second position through the 16th position, the 18th position through the 32nd position, the 34th position through the 48th position and the 50th position through the 64th position is selected by the position selection unit 14b is the processing for altering the manner with which the ratios for the two types of image processing executed on the captured image change. The user of the digital camera 1B described above is able to alter the contents of the image processing executed on the captured image by simply moving the position of the cursor 52 in the ring image 50. In addition, other settings (including adjustment of a photographic setting, switching image processing to be set in the ring image 50 and altering the ratios of the two types of image processing executed on the captured image) can be adjusted with ease by simply performing an operation on the dial image 60 in the digital camera 1B. Moreover, since the function assigned to the dial image 60 can be switched in correspondence to the position of the cursor 52 in the ring image 50, the user is able to select various settings simply by performing an operation on the dial image 60. This means that the user of the digital camera 1B achieved in the embodiment is able to select various settings with ease simply by performing an operation on the dial image 60 without having to navigate through numerous settings menus or through a hierarchical settings menu.

The following method is disclosed as an operation method that allows the use of various image effects in combination in PTL 1 describing the related art. Namely, an effects menu, in which at least one of a plurality of image effects is selected or a slide menu used when adjusting the effect level of the selected image effect is brought up on display over the live view image at the digital camera. The image effect selected through the effects menu and the slide menu is reflected on the live view image at the digital camera.

However, there is an issue in the related art in that the user, wishing to select a plurality of image effects, needs to know in advance which effects menu to open in order to set desired image processing. Otherwise, he will not be able set the image effects he wants. A similar issue must be addressed with regard to a plurality of image effect levels, and unless the user knows in advance how much change is to occur when an image effect level is adjusted, he cannot select the image effect level he wants. The digital camera 1B achieved in the embodiment is distinct in that image processing suitable for each photographic scene category is set in the ring image 50 in correspondence to the particular photographic scene category. As a result, the user does not need to be knowledgeable about image processing and is still able to select desired image processing from types of image processing suited for a specific photographic scene category.

Furthermore, there is an issue in the related art in that while a plurality of image effects can be set in an effects menu, the image effect levels need to be set in the slide menu one layer down in the hierarchical order, necessitating the operation to be performed over different hierarchical levels. In addition, depending upon the specifications of the digital camera, settings other than the image effects and image effect levels may need to be selected in separate menus or it may not even be possible to select such settings. Thus, the user operations are bound to become complicated or the user may not be able to select other settings. The digital camera 1B achieved in the embodiment is distinct in that the dial image 60 is brought up on display in addition to the ring image 50. A photographic setting can be adjusted, the image processing set in the ring image 50 can be switched or the manner with which the ratios of different types of image processing executed on the captured image are altered can be adjusted in response to an operation performed on the dial image 60 at the digital camera 1B. As a result, other settings, as well as the settings for the image processing to be executed on the captured image, can be selected through a simple operation.

(Variation 1)

The processing currently set as the second through fourth image processing may be included as image processing options that may be selected through an operation at the dial image 60 when, for instance, the cursor 52 is at the first position P1 in the ring image 50. In this case, if the image processing currently set as the second image processing is selected for the first image processing through an operation performed on the dial image 60 while the cursor 52 is at the first position P1, the processing execution unit 14e may switch the image processing settings for the first image processing and the second image processing.

For instance, assuming that the photographic scene has been categorized as the image processing "portrait", the image processing "portrait" is set for the first image processing and the image processing "monochrome" is set for the second image processing in the ring image 50. If an operation is performed on the dial image 60 to select "monochrome" for the first image processing while the cursor 52 is at the first position P1, "portrait" is set for the second image processing.

It is to be noted that image processing options similar to those available when the cursor 52 is at the first position P1 may be also made available when the cursor 52 is at the 17th position P17, at the 33rd position P33, at the 49th position P49 and at the 65th position P65 in the ring image 50.

(Variation 2)

In the embodiment described above, an adjustment can be made only with regard to the first image processing through an operation on the dial image 60 when the cursor 52 is at the first position P1 in the ring image 50. As an alternative, an adjustment for the first image processing through the fourth image processing may be made all at once through an operation on the dial image 60. For instance, when the photographic scene has been categorized as "portrait", four types of image processing corresponding to "portrait" are set as the first image processing through the fourth image processing. In this situation, the processing execution unit 14e may switch the first image processing through the fourth image processing to the four types of image processing corresponding to the photographic scene category "close-up" if the value setting is "+1".

Likewise, the first image processing through the fourth image processing may be switched all at once through an operation on the dial image 60 when the cursor 52 is at the 17th position P17, at the 33rd position P33, at the 49th position P49 and at the 65th position P65 in the ring image 50.

(Variation 3)

While the image processing currently set for the second image processing can be switched to another type of image processing through an operation on the dial image 60 when the cursor 52 is at the 17th position P17 in the ring image 50, another option "none" may also be made available in this situation. For instance, the processing execution unit 14e may select "none" for the second image processing if the value setting in the dial image 60 is "+3". When this setting is selected with the cursor 52 set at a position among the second position through the 32nd position, the image processing unit 14c applies the first image processing and the third image processing in combination on the live view image. In addition, as the cursor 52 moves toward the 33rd position P33, the image processing unit 14c adjusts the image processing ratios so as to lower the ratio for the first image processing and raise the ratio for the third image processing, and as the cursor 52 moves toward the first position P1, the image processing unit 14c alters the image processing ratios so as to raise the ratio for the first image processing and lower the ratio for the third image processing.

It is to be noted that "none" may be also made available as an option in the dial image 60 when the cursor 52 is at the 33rd position P33 and at the 49th position P49 in the ring image 50.

(Variation 4)

In the embodiment described above, the change curve to be used to adjust the ratio for the first image processing and the second image processing is selected from three different change curves through an operation performed on the dial image 60 when the cursor 52 is at a position among the second position through the 16th position in the ring image 50. As an alternative, the processing execution unit 14e may adjust the shape of the change curve in correspondence to the position of the cursor 52 in the ring image 50 and the value setting in the dial image 60.

In such a case, the processing execution unit 14e alters the shape of the change curve so that the ratios for the first image processing and the second image processing at a given position taken by the cursor 52 in the ring image 50 are adjusted in correspondence to the value setting in the dial image 60. For instance, the initial change curve may be a rectilinear curve. In this state, an operation may be performed on the dial image 60 to select a positive value for the value setting with the cursor 52 set at a position among the second position through the 16th position in the ring image 50. In response, the processing execution unit 14e alters the shape of the change curve so that the ratio for the first image processing is lowered by a predetermined value and the ratio for the second image processing is raised by the predetermined value, relative to the ratios taken on the rectilinear change curve in correspondence to the current position of the cursor 52. The processing execution unit 14e takes a greater value for the extent of change in the ratios in correspondence to a greater value setting. In addition, an operation may be performed on the dial image 60 to select a negative value for the value setting with the cursor 52 set at a position among the second position through the 16th position in the ring image 50. In response, the processing execution unit 14e alters the shape of the change curve so that the ratio for the first image processing is raising by a predetermined value and the ratio for the second image processing is lowered by the predetermined value, relative to the ratios taken on the rectilinear change curve in correspondence to the current position taken by the cursor 52. The processing execution unit 14e takes a greater value for the extent of change in the ratios in correspondence to a smaller value setting (in correspondence to a greater absolute value).

It is to be noted that alterations in the change curve similar to that made when the cursor 52 is set at a position among the second position through the 16th position may be made when the cursor 52 is set at a position among the 18th position through the 32nd position in the ring image 50, when the cursor 52 is set at a position among the 34th position through the 48th position in the ring image 50 and when the cursor 52 is set at a position among the 50th position and the 64th position in the ring image 50, as well.

(Variation 5)

In the embodiment described above, the function assigned to the dial image 60 when the cursor 52 is set at a position among the second position through the 16th position in the ring image 50 is the function that allows adjustment in the manner with which the ratios for the first image processing and the second image processing are adjusted. As an alternative, a function that allows fine adjustment of the ratios for the first image processing and the second image processing executed by the image processing unit 14c in correspondence to the current position of the cursor 52 may be assigned to the dial image 60.

The processing execution unit 14e in this variation executes processing through which the ratios for the first image processing and the second image processing are fine-adjusted in correspondence to the value setting in the dial image 60 within a ratio range defined by the ratios corresponding to the positions next to the current position taken by the cursor 52 in the ring image. When the ratios for the first image processing and the second image processing change in 16 steps corresponding to the first position P1 through the 17th position P17 as in the embodiment described above, the image processing ratios set for the eighth position is "56.25% for the first image processing and 43.75% for the second image processing", the image processing ratios set for the ninth position is "50% for the first image processing and 50% for the second image processing" and the image processing ratios set for the tenth position is "43.75% for the first image processing and 56.25% for the second image processing". Accordingly, assuming that the cursor 52 is currently set at the ninth position, the ratios for the first image processing and the second image processing can be fine-adjusted in correspondence to the value setting in the dial image 60 over the ratio range of "56.25% for the first image processing, 43.75% for the second image processing" through "43.75% for the first image processing, 56.25% for the second image processing".

It is to be noted that fine adjustment similar to that executed when the cursor 52 is set at a position among the second position through the 16th position in the ring image 50 may be made when the cursor 52 is set at a position among the 18th position through the 32nd position, when it is set at a position among the 34th position through the 48th position and when it is set at a position among the 50th position through the 64th position, as well.

(Variation 6)

In the embodiment described above, the function assigned to the dial image 60 when the cursor 52 is set at a position among the second position through the 16th position in the ring image 50 is the function that allows adjustment in the manner with which the ratios for the first image processing and the second image processing are adjusted. As an alternative, a function that allows adjustment of levels of the first image processing and the second image processing may be assigned as the function of the dial image 60. In addition, two dials may be displayed so as to allow the levels for the first image processing and the second image processing to be adjusted independently of each other.

The processing execution unit 14e in this variation adjusts the level of the first image processing in correspondence to the value setting at the dial corresponding to the first image processing and adjusts the level of the second image processing in correspondence to the value setting at the dial corresponding to the second image processing. For instance, the level may be raised when a greater value setting is selected at the dial and the level may be lowered when a smaller value setting is selected at the dial.

It is to be noted that through adjustment of the level of the first image processing, the level of the image processing set as the first image processing is altered. The level of the second image processing is adjusted in much the same way. For instance, the level of the image processing "vivid" set as the first image processing refers to the saturation level to be achieved through the image processing "vivid", whereas when "toy camera" is set as the first image processing, the level of the first image processing refers to the strength of the toy camera effect to be achieved through the image processing "toy camera".

It is to be noted that the image processing levels may be adjusted when the cursor 52 is set at a position among the 18th position through the 32nd position, the 34th position through the 48th position or the 50th position through the 64th position in the ring image 50 in a manner similar to that with which the image processing levels are adjusted when the cursor 52 is set at a position among the 2nd position through the 16th position.

(Variation 7)

Assuming that the image processing "select color" is set as the first image processing when the cursor 52 is set at the first position P1 in the ring image 50, a function that allows a change in the specific color to be retained through the image processing "select color" may be assigned as the function of the dial image 60. In addition, if "cross-process (B)" is set as the first image processing with the cursor 52 set at the first position P1 in the ring image 50, a function that allows the image processing set as the first image processing to be switched to either "cross-process (R)" or "cross-process (G)" may be assigned as the function of the dial image 60.

It is to be noted that when the cursor 52 is set at the 17th position P17, at the 33rd position P33, at the 49th position P49 and at the 65th position P65 in the ring image 50, functions similar to those assigned when the cursor 52 is set at the first position P1 as described above, may be assigned to the dial image 60.

(Variation 8)

While the ring image 50 and the dial image 60 are brought up on display together in the embodiment described above, the ring image 50 and the dial image 60 may be displayed separately from each other via a display switchover button or the like with which the display can be changed from the ring image 50 to the dial image 60 and vice versa.

(Variation 9)

While the image processing to be executed on the captured image can be adjusted in the ring image 50 in the still image shooting mode in the embodiment described above, the image processing to be executed on the captured image may also be adjusted in the ring image 50 in the video-shooting mode.

(Variation 10)

While the shutter is released in response to a user operation performed by pressing down the shutter button 16a in the embodiment described above, the present invention may be adopted in a system commonly referred to as a touch shutter system, in which the shutter is released in response to an operation performed by touching the touch panel 16b.

(Variation 11)

In the embodiment described above, the image processing to be applied to the captured image is selected from four types of processing (the first image processing through the fourth image processing) in correspondence to the position to which the cursor 52 is moved in the ring image 50. However, the number of image processing options available via the ring image 50 is not limited to four, and there may be two or three types of image processing options or there may be five or more image processing options.

In addition, while a position among the 0th position P0 through the 65th position P65 can be selected in the ring image 50 in the embodiment described above, the number of positions that may be selected is not limited to this example. In addition, while a value among "−3" through "+3" can be selected as the value setting in the dial image 60, the number of values that may be selected as the value setting is not limited to this example.

(Variation 12)

In the embodiment described above, the image processing to be applied to the captured image is selected in the ring image 50. However, the image brought up on display for these purposes does not need to have a ring shape and may instead assume the form of a bar. In addition, while the cursor 52 is moved in the example described above, the ring 51 may instead be made to move relative to a fixed cursor 52.

In addition, the dial image 60 is used as an image assigned with different functions in correspondence to the position of the cursor 52 in the ring image 50 in the embodiment described above. However, such an image does not need to take the form of a dial and may instead assume the form of a bar. In addition, while the dial 61 is made to move in the example presented above, the arrow mark 62 may be made to move instead, relative to a fixed dial 61.

(Variation 13)

While operations are performed on the ring image 50 and the dial image 60 by touching the touch panel 16b in the embodiment described above, the present invention is not limited to this example. Such operations may instead be performed on an operation member such as a rotary multi-selector or through an action of, for instance, tilting the casing of the digital camera 1B.

(Variation 14)

In the embodiment described above, the processing described in reference to FIG. 19 through FIG. 22 is executed as the control unit 14 executes a program recorded in a memory (not shown). This program may be provided in advance at the time of product shipment or it may be provided in a recording medium such as a memory card or on a data signal via the Internet after product shipment. The program may be provided to the digital camera 1B in manners similar to those described in reference to FIG. 13 except that, the digital camera taking in the program in this situation is the digital camera 1B instead of the digital camera 1 in FIG. 13. The program may be thus provided as a computer-readable computer program product assuming any of various modes including a recording medium and a data signal (carrier wave).

(Variation 15)

While the present invention is adopted in a digital camera in the second embodiment described above, the present invention is not limited to this example and it may be adopted in a portable telephone, a smart phone, a tablet terminal or the like.

(Third Embodiment)

Figure 23:
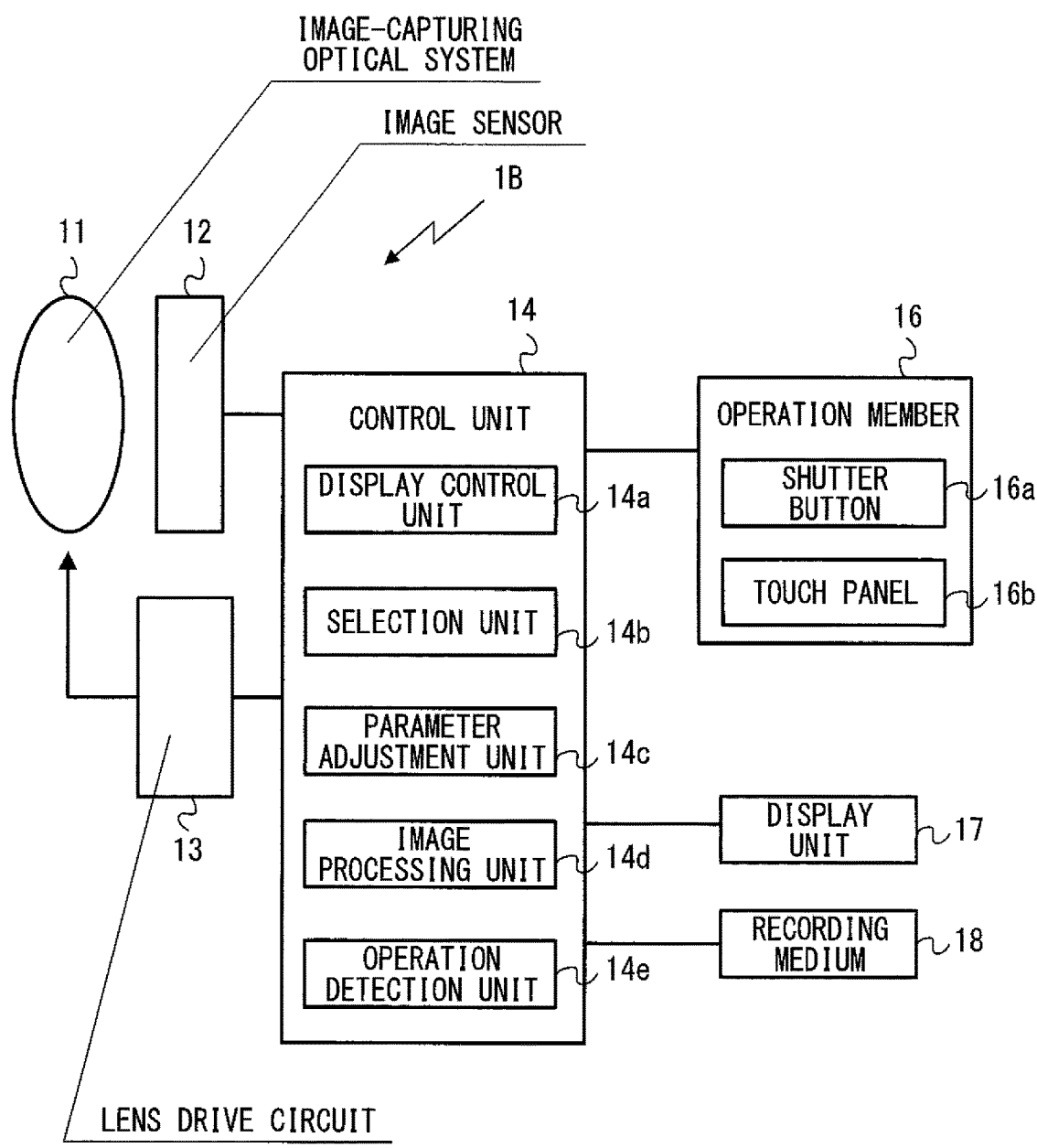

FIG. 23 is a block diagram showing the structure of a digital camera 1C achieved in the third embodiment. While the structure shown in FIG. 23 only partially differs from that in FIG. 1, it will be described as a separate embodiment. It is to be noted that the description given in reference to the current embodiment applies to all the elements in FIG. 23 even though some of them are assigned with the same reference numerals as those in FIG. 1.

The digital camera 1C comprises an image-capturing optical system 11, an image sensor 12, a lens drive circuit 13, a control unit 14, an operation member 16 and a display unit 17. A recording medium 18 such as a memory card can be loaded into and removed from the digital camera 1C.

The image-capturing optical system 11, configured with a plurality of lens groups including a zoom lens and a focusing lens, forms a subject image onto a light-receiving surface of the image sensor 12. It is to be noted that the image-capturing optical system 11 is shown as a single lens in FIG. 1 so as to simplify the illustration.

Under control executed by the control unit 14, the lens drive circuit 13 adjusts the focal length by driving the zoom lens in the image-capturing optical system 11 and also executes focus adjustment by driving the focusing lens in the image-capturing optical system 11.

The image sensor 12, which is an image sensor configured with, for instance, a CMOS image sensor, captures the subject image formed via the image-capturing optical system 11 and outputs image signals obtained through the image-capturing operation to the control unit 14.

The control unit 14 includes a display control unit 14a, a selection unit 14b, a parameter adjustment unit 14c, an image processing unit 14d and an operation detection unit 14e. The control unit 14, comprising a CPU, a memory and peripheral circuits, fulfills the functions of the various units listed above by executing a control program stored in the memory. The functions of the various units will be described in detail later.

At the display unit 17, configured with a liquid crystal monitor (back side monitor) or the like mounted on the rear surface of the digital camera 1, images captured via the image sensor 12, various types of settings menus and the like are displayed.

The operation member 16 includes a shutter button 16a, and a touch panel 16b disposed on the display unit 17. The touch panel 16b detects a contact position at which a finger or the like, comes into contact with the touch panel 16b and outputs the contact position thus detected to the control unit 14. The touch panel 16b in the embodiment is a multi-touch panel, capable of detecting multiple touches. Namely, it is capable of detecting at least two contact positions at which it is touched simultaneously with fingers or the like on the display screen of the display unit 17. The operation member 16 further includes a record button, a mode selector button, a cross key, an OK button, a display button and the like. The operation member 16 outputs an operation signal corresponding to a user operation to the control unit 14. The operation detection unit 14e in the control unit 14 detects, based upon the operation signal, a specific operation having been performed at the operation member 16.

In addition, as a shooting mode is set in response to an operation signal output from the operation member 16, the control unit 14 engages the image sensor 12 in live view image-capturing processing at a predetermined frame rate, generates frame images for display from the individual frame images obtained in time series from the image sensor 12 and outputs the display frame images to the display unit 17. As a result, real-time live view image display is provided at the display unit 17.

As the shutter button is pressed and a shooting instruction is issued, the control unit 14 engages the image sensor 12 in image-capturing processing to capture an image to be recorded, generates still image data by executing specific image processing on the image signals obtained from the image sensor 12, compresses the still image data in a predetermined format such as PEG and records the compressed data into the recording medium 18.

In addition, as the reproduce mode is set in response to an operation signal output from the operation member 16, the control unit 14 reads out and reproduces still image data recorded in the recording medium 18 and displays the reproduced image at the display unit 17.

At the digital camera 1C achieved in the embodiment, a shooting mode referred to as a creative mode, in which captured images having undergone various types of image processing can be obtained, is available in addition to the normal shooting mode. The following is a description of the creative mode.

Figure 24:
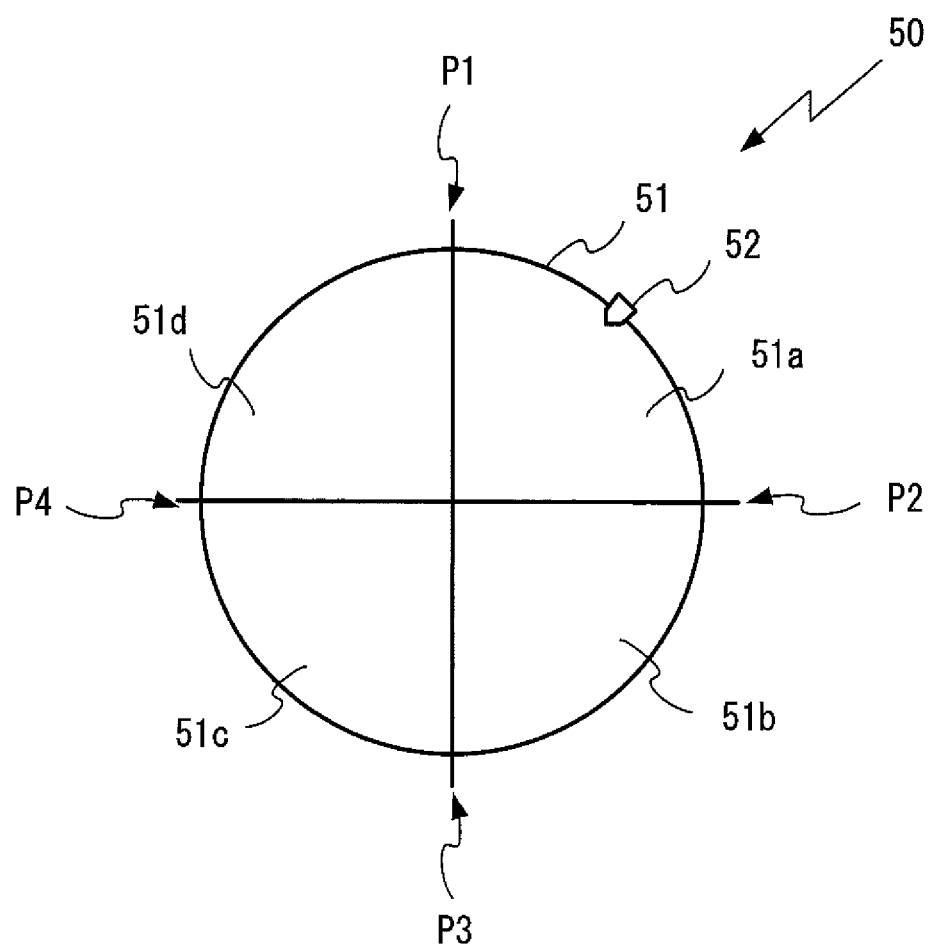

In the creative mode, the display control unit 14a in the control unit 14 brings up an image (hereafter referred to as a ring image) 50, used to adjust an image processing parameter pertaining to image processing to be applied to the captured image, on display at the display unit 17, as shown in FIG. 24. In the ring image 50, a circular ring 51 and a cursor 52 are displayed. The cursor 52 indicates a position selected by the selection unit 14b. The operation detection unit 14e detects a drag operation performed with the cursor 52 (e.g., an operation whereby the user firsts touches the display position at which the cursor 52 is displayed with his finger and moves the finger while maintaining contact). The selection unit 14b moves the selected position (i.e., the display position at which the cursor 52 is displayed) along the ring 51 in response to the drag operation performed on the cursor 52, detected by the operation detection unit 14e.

The parameter adjustment unit 14c in the control unit 14 adjusts an image processing parameter for image processing to be executed on the captured image as the display position at which the cursor 52 is displayed (i.e., the position selected by the selection unit 14b) changes. Based upon the image processing parameter having been adjusted by the parameter adjustment unit 14c, the image processing unit 14d in the control unit 14 executes the image processing on the captured image. The display control unit 14a brings up the captured image having undergone the image processing executed by the image processing unit 14d on display at the display unit 17.

The term "image processing parameter" is used in the description of the embodiment to refer to a parameter that indicates a ratio at which a specific type of image processing among four types of image processing (hereafter referred to as first image processing through fourth image processing) set in the ring image 50 is to be executed. The first image processing through the fourth image processing will be described in specific detail later.

The ring 51 in the ring image 50 is made up with a first ring segment 51a through a fourth ring segment 51d. The first ring segment 51a through the fourth ring segment 51d are each formed with a circular arc having a 90° central angle (i.e., a quarter circle). The first ring segment 51a ranges from the top point (first position) P1 of the ring 51 to a second position P2 set apart from the top point P1 by 90° along the clockwise direction. The second ring segment 51b ranges from the second position P2 of the ring 51 to a third position P3 set apart from the second position P2 by 90° along the clockwise direction. The third ring segment 51c ranges from the third position P3 of the ring 51 to a fourth position P4 set apart from the third position P3 by 90° along the clockwise direction. The fourth ring segment 51d ranges from the fourth position P4 of the ring 51 to the first position P1. It is to be noted that the ranges of the first ring segment 51a through the fourth ring segment 51d are indicated in the ring image 50 with, for instance, lines dividing the ring 51 into four portions.

Figure 25:
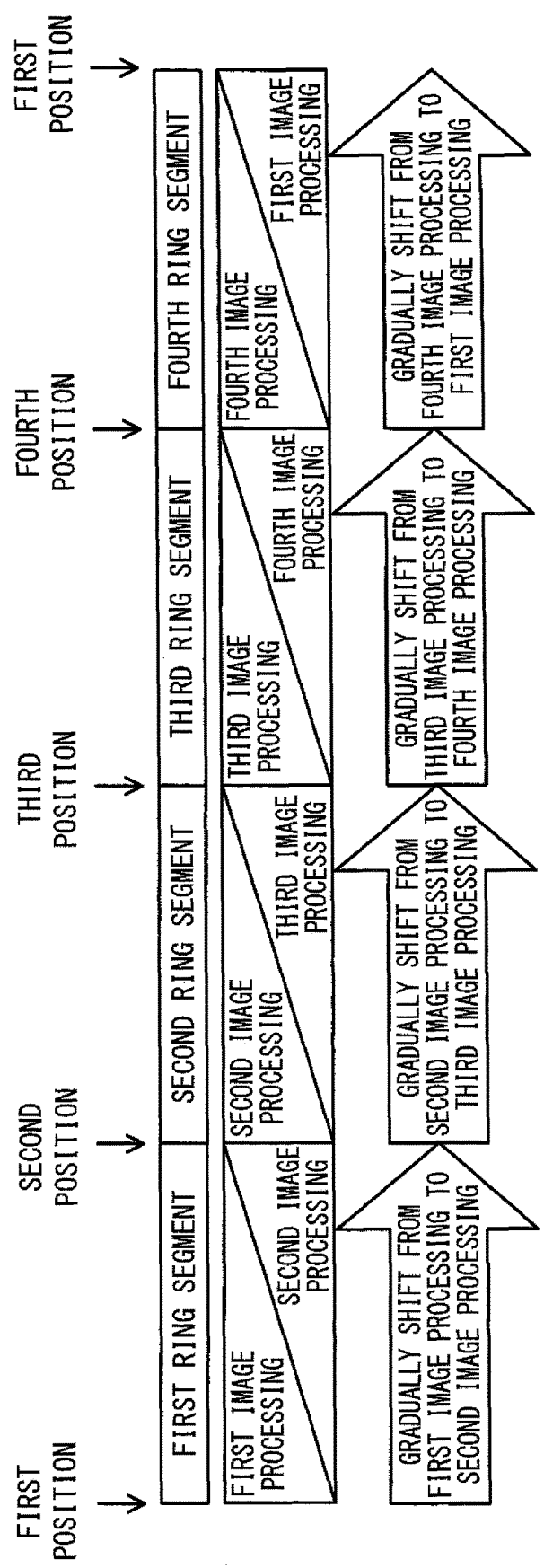

Next, in reference to FIG. 25, image processing parameters each set in correspondence to a specific position taken by the cursor 52 will be described. It is to be noted that an image processing parameter can be adjusted in steps in the ring image 50 and that the number of steps may be increased/decreased through a user operation. Processing executed to increase/decrease the number of adjustment steps for an image processing parameter will be explained later.

In the first ring segment 51a in the ring image 50, a first image processing parameter that indicates the ratios for the first image processing and the second image processing can be adjusted. When the selected position (the display position at which the cursor 52 is displayed) selected by the selection unit 14b is in the first ring segment 51a, the parameter adjustment unit 14c adjusts the first image processing parameter in correspondence to the selected position. As the cursor moves to the first position P1, the parameter adjustment unit 14c sets "first image processing 100% (a setting at which the first image processing alone is executed)" for the first image processing parameter. As the cursor moves to the second position P2, the parameter adjustment unit 14c sets "second image processing 100% (a setting at which the second image processing alone is executed)" for the first image processing parameter. In addition, while the cursor 52 moves from the first position P1 toward the second position P2, the parameter adjustment unit 14c adjusts the first image processing parameter from "first image processing 100%" toward "second image processing 100%" in steps.

Image processing parameters may be adjusted in a total of 16 steps over the entire ring image 50, and in such a case, the first image processing parameter can be adjusted from "first image processing 100%" toward "second image processing 100%" in four steps. Namely, it is adjusted from "first image processing 100%" to "first image processing 75%, second image processing 25% (a setting at which the first image processing and the second image processing are executed at a ratio of 75% to 25%)", to "first image processing 50%, second image processing 50%", then to "first image processing 25%, second image processing 75%" and finally to "second image processing 100%". Three points (hereafter will be referred to as position A, position B and position C) that divide the range between the first position P1 and the second position P2 into four equal portions are set. As the cursor 52 moves to position A, "first image processing 75%, second image processing 25%" is selected, as it moves to position B, "first image processing 50%, second image processing 50%" is selected, and as it moves to position C, "first image processing 25%, second image processing 75%" is selected.

It is to be noted that when the "first image processing 75%, second image processing 25%" setting, the "first image processing 50%, second image processing 50%" setting, or the "first image processing 25%, second image processing 75%" setting is selected, the first image processing and the second image processing are both executed (i.e., the first image processing and the second image processing are applied in combination). In addition, when the first image processing is executed at a ratio of 75%, for instance, the first image processing is executed so that the extent to which the captured image is to change through the first image processing is 75% of the extent occurring in the change in the captured image through exclusive execution of the first image processing on the captured image (i.e., by setting the ratio for the first image processing at 100%).

As described above, the parameter adjustment unit 14c adjusts the first image processing parameter in steps in correspondence to the position of the cursor 52 in the first ring segment 51a. As the cursor 52 moves from the first position P1 toward the second position P2 along the clockwise direction, the captured image on display at the display unit 17 gradually changes from the state having undergone the first image processing alone to the state having undergone the second image processing alone.

In the second ring segment 51b in the ring image 50, a second image processing parameter that indicates the ratios for the second image processing and the third image processing can be adjusted. When the selected position (the display position at which the cursor 52 is displayed) selected by the selection unit 14b is in the second ring segment 51b, the parameter adjustment unit 14c adjusts the second image processing parameter in correspondence to the selected position. As the cursor moves to the second position P2, the parameter adjustment unit 14c sets "second image processing 100%" for the second image processing parameter. As the cursor moves to the third position P3, the parameter adjustment unit 14c sets "third image processing 100%" for the second image processing parameter. In addition, while the cursor 52 moves from the second position P2 toward the third position P3, the parameter adjustment unit 14c adjusts the second image processing parameter from "second image processing 100%" toward "third image processing 100%" in steps. It is to be noted that since the adjustments made in specific instances are similar to those described in reference to the first ring segment 51a, a repeated explanation is not provided. As the cursor 52 moves from the second position P2 toward the third position P3 in the second ring segment 51b, along the clockwise direction, the captured image on display at the display unit 17 gradually changes from the state having undergone the second image processing alone to the state having undergone the third image processing alone.

In the third ring segment 51c in the ring image 50, a third image processing parameter that indicates the ratios for the third image processing and the fourth image processing can be adjusted. When the selected position (the display position at which the cursor 52 is displayed) selected by the selection unit 14b is in the third ring segment 51c, the parameter adjustment unit 14c adjusts the third image processing parameter in correspondence to the selected position. As the cursor moves to the third position P3, the parameter adjustment unit 14c sets "third image processing 100%" for the third image processing parameter. As the cursor moves to the fourth position P4, the parameter adjustment unit 14c sets "fourth image processing 100%" for the third image processing parameter. In addition, while the cursor 52 moves from the third position P3 toward the fourth position P4, the parameter adjustment unit 14c adjusts the third image processing parameter from "third image processing 100%" toward "fourth image processing 100%" in steps. It is to be noted that since the adjustments made in specific instances are similar to those described in reference to the first ring segment 51a, a repeated explanation is not provided. As the cursor 52 moves from the third position P3 toward the fourth position P4 in the third ring segment 51c along the clockwise direction, the captured image on display at the display unit 17 gradually changes from the state having undergone the third image processing alone to the state having undergone the fourth image processing alone.

In the fourth ring segment 51d in the ring image 50, a fourth image processing parameter that indicates the ratios for the fourth image processing and the first image processing can be adjusted. When the selected position (the display position at which the cursor 52 is displayed) selected by the selection unit 14b is in the fourth ring segment 51d, the parameter adjustment unit 14c adjusts the fourth image processing parameter in correspondence to the selected position. As the cursor moves to the fourth position P4, the parameter adjustment unit 14c sets "fourth image processing 100%" for the fourth image processing parameter. As the cursor moves to the first position P1, the parameter adjustment unit 14c sets "first image processing 100%" for the fourth image processing parameter. In addition, while the cursor 52 moves from the fourth position P4 toward the first position P1, the parameter adjustment unit 14c adjusts the fourth image processing parameter from "fourth image processing 100%" toward "first image processing 100%" in steps. It is to be noted that since the adjustments made in specific instances are similar to those described in reference to the first ring segment 51a, a repeated explanation is not provided. As the cursor 52 moves from the fourth position P4 toward the first position P1 in the fourth ring segment 51d along the clockwise direction, the captured image on display at the display unit 17 gradually changes from the state having undergone the fourth image processing alone to the state having undergone the first image processing alone.

As described above, while the cursor 52 moves from the first position P1 over a full cycle along the clockwise direction, the image processing applied to the captured image is continuously modified in the order of: the first image processing, the second image processing, the third image processing and the fourth image processing, and shifts back to the first image processing. It is to be noted that as the cursor 52 moves over a full cycle along the counterclockwise direction, the image processing applied to the captured image changes in the reverse order from the order in which the image processing changes when the cursor 52 moves over a full cycle along the clockwise direction as described above. In addition, the cursor 52 does not need to move over a full cycle and the cursor 52 may move along the clockwise direction over half cycle instead, and then move along the counterclockwise direction so as to reverse the change having been made in the image processing.

The contents of the first image processing through the fourth image processing set in the ring image 50 are similar to those described in reference to the second embodiment. Accordingly, a repeated detailed explanation of the contents of the first image processing through the fourth image processing is not provided.

Figure 26:
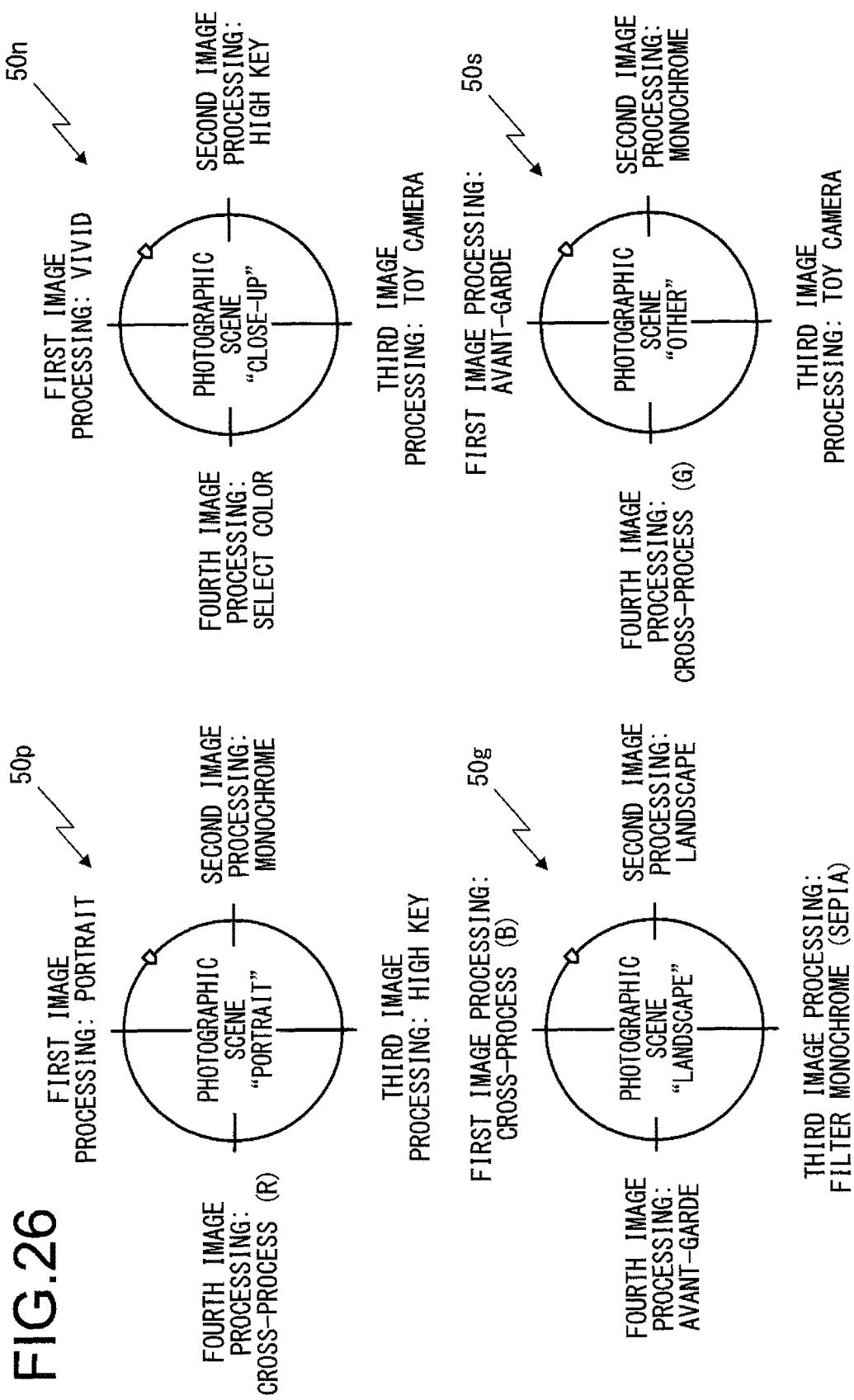

FIG. 26 provides diagrams each indicating a combination of the first image processing through the fourth image processing set in correspondence to a specific photographic scene category. At the digital camera 1C, four types of image processing, suited for each specific photographic scene category, are set in advance as the first image processing through the fourth image processing. For instance, "portrait", "monochrome", "high key" and "cross-process (R)" are set respectively as the first image processing, the second image processing, the third image processing and the fourth image processing in a ring image 50p for the photographic scene "portrait", "vivid", "high key", "toy camera" and "select color" are set respectively as the first image processing, the second image processing, the third image processing and the fourth image processing in a ring image 50n for the photographic scene "close-up". "cross-process (B)", "landscape", "filter monochrome (sepia)" and "avant-garde" are set respectively as the first image processing, the second image processing, the third image processing and the fourth image processing in a ring image 50g for the photographic scene "landscape". "avant-garde", "monochrome", "toy camera" and "cross-process (G)" are set respectively as the first image processing, the second image processing, the third image processing and the fourth image processing in a ring image 50s for the photographic scene "other". It is to be noted that while FIG. 26 includes text indicating the photographic scene categories and the contents of the first image processing through the fourth image processing so as to facilitate the explanation, such text is not actually displayed and only the ring 51 and the cursor 52 are displayed on the display screen at the display unit 17. Namely, the ring images 50p, 50n, 50g and 50s are displayed as the same image (i.e., with uniform display contents) at the display screen of the display unit 17 regardless of the photographic scene category.

"portrait" is image processing executed to create an image with flattering skin tones for human subjects. "monochrome" is image processing executed to create an image expressed with black and white gradations only. "high key" is image processing executed to create an image achieving high luminance over the entire image plane with less shadow. "cross-process (R)","cross-process (G)" and "cross-process (B)" are each executed to achieve an image effect simulating an effect that is conventionally realized through cross-processing (a silver halide film photographic process in which positive film is developed as a negative). It is to be noted that an image with a reddish tinge is obtained through "cross-process (R)", an image with a greenish tinge is obtained through "cross-process (G)" and an image with a bluish tinge is obtained through "cross-process (B)". "vivid" is image processing executed to create a high-contrast image with vivid colors. "toy camera" is image processing executed to achieve an image effect conventionally realized in an image captured through a toy camera. "select color" is image processing executed to achieve an image effect through which colors other than a specific color are rendered as monochrome. "landscape" is image processing executed to create an image optimized for landscapes such as nature and street scenes. "filter monochrome (sepia)" is image processing executed to create an image expressed with sepia-colored gradations alone. "avant-garde" is image processing executed to create a unique image by further raising the contrast and the saturation relative to "vivid".

It is to be noted that information indicating the combinations of types of image processing set as the first image processing through the fourth image processing in the ring image 50 is stored in advance in a memory (not shown) in the digital camera IC in correspondence to each photographic scene category.

In addition, the user is able to alter the display size for the ring image 50 and increase/decrease the number of steps through which a image processing parameter can be adjusted in the ring image 50 by performing a "pinch-in" operation or a "pinch-out" operation on the touch panel 16b in the creative mode. This feature will be described in reference to FIG. 27.

The operation detection unit 14e in the control unit 14 detects, based upon an output signal provided from the touch panel 16b, a pinch-in operation, whereby the distance between a plurality of contact positions detected at the same time is narrowed, or a pinch-out operation, whereby the distance between the plurality of contact positions detected simultaneously is widened.

Immediately after the creative mode is selected, there is no ring image 50 on display at the display unit 17. If the operation detection unit 14e detects a pinch-out operation while the ring image 50 is not on display, the display control unit 14a brings up the ring image 50 on display. At this time, the display control unit 14a displays the ring image 50 in a predetermined first size. The first size is smaller than a second size and a third size, which will be explained later. In addition, the display control unit 14a sets the number of steps over which each image processing parameter among the first through fourth image processing parameters corresponding to the first through fourth ring segments 51a through 51d can be adjusted, to a predetermined lower limit value of, for instance, 1 in the ring image 50 displayed in the first size. In this situation, the total number of steps through which the image processing parameters can be adjusted in the entire ring image 50 is four. In the ring image 50 displayed in the first size, a simple adjustment (coarse adjustment) of the first image processing parameter through the fourth image processing parameter is enabled.

In addition, if the operation detection unit 14e detects a pinch-out operation performed on the ring image 50 displayed in the first size, the display control unit 14a enlarges the ring image 50 so as to display it in the second size, greater than the first size. In this case, the display control unit 14a increases the number of steps over which each of the first through fourth image processing parameters corresponding to the first through fourth ring segments 51a through 51d can be adjusted to a value of, for instance, 4 over the number of adjustment steps available in the ring image displayed in the first size. The total number of steps through which the image processing parameters can be adjusted in the entire ring image 50 is 16. In the ring image 50 displayed in the second size, finer adjustment of the first image processing parameter through the fourth image processing parameter, compared to that enabled in the ring image displayed in the first size, is enabled.

In addition, if the operation detection unit 14e detects a pinch-out operation performed on the ring image 50 displayed in the second size, the display control unit 14a enlarges the ring image 50 so as to display it in the third size, greater than the second size. In this case, the display control unit 14a increases the number of steps over which each of the first through fourth image processing parameters corresponding to the first through fourth ring segments 51a through 51d can be adjusted, to a predetermined upper limit value of, for instance, 16, over the number of adjustment steps available in the ring image displayed in the second size. In this situation, the total number of steps through which the image processing parameters can be adjusted in the entire ring image 50 is 64. In the ring image 50 displayed in the third size, even finer adjustment of the first image processing parameter through the fourth image processing parameter, compared to that enabled in the ring image displayed in the second size, is enabled.

Figure 27:
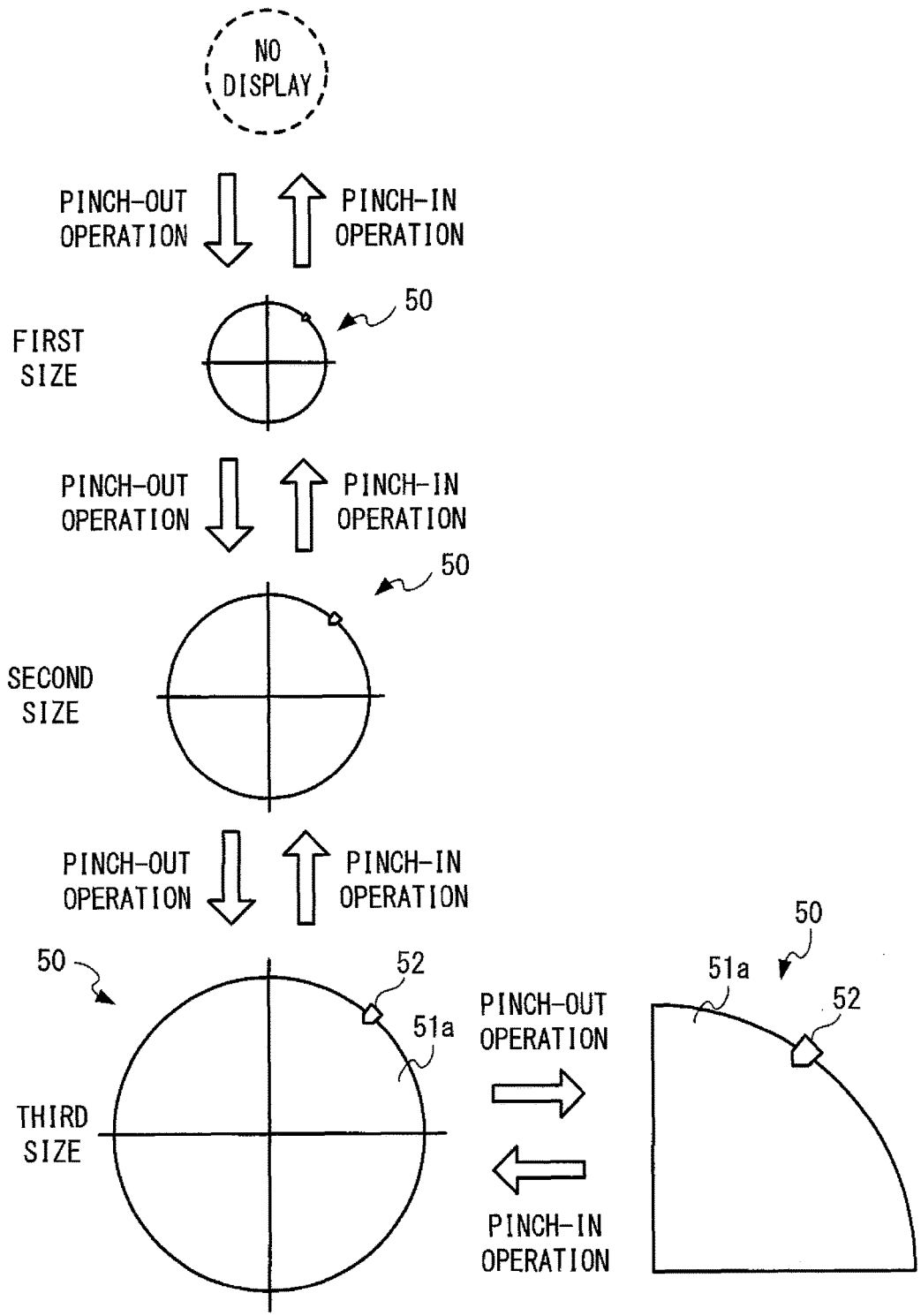

If the operation detection unit 14e detects a pinch-out operation performed on the ring image 50 displayed in the third size, the display control unit 14a displays the ring segment (the first ring segment 51a in FIG. 27) where the cursor 52 is displayed (i.e., where the selected position selected by the selection unit 14b is located) alone in an enlargement and clears the other ring segments (the second ring segment 51b through the fourth ring segment 51d in FIG. 27) from the display. As a result, the first ring segment 51a, i.e., a quarter circle, constituting part of the ring image 50, alone is displayed. In addition, the display control unit 14a increases the number of steps over which the first image processing parameter can be adjusted in the enlarged first ring segment 51a, to a value of, for instance, 32 over the number of adjustment steps available for the first image processing parameter in the ring image displayed in the third size. Consequently, even finer adjustment of the first image processing parameter, relative to the adjustment enabled in the ring image displayed in the third size, is enabled.

In addition, if the operation detection unit 14e detects a pinch-in operation performed on the ring image 50 showing a single ring segment alone in an enlargement, the display control unit 14a reverts to the display of the entire ring image 50 in the third size, and sets the number of steps over which each of the first through fourth image processing parameters, corresponding to the first through fourth ring segments 51a through 51d, can be adjusted to the predetermined upper limit value of, for instance, 16.

If the operation detection unit 14e detects a pinch-in operation performed on the ring image 50 displayed in the third size, the display control unit 14a displays the ring image 50 in the smaller second size and reduces the number of steps over which the first through fourth image processing parameters can be individually adjusted in the corresponding ring segments, i.e., the first through fourth ring segments 51a through 51d, to the predetermined value mentioned earlier (e.g., 4).

If the operation detection unit 14e detects a pinch-in operation performed on the ring image 50 displayed in the second size, the display control unit 14a displays the ring image 50 in the smaller first size and reduces the number of steps over which the first through fourth image processing parameters can be individually adjusted in the corresponding ring segments, i.e., the first through fourth ring segments 51a through 51d, to the predetermined lower limit value mentioned earlier (e.g., 1).

In addition, if the operation detection unit 14e detects a pinch-in operation performed on the ring image 50 displayed in the first size, the display control unit 14a clears the ring image 50 from the display.

Figure 28:
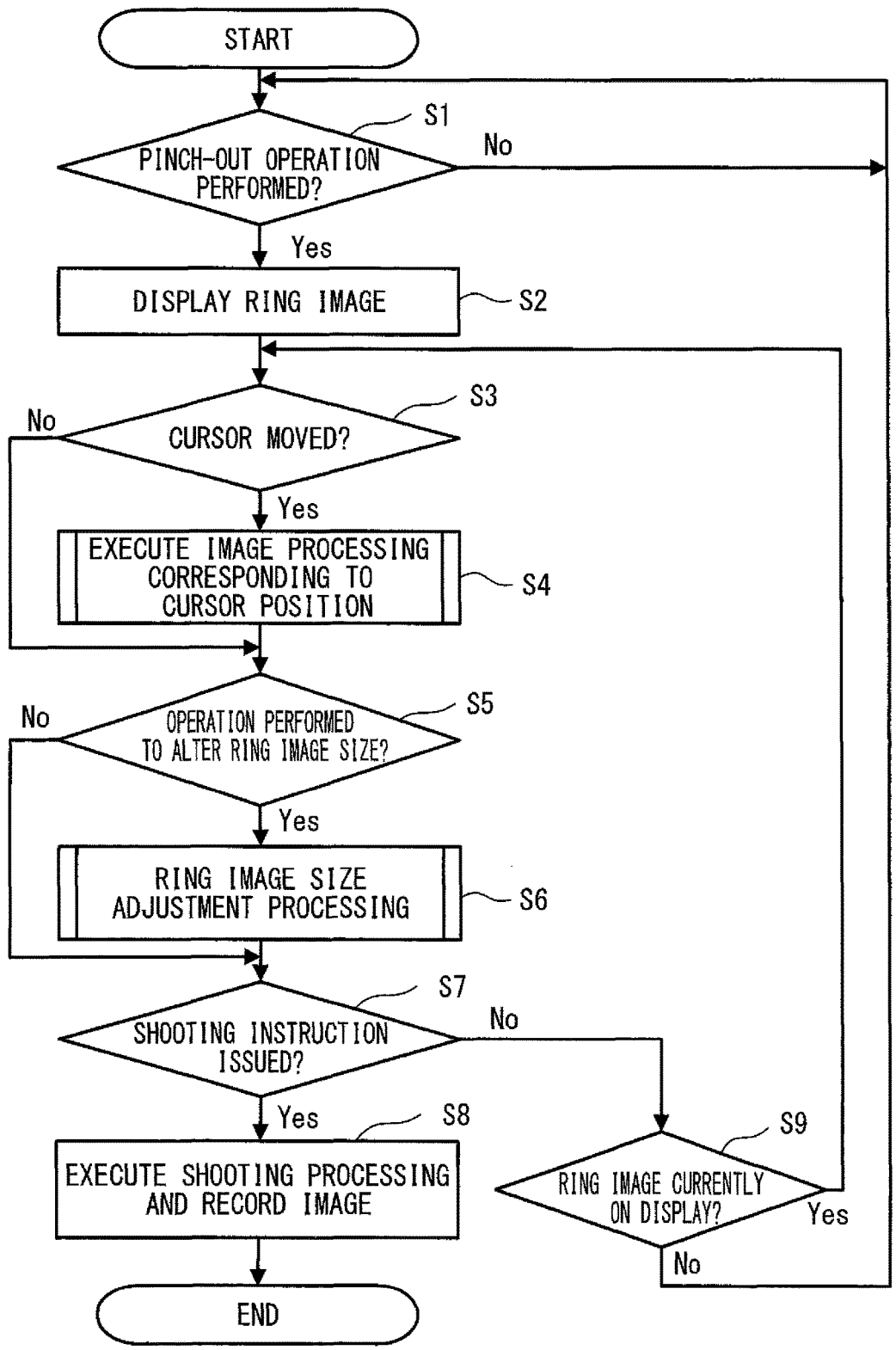

Next, the flow of the processing executed by the control unit 14 in the creative mode will be explained in reference to the flowchart presented in FIG. 28. It is to be noted that the processing shown in FIG. 28 is repeatedly executed while the creative mode is set for a shooting mode. As the shooting mode is switched to the creative mode, the control unit 14 brings up a live view image on display and also starts up a program enabling the processing shown in FIG. 28, which is stored in a memory (not shown), so as to start the processing in FIG. 28.

In step S1, the operation detection unit 14e makes a decision, based upon an output signal provided from the touch panel 16b, as to whether or not a pinch-out operation has been performed. If no pinch-out operation has been performed, the operation detection unit 14e makes a negative decision in step S1 and repeatedly executes the processing in step S1, whereas if a pinch-out operation has been performed, it makes an affirmative decision in step S1 and the operation proceeds to step S2.

In step S2, the display control unit 14a displays the ring image 50 in the first size over the live view image, and then the operation proceeds to step S3. In addition, the control unit 14 executes scene categorization processing as explained earlier and sets the first image processing through the fourth image processing corresponding to the photographic scene category determined through the scene categorization processing in the ring image 50 at this time.

In step S3, the control unit 14 makes a decision as to whether or not an operation for moving the cursor 52 in the ring image 50 (i.e., a drag operation with the cursor 52) has been performed at the touch panel 16b. If the control unit 14 decides that such an operation has been performed, the operation proceeds to step S4, whereas if it decides that no such operation has been performed the operation proceeds to step S5.

In step S4, the control unit 14 executes image processing in correspondence to the position of the cursor 52 in the ring image 50, as explained earlier. The flow of this processing will be described in reference to the flowchart presented in FIG. 29. In step S41, the selection unit 14b moves the selected position (i.e., the display position of the cursor 52) in response to the drag operation performed with the cursor 52, and then the operation proceeds to step S42.

In step S42, the parameter adjustment unit 14c adjusts the image processing parameter for the image processing executed on the captured image in correspondence to the position to which the selected position (the display position of the cursor 52) has been moved, as explained earlier, and then the operation proceeds to step S43.

In step S43, the image processing unit 14d obtains the captured image from the image sensor 12 and executes the image processing on the captured image thus obtained based upon the image processing parameter having been adjusted in step S42, before the operation proceeds to step S44.

Figure 29:
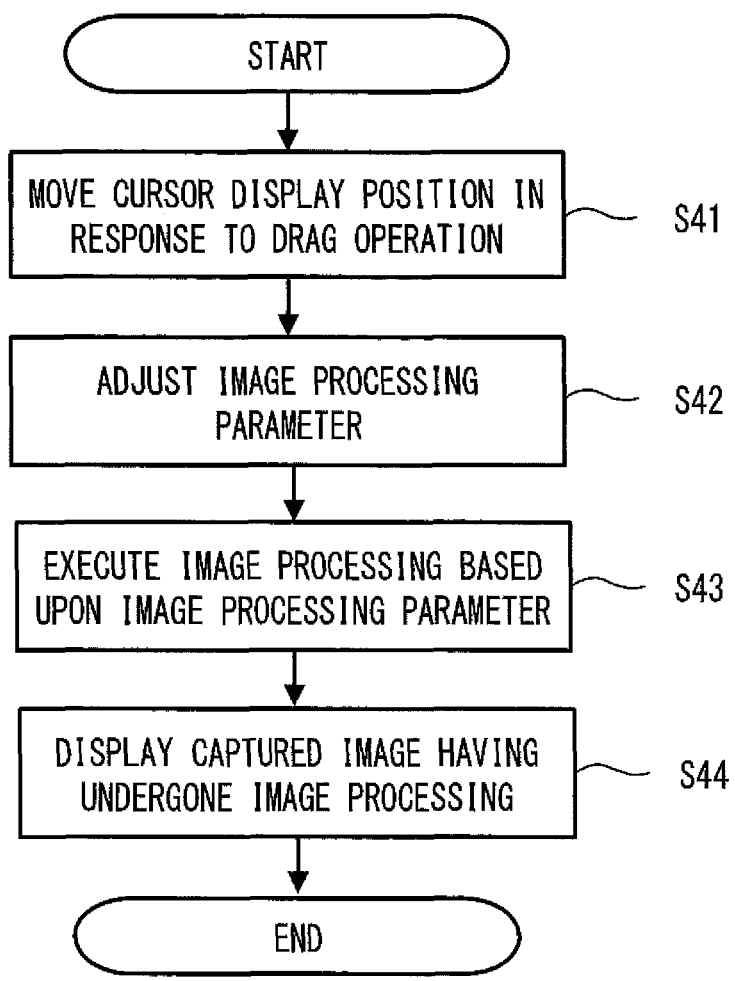

In step S44, the display control unit 14a displays the captured image having undergone image processing in step S43 as a live view image at the display unit 17, before the processing in FIG. 29 ends and the operation proceeds to step S5 in FIG. 28.

In step S5 in FIG. 28, the operation detection unit 14e makes a decision as to whether or not an operation for altering the display size of the ring image 50 (i.e., a pinch-in operation or a pinch-out operation performed on the ring image 50) has been performed at the touch panel 16b. If such an operation has been detected by the operation detection unit 14e, the operation proceeds to step S6, whereas if no such operation has been detected, the operation proceeds to step S7.

Figure 30:
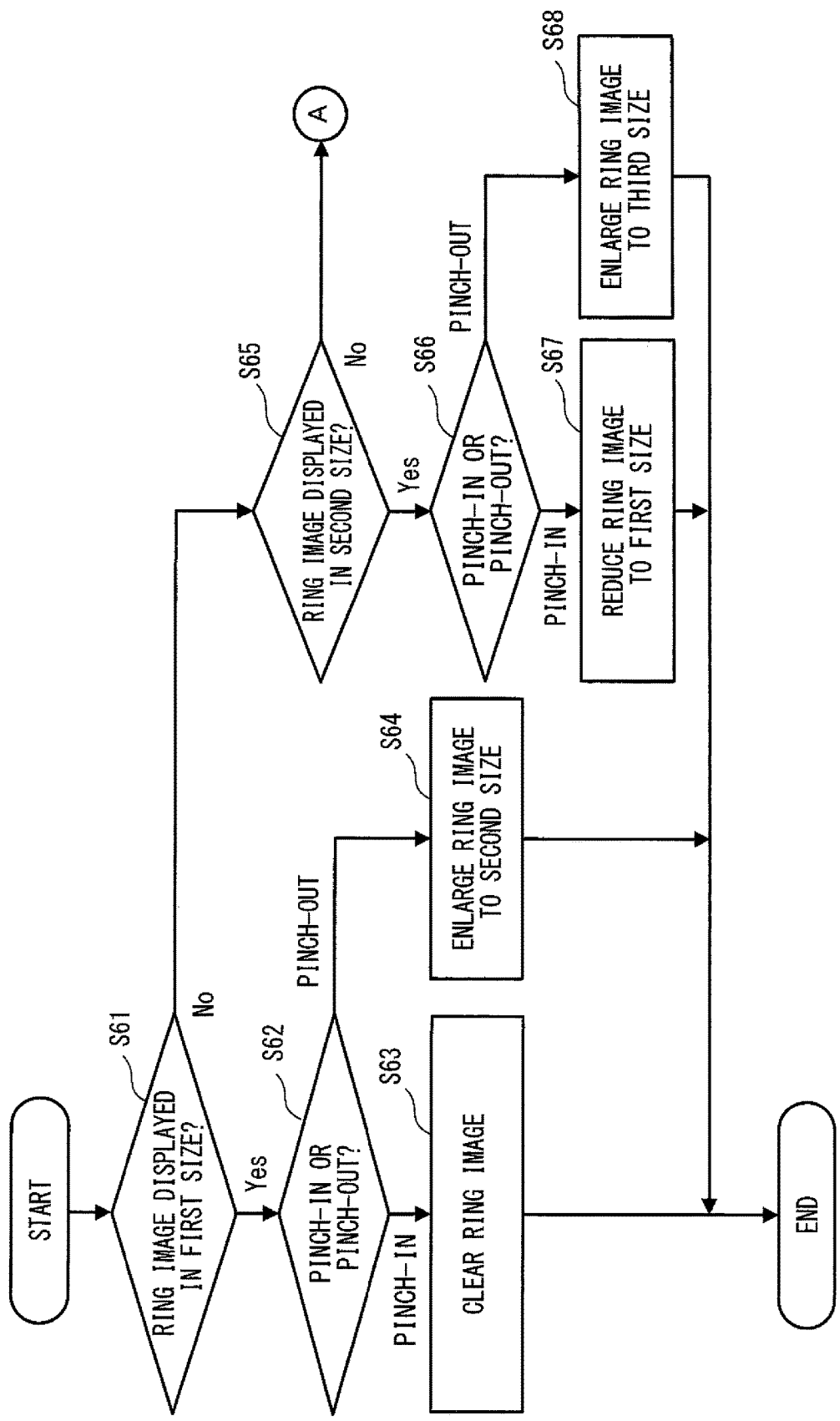

In step S6, the display control unit executes size adjustment processing so as to adjust the display size of the ring image 50 in response to the pinch-in operation or the pinch-out operation performed on the ring image 50, as described earlier. The flow of the size adjustment processing will be described in reference to the flowchart presented in FIG. 30 and FIG. 31. In step S61 in FIG. 30, the display control unit 14a makes a decision as to whether or not the size of the ring image currently on display is the first size and if it is displayed in the first size, the operation proceeds to step S62, whereas if it is not displayed in the first size, the operation proceeds to step S65.

In step S62, the display control unit 14a makes a decision as to whether the operation, having been detected by the operation detection unit 14e in step S5, is a pinch-in operation or a pinch-out operation. If the detected operation is a pinch-in operation, the operation proceeds to step S63, in which the display control unit 14a clears the ring image 50 from the display and ends the size adjustment processing. If, on the other hand, the detected operation is a pinch-out operation, the operation proceeds to step S64 in which the display control unit 14a enlarges the ring image 50 so as to display it in the second size and increases the number of steps over which the first through fourth image processing parameters can be individually adjusted to a predetermined value before ending the size adjustment processing.

In step S65, to which the operation proceeds upon making a negative decision in step S61, the display control unit 14a makes a decision as to whether or not the size of the ring image 50 currently on display is the second size, and the operation proceeds to step S66 if the ring image is currently displayed in the second size, whereas the operation proceeds to step S69 (see FIG. 31) if it is not displayed in the second size.

In step S66, the display control unit 14a makes a decision as to whether the operation, having been detected by the operation detection unit 14e in step S5, is a pinch-in operation or a pinch-out operation. If the detected operation is a pinch-in operation, the operation proceeds to step S67, in which the display control unit 14a displays the ring image 50 in the smaller first size, reduces the number of steps over which the first through fourth image processing parameters can be individually adjusted to a predetermined value and ends the size adjustment processing. If, on the other hand, the detected operation is a pinch-out operation, the operation proceeds to step S68, in which the display control unit 14a enlarges the ring image 50 so as to display it in the third size and increases the number of steps over which the first through fourth image processing parameters can be individually adjusted to a predetermined value before ending the size adjustment processing.

Figure 31:
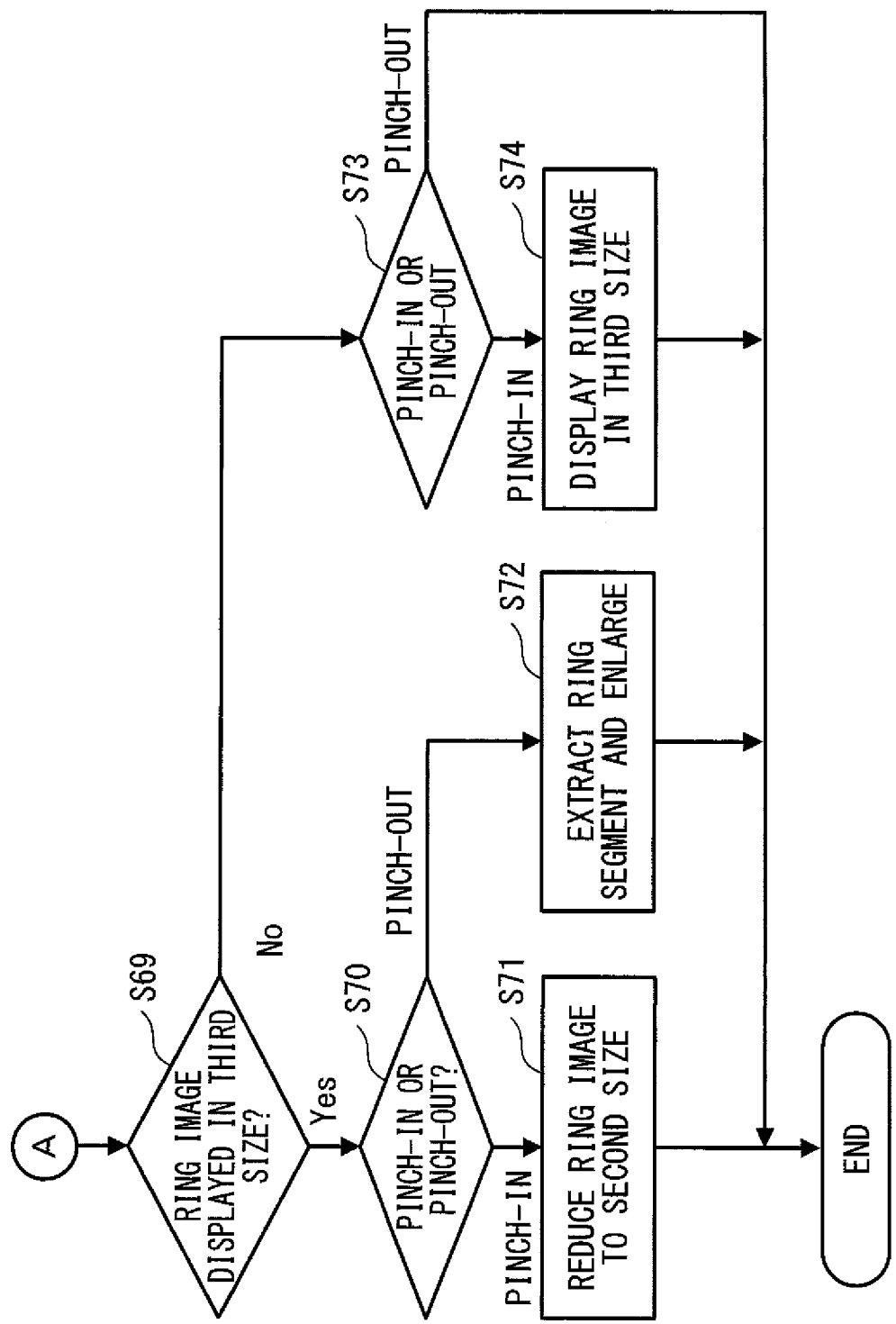

In step S69 in FIG. 31, to which the operation proceeds upon making a negative decision in step S65, the display control unit 14a makes a decision as to whether or not the size of the ring image 50 currently on display is the third size, and the operation proceeds to step S70 if the ring image is currently displayed in the third size, whereas the operation proceeds to step S73 if it is not displayed in the third size.

In step S70, the display control unit 14a makes a decision as to whether the operation, having been detected by the operation detection unit 14e in step S5, is a pinch-in operation or a pinch-out operation. If the detected operation is a pinch-in operation, the operation proceeds to step S71, in which the display control unit 14a displays the ring image 50 in the smaller second size, reduces the number of steps over which the first through fourth image processing parameters can be individually adjusted to the predetermined value and ends the size adjustment processing. If, on the other hand, the detected operation is a pinch-out operation, the operation proceeds to step S72, in which the display control unit 14a displays only the ring segment where the cursor 52 is set in an enlargement, increases the number of steps over which the image processing parameter corresponding to the enlarged ring segment can be adjusted, before ending the size adjustment processing.

When the operation proceeds to step S73 upon making a negative decision in step S69, a single ring segment (i.e., a quarter circle) of the ring image 50 is currently displayed in an enlargement. In step S73, the display control unit 14a makes a decision as to whether the operation having been detected by the operation detection unit 14e in step S5 is a pinch-in operation or a pinch-out operation. If the detected operation is a pinch-in operation, the operation proceeds to step S74, in which the display control unit 14a reverts to the state in which the ring image 50 is displayed in the third size before ending the size adjustment processing. If, on the other hand, the detected operation is a pinch-out operation, the display control unit 14a immediately ends the size adjustment processing. Namely, even if a pinch-out operation is performed while a single ring segment of the ring image 50 is displayed in an enlargement, the display control unit 14a does not adjust the display size for the ring image 50 and sustains the current state.

Once the size adjustment processing executed for the ring image 50 ends, as described above, the control unit 14 proceeds to step S7 (see FIG. 28).

In step S7, the operation detection unit 14e makes a decision as to whether or not the user has issued a shooting instruction (i.e., whether or not the shutter button 16a has been pressed). If the operation detection unit 14e decides that a shooting instruction has been issued, the operation proceeds to step S8, whereas if it decides that no shooting instruction has been issued, the operation proceeds to step S9.

In step S8, the control unit 14 engages the image sensor 12 in image-capturing processing so as to capture an image to be recorded. The image processing unit 14d executes the image processing, based upon the image processing parameter set in the ring image 50 at the time point at which the shooting instruction was issued, on the captured image data obtained through the image-capturing processing. The control unit 14 then records the captured image data having undergone the image processing into the recording medium 18 as still image data, before ending the processing shown in FIG. 28.

In step S9, the control unit 14 makes a decision as to whether or not the ring image 50 is currently up on display. If the ring image 50 is currently on display, the control unit 14 makes an affirmative decision in step S9 and the operation returns to step S3. If, on the other hand, the ring image 50 has been cleared from the display through the processing executed in step S6, the control unit 14 makes a negative decision in step S9 and the operation returns to step S1.

The following advantages and operations are achieved through the third embodiment described above.

(1) The display control unit 14*a* in the digital camera 1C displays the ring image 50 that includes the first ring segment 51*a* through the fourth ring segment 51*d* respectively used to adjust the first image processing parameter through the fourth image processing parameter in steps. When the operation detection unit 14*e* detects an operation performed to reduce the size of the ring image 50 (pinch-in operation) the display control unit 14*a* displays the ring image 50 by reducing the number of steps over which the first image processing parameter through the fourth image processing parameter can be individually adjusted in the corresponding ring segments, i.e., the first ring segment 51*a* through the fourth ring segment 51*d*. In addition, if the operation detection unit 14*e* detects an operation performed to enlarge the ring image 50 (pinch-out operation) the display control unit 14*a* displays the ring image 50 by increasing the number of steps over which the first image processing parameter through the fourth image processing parameter can be individually adjusted in the corresponding ring segments, i.e., the first ring segment 51*a* through the fourth ring segment 51*d*. At the digital camera 1C adopting these structural features, the number of steps over which the first image processing parameter through the fourth image processing parameter can be adjusted can be altered through a simple operation performed in an operation system (i.e., the ring image 50) used to adjust the first image processing parameter through the fourth image processing parameter. In addition, if the operation detection unit 14*e* detects a pinch-out operation performed when the number of steps over which the first image processing parameter through the fourth image processing parameter can be individually adjusted is set at the predetermined upper limit value, the display control unit 14*a* displays the ring segment, among the first ring segment 51*a* through the fourth ring segment 51*d*, where the position selected by the selection unit 14*b* is located, in an enlargement and increases the number of steps over which the image processing parameter corresponding to that particular ring segment can be adjusted. In this situation, the other ring segments are cleared from the display.

Through these measures, even finer adjustment of the image processing parameter corresponding to the ring segment selected with the cursor 52 is enabled in the digital camera 1C. In addition, since the other ring segments are cleared and thus the overall ratio of the area taken up by the ring image 50 in the display screen can be lowered relative to the ratio of the area taken up when all the ring segments are displayed, the display screen can be utilized with better efficiency at the digital camera 1C.

(2) The display control unit 14*a* in the digital camera 1C clears the ring image 50 from the display if the operation detection unit 14*e* detects a pinch-in operation performed while the number of steps over which the image processing parameters can be individually adjusted is set at the predetermined lower limit value (i.e., while the ring image 50 is on display in the first size). This means that the user of the digital camera 1C only needs to perform a series of pinch-in operations to instigate a series of operations to reduce and finally clear the ring image 50 from the display, and thus, better ease of user operation is assured.

(3) The display control unit 14*a* in the digital camera 1C displays the ring image 50 in the first size if the operation detection unit 14*e* detects a pinch-out operation performed while the ring image 50 is not on display. This means that the user of the digital camera 1C only needs to perform a series of pinch-out operations to display and enlarge the ring image 50 and thus, better ease of user operation is assured.

(Variation 1)

Figure 32:
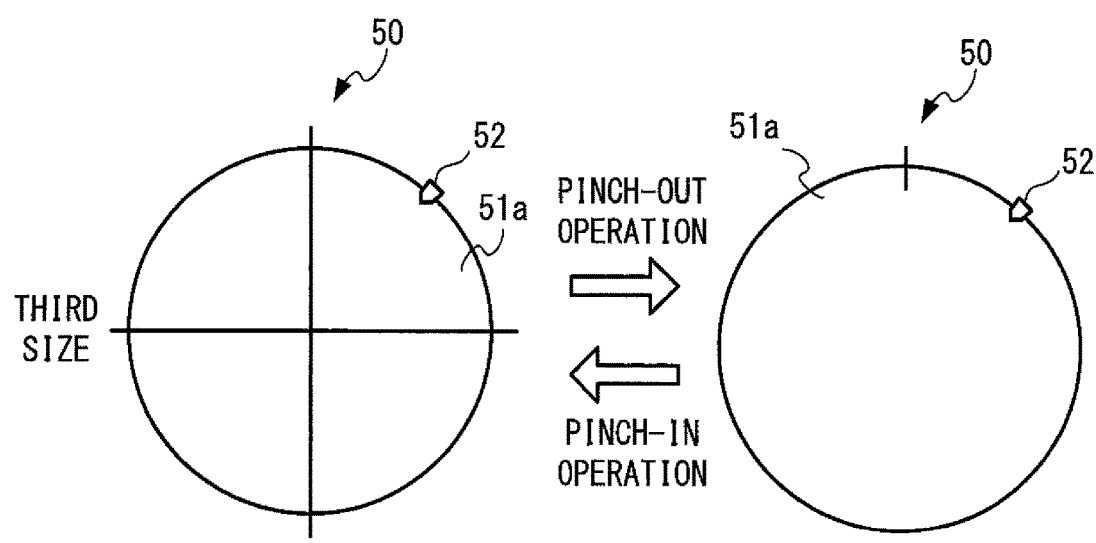
FIG. 32 An illustration showing how the ring image may be displayed in variation 1

The display control unit 14*a* in the embodiment described above extracts the ring segment where the cursor 52 is located and displays the particular ring segment alone in an enlargement when a pinch-out operation is performed on the ring image 50 displayed in the third size. As an alternative, the display control unit 14*a* may extract the ring segment where the cursor 52 is located and display it by altering the shape of the extracted ring segment from the quarter circle to a full circle, as shown in FIG. 32. It is to be noted that the first ring segment 51*a* is extracted and altered from the quarter circle to the full circle in the example presented in FIG. 32.

In this alternative, the display control unit 14*a* increases the number of steps over which the first image processing parameter can be adjusted in the first ring segment 51*a* having been altered into a circular shape relative to the number of adjustment steps available in the ring image displayed in the third size. It is to be noted that in the first ring segment 51*a* rendered in the circular shape, the first image processing parameter is adjusted in steps from "first image processing 100%" toward "second image processing 100%" as the cursor 52 moves a full cycle from the top point of the ring image 50 along the clockwise direction.

(Variation 2)

The display control unit 14*a* in the embodiment described above extracts the ring segment where the cursor 52 is located and displays the particular ring segment alone in an enlargement when a pinch-out operation is performed on the ring image 50 displayed in the third size. As an alternative, the display control unit 14*a* may extract a ring segment corresponding to the position where the pinch-out operation has been performed and display it in an enlargement.

(Variation 3)

The display control unit 14*a* in the embodiment described above extracts a single ring segment and displays it in an enlargement when a pinch-out operation is performed on the ring image 50 displayed in the third size. However, a pinch-out operation may be performed while touching a plurality of ring segments, and in such a case, the display control unit 14*a* may extract the plurality of ring segments the user is touching and display them in an enlargement.

Figure 33:
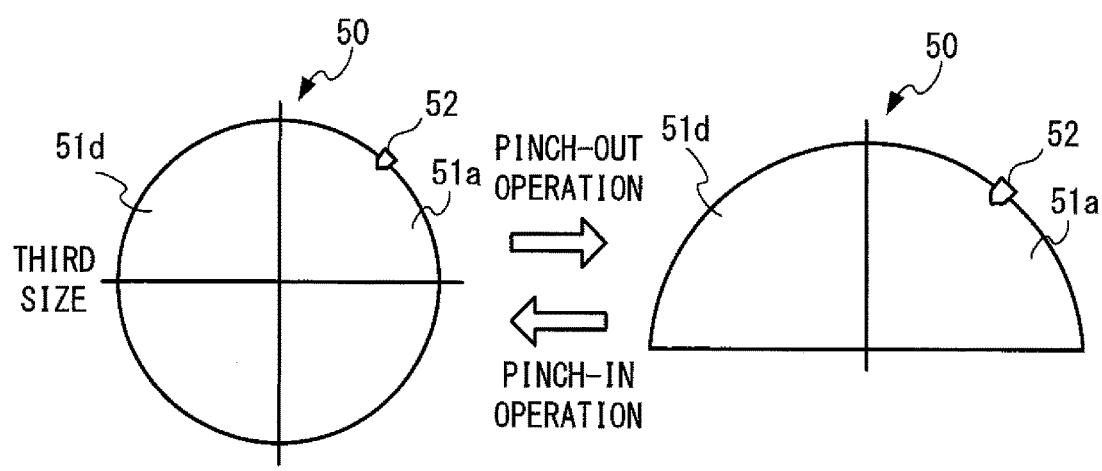
FIG. 33 An illustration showing how the ring image may be displayed in variation 3

For instance, a pinch-out operation may be performed while one finger is touching the fourth ring segment 51*d* and another finger is touching the first ring segment 51*a*. Under these circumstances, the display control unit 14*a* extracts both the fourth ring segment 51*d* and the first ring segment 51*a*, displays them in an enlargement and clears the other ring segments from the display, as shown in FIG. 33. The ring image 50 displayed in this situation thus assumes a semicircle shape. The display control unit 14*a* increases the number of steps over which the image processing parameters corresponding to the fourth ring segment 51*d* and the first ring segment 51*a* having been extracted in comparison to the number of adjustment steps set in the ring image displayed in the third size.

(Variation 4)

The display control unit 14*a* in the embodiment described above extracts the ring segment where the cursor 52 is located, displays the particular ring segment alone in an enlargement and clears the other ring segments from the display when a pinch-out operation is performed on the ring image 50 displayed in the third size. As an alternative, the display control unit 14*a* may leave the other ring segments on display.

The display control unit 14*a* may, for instance, widen the central angle of the first ring segment 51*a* where the cursor 52 is located (by rendering the ring segment as, for instance, a semi-circular shape) relative to the angle corresponding to the quarter circle, and display the other three ring segments (the second ring segment 51b through the fourth ring segment 51d) as segments with a smaller central angle relative to that corresponding to the quarter circle (e.g., areas each defined by a circular arc with a central angle of 60°, formed by dividing a semicircle into three equal portions). The display control unit 14a in this variation increases the number of steps over which the first image processing parameter can be adjusted in the semicircular first ring segment 51a in comparison to the number of adjustment steps set in the ring image displayed in the third size and reduces the number of steps over which the first image processing parameter can be adjusted in the other ring segments in comparison to the number of adjustable steps set in the ring image displayed in the third size.

Figure 34:
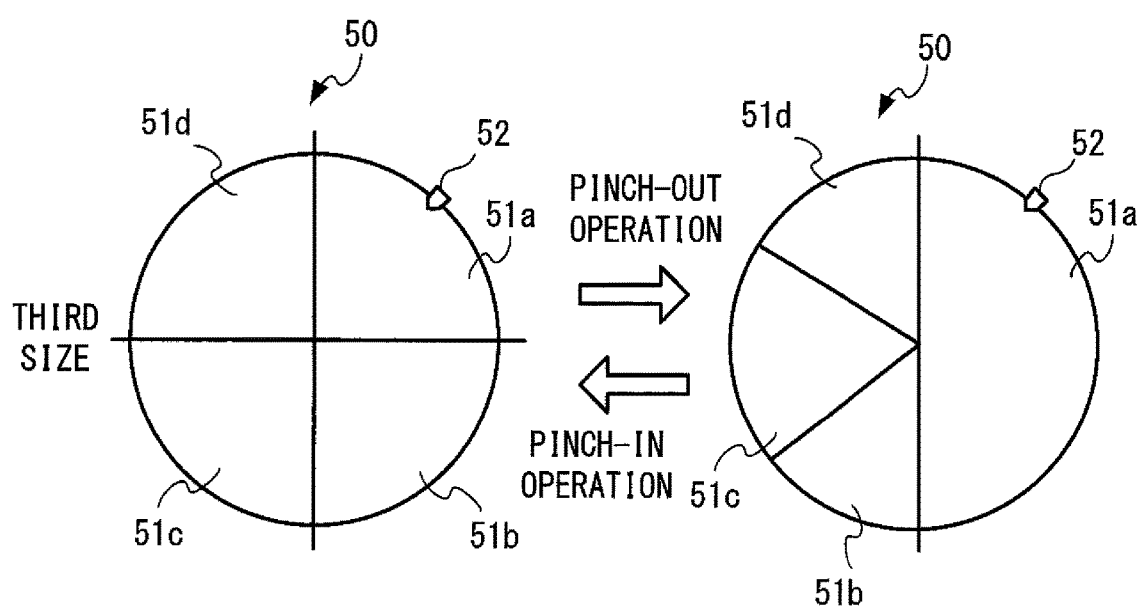
FIG. 34 An illustration showing how the ring image may be displayed in variation 4

In the example described in reference to FIG. 34, finer adjustment of the image processing parameter corresponding to the ring segment where the cursor 52 is located in the ring image 50 is enabled and at the same time, coarse adjustment of the image processing parameters corresponding to the other ring segments is enabled.

(Variation 5)

A pinch-in operation and a pinch-out operation may also be performed in order to achieve an electronic zoom in/out of the live view image. In such a case, either the electronic zoom or the display control for the ring image 50 may be executed based upon, for instance, the number of fingers used to perform the pinch-in or pinch-out operation (i.e., the number of contact positions detected on the touch panel 16b). For instance, the electronic zoom may be executed if a pinch-in operation or a pinch-out operation has been performed with two fingers and the display control for the ring image 50 may be executed if a pinch-in operation or a pinch-out operation has been performed with three fingers.

(Variation 6)

In the embodiment described above, the display size for the ring image 50 can be switched over three steps, i.e., the first size, the second size and the third size, the number of steps over which the display size is adjusted does not need to be three. For instance, it may be adjusted over two steps or over four or more steps.

(Variation 7)

While the first image processing parameter through the fourth image processing parameter that can be adjusted in the ring image 50 are each a parameter indicating the ratios of two types of image processing in the embodiment described above, other parameters may be set for the first image processing parameter through the fourth image processing parameter.

For instance, the first image processing parameter may indicate the strength of the first image processing explained earlier. In such a case, the first image processing parameter is adjusted so that the strength of the first image processing is raised by a step as the cursor 52 moves from the first position P1 to the second position P2.

(Variation 8)

In the embodiment described above, the first image processing parameter through the fourth image processing parameter can be adjusted in the ring image 50. However, the number of image processing parameters that can be adjusted in the ring image 50 is not limited to four, and two or three image processing parameters may be adjusted or five or more image processing parameters may be adjusted in the ring image 50.

(Variation 9)

In the embodiment described above, the position of the cursor 52 (selected position) on the ring is adjusted by moving the display position of the cursor 52. However, the selected position may instead be adjusted by rotating the ring 51 without moving the cursor 52, so as to alter the positional relationship between a given position on the ring 51 and the cursor 52.

(Variation 10)

In the embodiment described above, the circular ring image 50 is displayed as a parameter image that enables adjustment of the image processing parameters. However, a parameter image assuming a bar shape, instead of a circular shape, may be used.

(Variation 11)

In the embodiment described above, the processing described in reference to FIG. 28 through FIG. 31 is executed as the control unit 14 executes a program recorded in a memory (not shown). This program may be provided in advance at the time of product shipment or it may be provided in a recording medium such as a memory card or on a data signal via the Internet after product shipment. The program may be provided to the digital camera 1C in manners similar to those described in reference to FIG. 13, except that the digital camera taking in the program in this situation is the digital camera 1C instead of the digital camera 1 in FIG. 13.

(Variation 12)

While the present invention is adopted in a digital camera in the third embodiment described above, the present invention is not limited to this example and it may be adopted in a portable telephone, a tablet terminal or the like.

(Fourth Embodiment)

Figure 35:
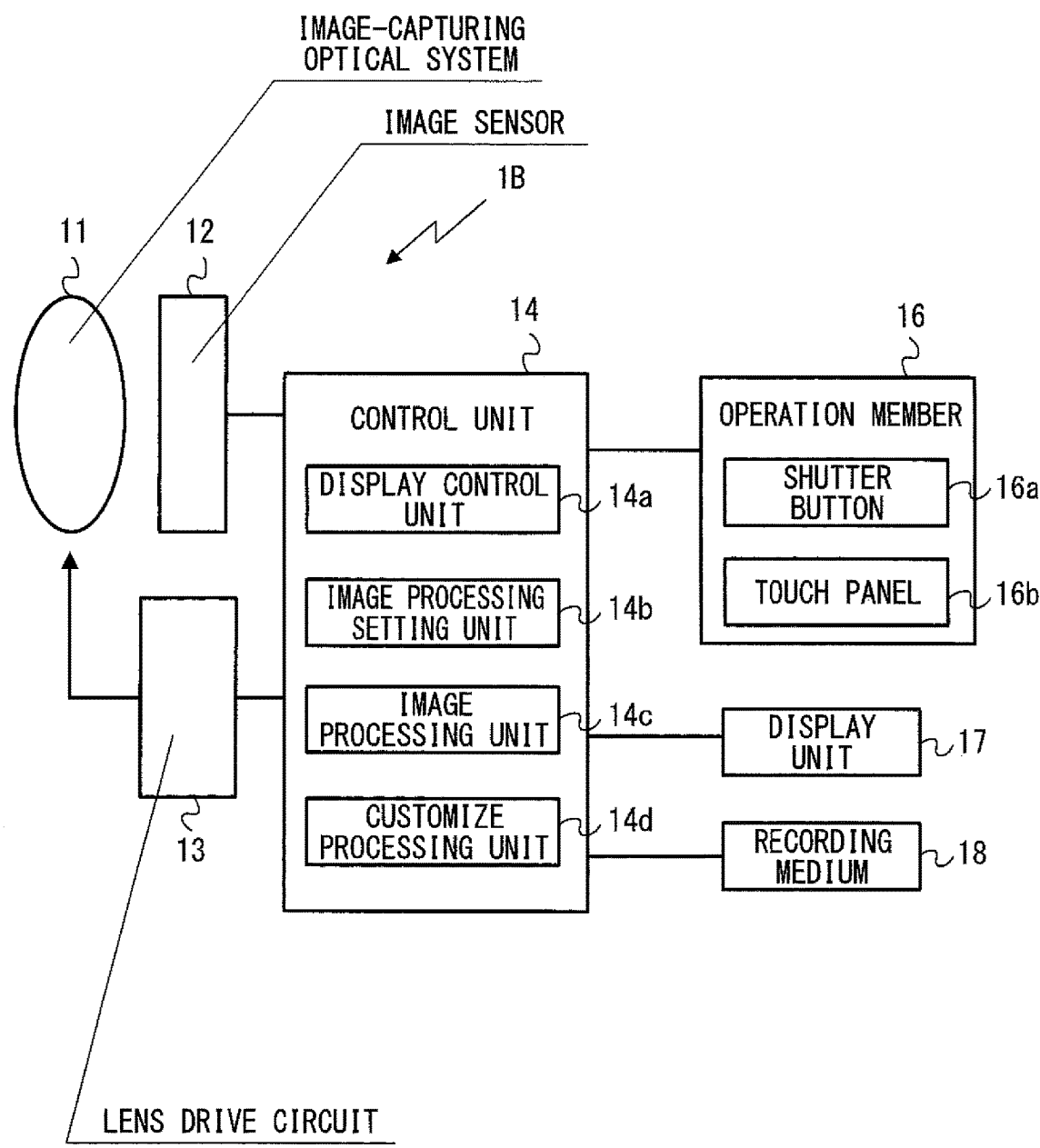
FIG. 35 A block diagram presenting an example of a structure that may be adopted in the digital camera achieved in a fourth embodiment of the present invention FIG. 36 A flowchart of the processing executed in the creative mode FIG. 37 An illustration of the ring image displayed in the fourth embodiment FIG. 38 Illustrations showing how a setting area is added in the fourth embodiment FIG. 39 Illustrations showing how a setting area is removed in the fourth embodiment FIG. 40 A flowchart of the processing executed in the customize mode in the fourth embodiment FIG. 41 An illustration of the ring image displayed in a fifth embodiment FIG. 42 Illustrations showing how a setting area is added in the fifth embodiment FIG. 43 Illustrations showing how a given type of image processing is added into a setting area in the fifth embodiment FIG. 44 Illustrations showing how a setting area is added in the fifth embodiment FIG. 45 A flowchart of the processing executed in the customize mode in the fifth embodiment FIG. 46 Illustrations showing how setting areas are combined to create a new setting area in the fifth embodiment FIG. 47 A display screen brought up in variation 1

FIG. 35 is a block diagram showing the structure of a digital camera 1D achieved in the fourth embodiment. While the structure shown in FIG. 35 only partially differs from that in FIG. 1, it will be described as a separate embodiment. It is to be noted that the description given in reference to the current embodiment applies to all the elements in FIG. 35 even though some of them are assigned with the same reference numerals as those in FIG. 1.

The digital camera 1D comprises an image-capturing optical system 11, an image sensor 12, a lens drive circuit 13, a control unit 14, an operation member 16 and a display unit 17. A recording medium 18 such as a memory card can be loaded into and removed from the digital camera 1D.

The image-capturing optical system 11, configured with a plurality of lens groups including a zoom lens and a focusing lens, forms a subject image onto a light-receiving surface of the image sensor 12. It is to be noted that the image-capturing optical system 11 is shown as a single lens in FIG. 1 so as to simplify the illustration.

Under control executed by the control unit 14, the lens drive circuit 13 adjusts the focal length by driving the zoom lens in the image-capturing optical system 11 and also executes focus adjustment by driving the focusing lens in the image-capturing optical system 11.

The image sensor 12, which is an image sensor configured with, for instance, a CMOS image sensor, captures the subject image formed via the image-capturing optical system 11 and outputs image signals obtained through the image-capturing operation to the control unit 14.

The control unit 14 includes a display control unit 14a, an image processing setting unit 14b, an image processing unit 14c and a customize processing unit 14d. The control unit 14, comprising a CPU, a memory and peripheral circuits, fulfills the functions of the various units listed above by executing a control program stored in the memory. The functions of the various units will be described in detail later.

The operation member 16 includes a shutter button 16a and a touch panel 16b disposed on the display unit 17. The touch panel 16b detects a contact position at which a finger or the like comes into contact with the touch panel 16b and outputs the contact position thus detected to the control unit 14. The touch panel 16b in the embodiment is a multi-touch panel, capable of detecting multiple touches. Namely, it is capable of detecting a plurality of contact positions at which it is touched simultaneously with fingers Or the like on the display screen of the display unit 17. The operation member 16 further includes a record button, a mode selector button, a cross key, an OK button, a display button and the like. The operation member 16 outputs an operation signal corresponding to a user operation to the control unit 14.

At the display unit 17, configured with a liquid crystal monitor (back side monitor) or the like mounted on the rear surface of the digital camera 1D, images captured via the image sensor 12, various types of settings menus and the like are displayed.

As a shooting mode is set in response to an operation signal output from the operation member 16, the control unit 14 engages the image sensor 12 in live view image-capturing processing at a predetermined frame rat; generates frame images for display from the individual frame images obtained in time series from the image sensor 12 and outputs the display frame images to the display unit 17. As a result, real-time live view image display is provided at the display unit 17.

As the shutter button 16a is pressed all the way down and a still image shooting instruction is thus issued in the shooting mode, the control unit 14 engages the image sensor 12 in still image-capturing processing, generates still image data by executing specific image processing on the image signals obtained from the image sensor 12, compresses the still image data in a predetermined format such as JPEG and records the compressed data into the recording medium 18.

In addition, as a reproduce mode is set in response to an operation signal output from the operation member 16, the control unit 14 reads out and reproduces still image data recorded in the recording medium 18 and displays the reproduced image at the display unit 17.

<Creative Mode>

Figure 36:
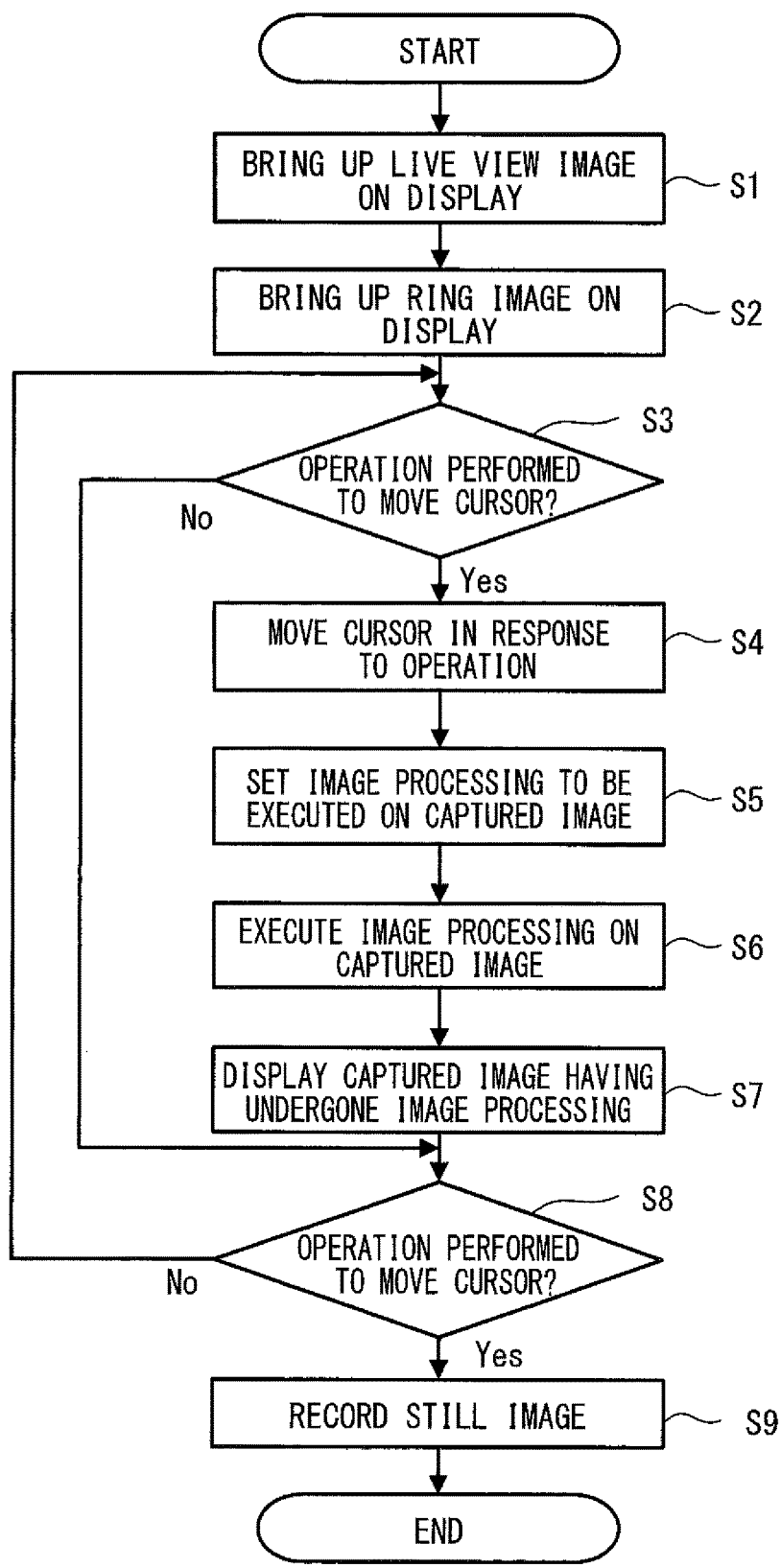

At the digital camera 1D achieved in the embodiment, a shooting mode referred to as a creative mode is available in addition to the normal shooting modes. The following is a description of the creative mode. The flow of the processing executed by the control unit 14 in the creative mode will be first describes in reference to the flowchart presented in FIG. 36. The processing shown in FIG. 36 is repeatedly executed as long as the creative mode is selected for the shooting mode. As the shooting mode is switched to the creative mode, the control unit 14 starts up a program enabling the processing in FIG. 36, recorded in the memory, so as to start execution of the processing.

In step S1, the control unit 14 starts processing by engaging the image sensor 12 in operation so as to capture a subject image in time series and display the captured image as a live view image at the display unit 17.

In step S2, the display control unit 14a in the control unit 14 starts processing so as to display an image 50 used to set image processing to be executed on the captured image by superimposing it over the live view image at the display unit 17. The image 50, which shows a ring, will hereafter be referred to as a ring image 50. In addition, the display control unit 14a displays a cursor 51 on the ring in the ring image 50.

In step S3, the control unit makes a decision based upon an operation signal output from the touch panel 16B, as to whether or not a user operation for moving the cursor 51 has been performed. The operation for moving the cursor 51 may be a drag operation performed with the cursor 51 (i.e., the user touches the cursor 51 with a finger and moves the finger while maintaining contact). If a drag operation has been performed with the cursor 51, the operation proceeds to step S4, whereas if no drag operation has been performed with the cursor 51 the operation proceeds to step S8.

In step S4, the display control unit 14a moves the cursor 51 along the ring in the ring image 50 in response to the drag operation.

In step S5, the image processing setting unit 14b in the control unit 14 sets the image processing to be executed on the captured image in correspondence to the position of the cursor 51 in the ring image 50. This point will be described in further detail later.

In step S6, the image processing unit 14c in the control unit 14 executes the image processing, having been set by the image processing setting unit 14d, on the captured image.

In step S7, the display control unit 14a displays the captured image having undergone the image processing executed by the image processing unit 14c at the display unit 17 as a live view image. The user of the digital camera 1D described above is able to adjust the contents of the image processing to be executed on the captured image by moving the cursor 51 on the ring image 50 and is able to view the resulting image having undergone the image processing in real-time as the live view image.

In step S8, the control unit 14 makes a decision as to whether or not the user has issued a shooting instruction (i.e., whether or not the shutter button 16a has been pressed). If the control unit 14 decides that a shooting instruction has been issued, the operation proceeds to step S9, whereas if it decides that no shooting instruction has been issued, the operation returns to step S3.

In step S9, the control unit 14 engages the image sensor 12 in image-capturing processing so as to capture an image to be recorded. The image processing unit 14c executes the image processing on the captured image data obtained through the image-capturing processing in correspondence to the position at which the cursor 51 is set at the time point at which the shooting instruction was issued. The control unit 14 then records the captured image data having undergone the image processing into the recording medium 18 as still image data, before ending the processing shown in FIG. 36.

As described above, the user first sets the desired image processing by moving the cursor 51 on the ring image 50 and then presses the shutter button 16a in the creative mode so as to record a still image having undergone the desired image processing.

It is to be noted that the following description will be given by assuming that the image processing may be executed to create an image by adjusting parameters such as the saturation, the contrast and the white balance or to achieve a specific effect such as a softening effect or a toy camera effect with peripheral darkening.

Figure 37:
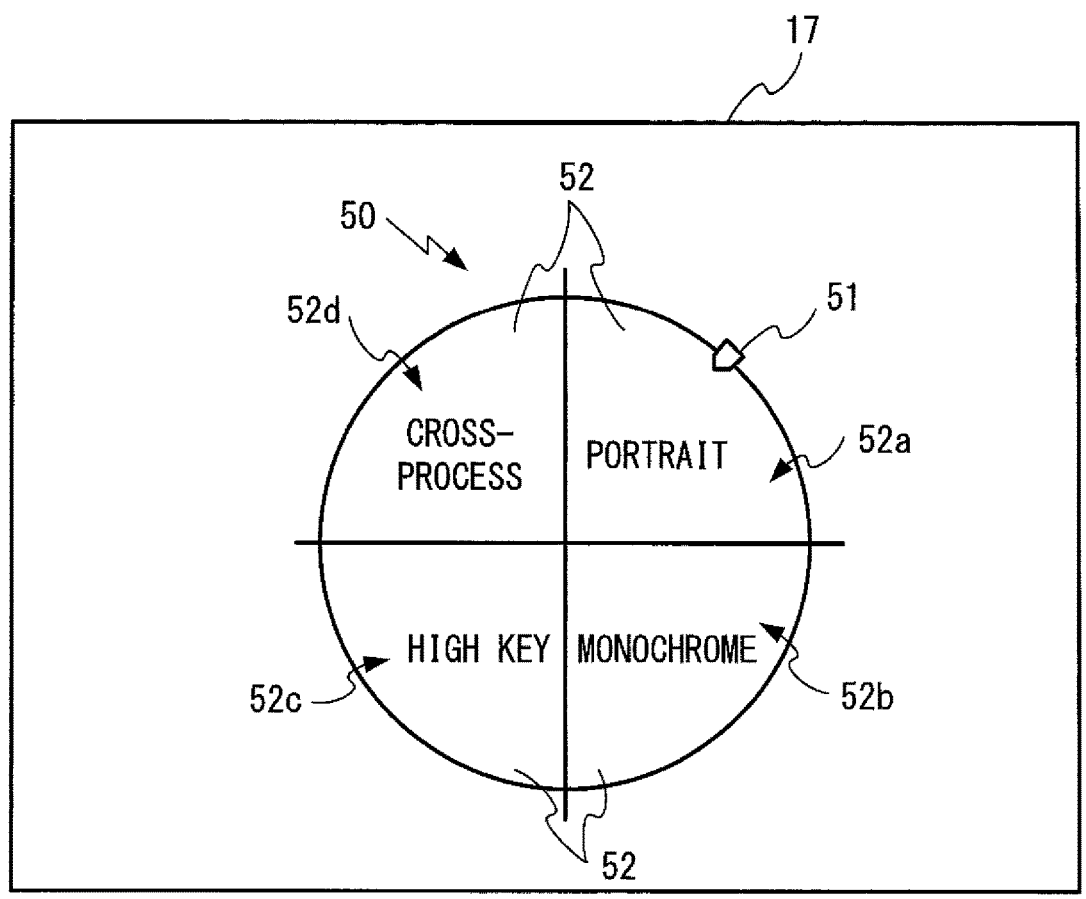

The ring image 50 will be explained next. Setting areas 52 used to set various types of image processing are defined inside the ring image 50. The setting areas 52 can be customized by the user as he desires (as will be explained in detail later). As the default setting, four setting areas 52a through 52d, for instance, may be set in the ring image 50, as shown in FIG. 37. The setting area 52a through the setting area 52d are each set as an area defined by a circular arc with a 90° central angle (as a quarter circle), formed by dividing the ring image 50 into four equal portions. In this example, the setting area 52a, the setting area 52b, the setting area 52c and the setting area 52d are set in this order along the clockwise direction, starting at the top point in the ring image 50. In the ring image 50, the ranges of the setting area 52a through the setting area 52d are indicated with, for instance, lines dividing the ring image 50 into the four equal portions.

In addition, the setting area 52a is set as an area where "portrait", is selected. The setting area 52b is set as an area where "monochrome", is selected. The setting area 52c is set as an area where "high key", for instance, is selected. The setting area 52d is set as an area where "cross-process", is selected. Text indicating the names of the corresponding types of processing are displayed in the setting area 52a through the setting area 52d in the ring image 50.

It is to be noted that "portrait" is image processing executed to create an image with flattering skin tones for human subjects. "monochrome" is image processing executed to create an image expressed with black and white gradations only. "high key" is image processing executed to create an image achieving high luminance over the entire image plane with less shadow. "cross-process" is image processing executed to achieve an image effect that simulates an effect that is conventionally realized through cross-processing (a silver halide film photographic process positive film is developed as a negative). These types of image processing are each executed so as to create a desired image or achieve a desired image effect by adjusting a plurality of parameters such as outline emphasis, contrast and brightness. Through the image processing "portrait", for instance, an image enhancing the skin tone of the human subject is created by individually adjusting the outline emphasis parameter, the contrast parameter, the brightness parameter, the saturation parameter and the hue parameter.

The user specifies image processing to be executed on the captured image by moving the cursor 51 into the setting area 52 corresponding to the desired image processing. The image processing setting unit 14b sets the image processing corresponding to the setting area 52 where the cursor 51 is set as the image processing to be executed on the captured image. For instance, if the cursor 51 is set in the setting area 52a, the image processing setting unit 14b sets "portrait" corresponding to the setting area 52a as the processing to be executed on the captured image. A specific type of image processing is likewise set when the cursor 51 is in a setting area among the setting areas 52b through the setting area 52d.

In addition, the image processing setting unit 14b sets an image processing parameter for the image processing to be executed on the captured image in correspondence to the position of the cursor 51 in the setting area 52. The image processing parameter may be, for instance, an effect level. Assuming that the cursor 51 is set in the setting area 52a, for instance, the image processing setting unit 14b sets the effect level for "portrait" in correspondence to the position taken by the cursor 51 in the setting area 52a. The image processing setting unit 14b sets a higher effect level when the cursor 51 is set at a position in the setting area 52a closer to the setting area 52b, adjacent to the setting area 52a along the clockwise direction and sets a lower effect level when the cursor 51 is set at a position in the setting area 52a closer to the setting area 52d, adjacent to the setting area 52a along the counterclockwise direction. Namely, the image processing setting unit 14b raises the effect level if the cursor 51 is moved in the setting area 52a along the clockwise direction but lowers the effect level if the cursor 51 is moved in the setting area 52a along the counterclockwise direction. The image processing setting unit 14b changes the effect level for "portrait" over a predetermined number of steps through a range defined by a smallest value and a largest value as the cursor 51 moves in the setting area 52a. When the cursor 51 is set in any of the setting area 52b through the setting area 52d, the corresponding image processing parameter (effect level) is set in a similar manner.

The image processing setting unit 14b sets the type of image processing to be executed on the captured image and the image processing parameter in correspondence to the position at which the cursor 51 is set in the ring image 50, as described above.

<Customize Mode>

In addition, a customize mode, in which the ring image 50 can be customized, is available at the digital camera 1D. As the user performs a predetermined operation at the operation member 16 to issue an instruction for shifting into the customize mode, the control unit 14 shifts into the customize mode.

As the operation shifts into the customize mode, a list display area 54 where types of image processing that can be set in the ring image 50 are indicated in a list is formed to the right of the ring image 50, as shown in FIG. 38(a). The display control unit 14a displays image processing icons 53 (53a through 55d) bearing the names of the image processing that can be set in the ring image 50 as a list in the list display area 54. It is to be noted that the image processing icons 53 displayed in the list display area 54 represent types of image processing different from the image processing already set in the setting areas 52 in the ring image 50. The image processing icons 53a through 53d in the example presented in FIG. 38(a) respectively represent "vivid", "toy camera", "landscape" and "avant-garde". "vivid" is image processing executed to create a high-contrast image with vivid colors. "toy camera" is image processing executed to achieve an image effect conventionally realized in an image captured through a toy camera. "landscape" is image processing executed to create an image optimized for landscapes such as nature and street scenes. "avant-garde" is image processing executed to create a unique image by further raising the contrast and saturation relative to "vivid". It is to be noted that while four types of image processing are displayed in the example presented in FIG. 38(a), the number of types of image processing that can be set in the ring image 50 is not limited to four. For instance, the user may flick his finger at the list display area 54 (i.e., touch his finger and flick it over the list display area so as to scroll image processing icons 53 displayed in the list display area 54, i.e., so as to switch image processing icons).

In the customize mode, a setting area 52 used for image processing setting can be added to or removed from the ring image 50.

The user, wishing to add a new setting area 52 to the ring image 50, performs a drag-and-drop operation to move the image processing icon 34 corresponding to desired image processing, among the image processing icons 53 displayed in the list display area 54, into the ring image 50. This drag-and-drop operation may be performed by, for instance, touching a target item to be dragged (an image processing icon 53) on the touch panel 16*b*, moving the finger while maintaining contact and lifting the finger at the drop position (inside the ring image 50).

Figure 38:
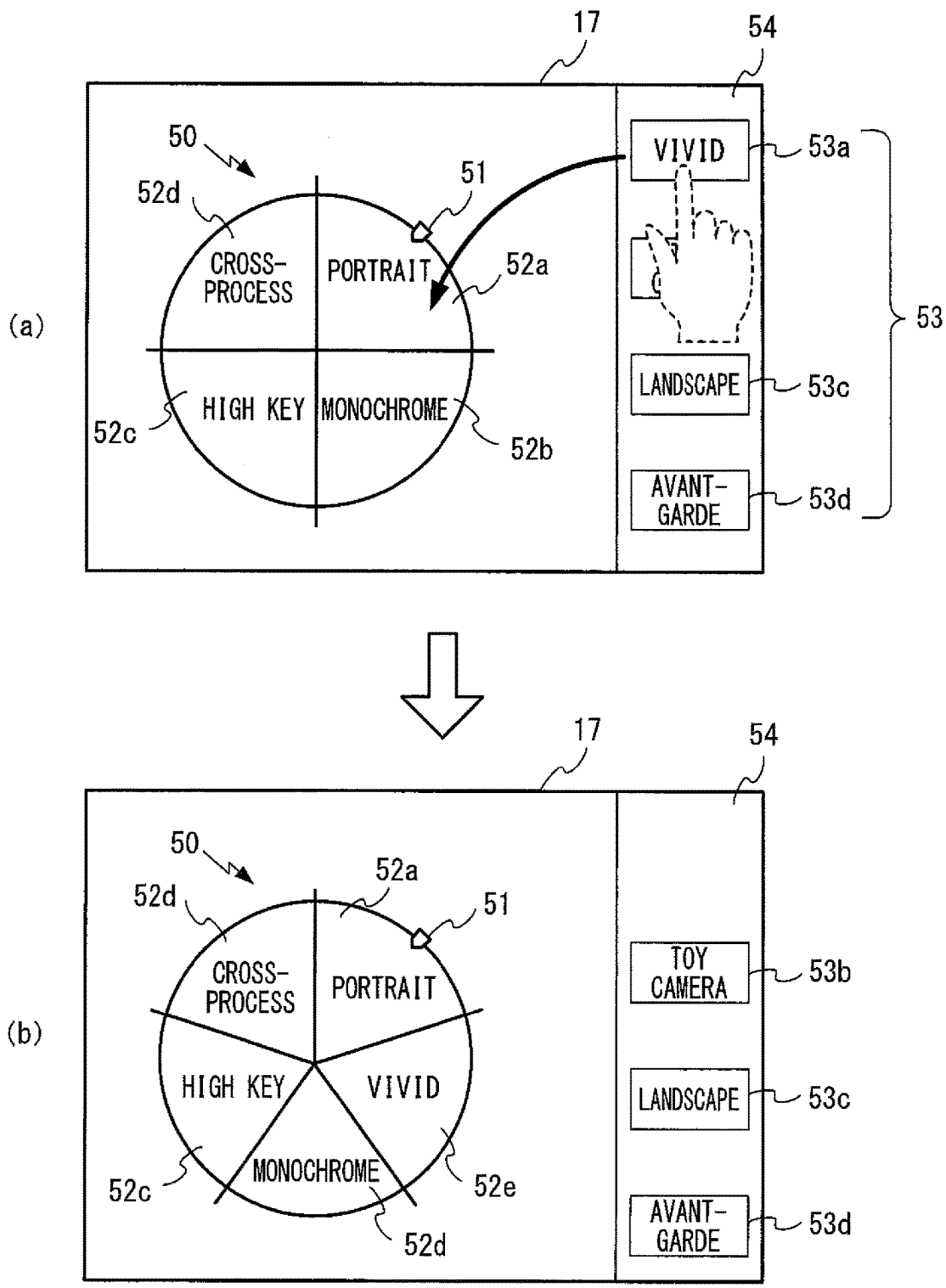

For instance, a drag-and-drop operation may have been performed to move the image processing icon 53*a* ("vivid") into the setting area 52*a* ("portrait") in the ring image 50. In this case, upon detecting the operation via the touch panel 16*b*, the customize processing unit 14*d* in the control unit 14 adds a setting area 52*e*, in which the image processing "vivid" corresponding to the image processing icon 53*a* is to be set, to the ring image 50, as shown in FIG. 38(*b*). The setting area 52*e* is added so that it takes a position adjacent to the setting area 52*a*, where the image processing icon 53*a* has been dropped, along the clockwise direction (between the setting area 52*a* and the setting area 52*b* in the example presented in FIG. 38(*b*)). At this time, the setting area 52*a* through the setting area 52*e* are set by dividing the ring image 50 into five equal portions, each defined by a circular arc with a central angle of 72°. In addition, the image processing icon 53*a* on which the drag-and-drop operation has been performed, is cleared from the display.

By performing a drag-and-drop operation so as to move an image processing icon 53 into the ring image 50, the user is able to specify the image processing corresponding to the particular image processing icon 53 as image processing to be set in the ring image 50. As the image processing to be added into the ring image 50 is specified through the user operation as described above, the customize processing unit 14*d* adds a new setting areas 52, different from the existing setting area 52 already set in the ring image 50, so as to set the image processing specified through the user operation in the new setting area 52 in the ring image 50.

Figure 39:
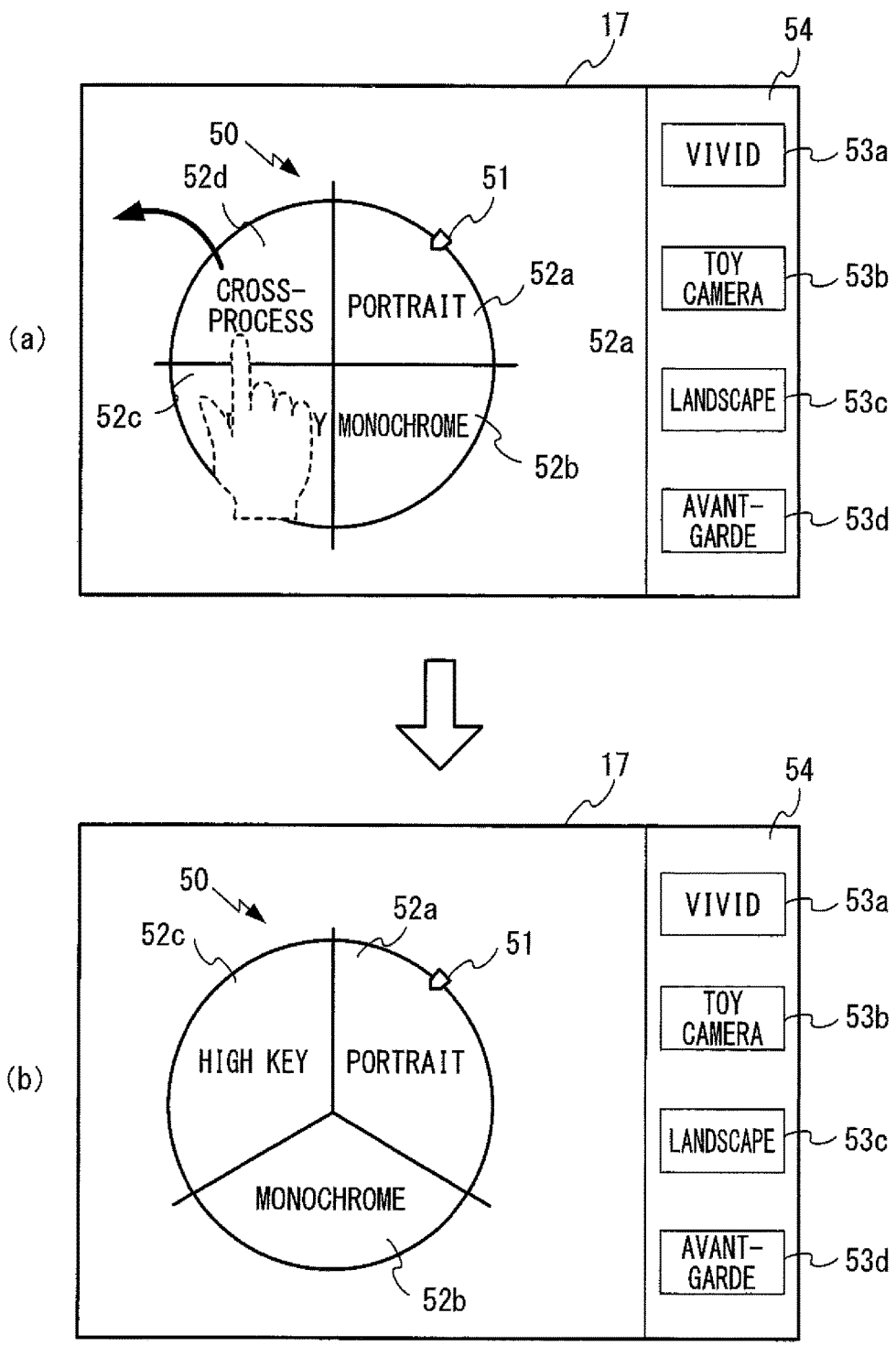

In addition, the user wishing to remove a setting area 52 from the ring image 50 performs a drag-and-drop operation so as to move the setting area 52 to be removed from the ring image 50. For instance, a drag-and-drop operation may have been performed so as to move the setting area 52*d* ("cross-process") out of the ring image 50 where four setting areas 52*a* through 52*d* are currently set, as shown in FIG. 39(*b*). Upon detecting the operation via the touch panel 16*b*, the customize processing unit 14*d* removes the setting area 52*d* ("cross-process") from the ring image 50, as shown in FIG. 39(*b*). At this time, the remaining setting area 52*a* through the setting area 52*c* are adjusted by dividing the ring image 50 into three equal portions, each defined with a circular arc having a central angle of 120°.

As described above, the user is able to specify a setting area 52 to be removed from the ring image 50 by performing a drag-and-drop operation so as to move the particular setting area 52 out of the ring image 50. As the setting area 52 to be removed from the ring image 50 is specified through the user operation performed as described above, the customize processing unit 14*d* removes the setting area 52 specified through the user operation from the ring image 50.

It is to be noted that as the size of the setting areas 52 changes (as the central angle changes), the number of steps over which the image processing parameter (effect level) can be adjusted in each setting area 52 is increased/decreased. When the size of a setting area 52 is greater, the corresponding image processing parameter (effect level) can be adjusted over a greater number of steps, whereas when the size of the setting area 52 is smaller, the image processing parameter (effect level) can only be adjusted over a smaller number of steps. For instance, as the ring image 50 undergoes a change from the state shown in FIG. 38(*a*) to the state shown in FIG. 38(*b*) with a new addition of a setting area 52, the size of each setting area 52 becomes smaller and as a result, the number of steps over which the image processing parameter can be set in each setting area 52 is reduced. As the ring image undergoes a change from the state shown in FIG. 39(*a*) to the state shown in FIG. 39(*b*) with one of the setting areas 52 removed from the ring image, the size of each setting area 52 becomes greater and thus, the number of steps over which the image processing parameter can be adjusted in each setting area 52 increases.

As the user performs a predetermined operation via the operation member 16 to issue a customize mode end instruction, the control unit 14 ends the customize mode and clears the list display area 54 from the display screen. Subsequently, the image processing to be executed on the captured image can be selected as has been explained earlier by using the ring image 50 having been customized in the customize mode.

Figure 40:
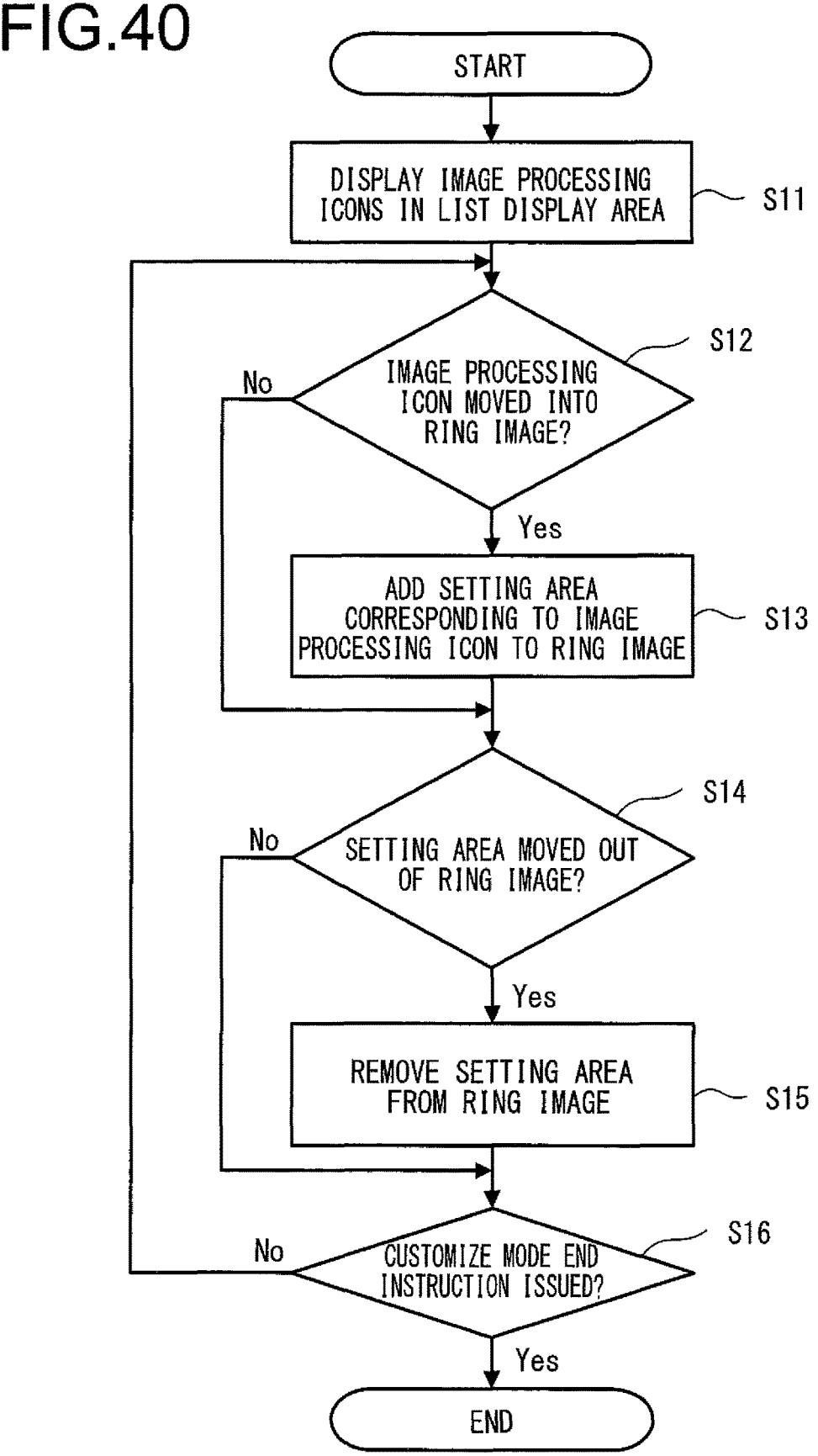

The flow of the processing executed by the control unit 14 in the customize mode described above will be explained next in reference to the flowchart presented in FIG. 40. As an instruction for a shift into the customize mode is issued through a user operation, the customize processing unit 14*d* starts up a program enabling the processing shown in FIG. 40, stored in a memory, and thus starts the processing.

In step S11, the display control unit 14*a* displays a plurality of image processing icons 53, bearing the names of the image processing that can be set in the ring image 50, in the list display area 54 set to the right of the ring image 50.

In step S12, the customize processing unit 14*d* makes a decision as to whether or not a drag-and-drop operation has been performed to move an image processing icon 53 in the list display area 54 into the ring image 50. If the customize processing unit 14*d* decides that such an operation has been performed, the operation proceeds to step S13, whereas if it decides that no such operation has been performed, the operation proceeds to step S14.

In step S13, the customize processing unit 14*d* adds a setting area 52, where the image processing corresponding to the image processing icon 53 on which the operation has been performed, is to be set to the ring image 50, as described earlier.

In step S14, the customize processing unit 14*d* makes a decision as to whether or not a drag-and-drop operation has been performed to move a setting area 52 in the ring image 50 out of the ring image 50. If the customize processing unit 14*d* decides that such an operation has been performed, the operation proceeds to step S15, whereas if it decides that no such operation has been performed, the operation proceeds to step S16.

In step S15, the customize processing unit 14*d* removes the setting area 52 on which the operation has been performed from the ring image 50, as described earlier.

In step S16, the customize processing unit 14*d* makes a decision as to whether or not a customize mode end instruction has been issued. If the customize processing unit 14*d* decides that a customize mode end instruction has not been issued, the operation returns to step S12, whereas if it decides that a customize mode end instruction has been issued, the processing in FIG. 40 ends and the operation exits the customize mode.

The following advantages and operations are achieved through the fourth embodiment described above.

(1) The display control unit 14*a* in the digital camera 1D brings up a setting image (i.e., the ring image 50), in which setting areas 52 are set to enable image processing settings on display at the display unit 17. Once a given setting area 52 is specified through a user operation (performed by moving the cursor 51), the image processing unit 14*c* executes the image processing corresponding to the specified setting area 52 on the captured image. As a given type of image processing, which is not currently set in the ring image 50, is specified through a user operation (performed by moving an image processing icon 53), the customize processing unit 14d sets a setting area 52, in which the specified image processing is to be set, in the ring image 50. The user of the digital camera 1D described above is able to customize the ring image 50 where image processing is set through a user operation, and thus, the ring image 50 can be optimized for each user.

(2) The display control unit 14a in the digital camera 1D brings up a plurality of image processing icons 53, each corresponding to one of a plurality of types of image processing, on display at the display unit 17. In response to a drag-and-drop operation performed to move an image processing icon 53 into the ring image 50, the customize processing unit 14d adds a setting area 52 where the image processing corresponding to the particular image processing icon 53 is to be set into the ring image 50. In addition, in response to a drag-and-drop operation performed to move a setting area 52 out of the ring image 50, the customize processing unit 14d removes the setting area 52 from the ring image 50. The user of the digital camera 1D is thus easily able to customize the ring image 50 by performing drag-and-drop operations.

(Fifth Embodiment)

The fifth embodiment of the present invention will be described next in reference to drawings. It is to be noted that a digital camera 1D achieved in the fifth embodiment adopts a structure similar to that described in reference to FIG. 35 and a repeated explanation of identical structural elements assigned with the same reference numerals will not be provided. In addition, since processing is executed in the creative mode through a processing flow similar to that described in reference to FIG. 36, a repeated explanation will not be provided. The fifth embodiment differs from the fourth embodiment in the processing executed to set the image processing to be executed in correspondence to the position of the cursor 51 in the ring image 50, and this processing will be described in detail next.

Figure 41:
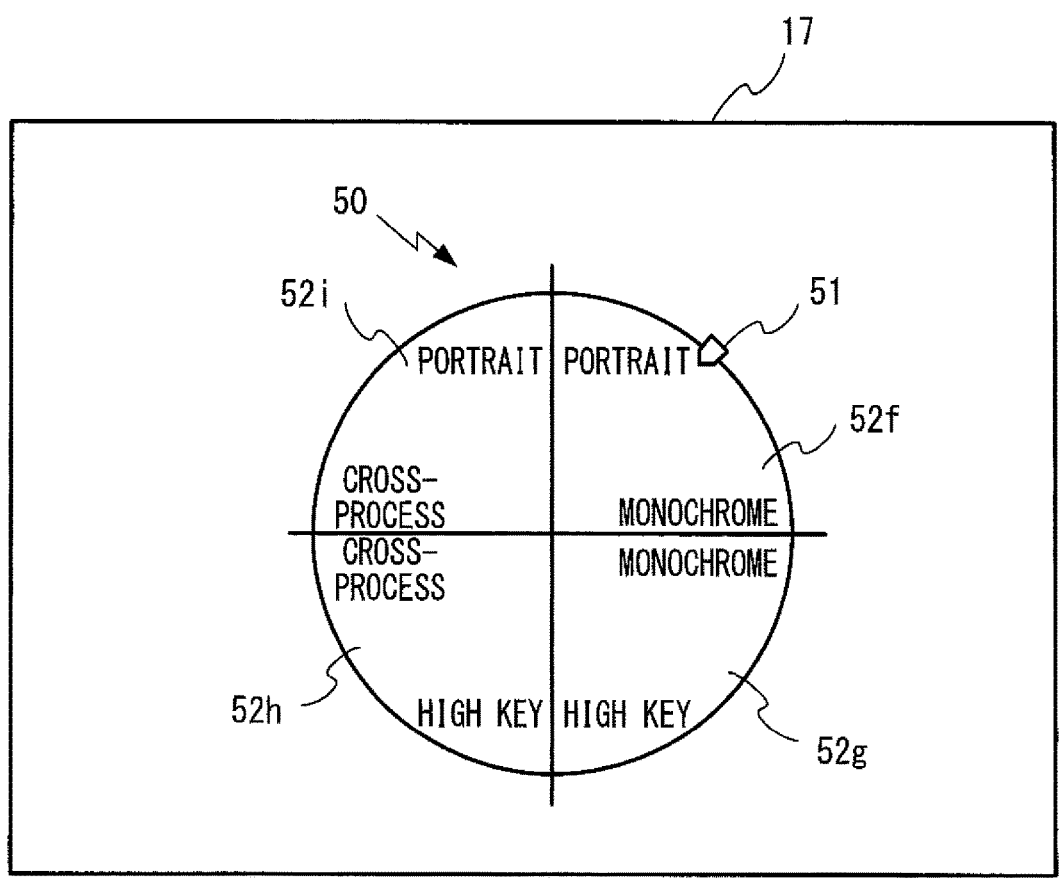

In reference to FIG. 41, the ring image 50 achieved in the fifth embodiment will be described. The fifth embodiment is distinct from the fourth embodiment in that a single type of image processing or two types of image processing can be set in a given setting area 52. When a single type of image processing is set in a setting area 52, the image processing is selected and the image processing parameter (effect level) for the particular image processing is set in the setting area 52 as in the fourth embodiment. In addition, when two types of image processing are set in a setting area 52, the two types of image processing are selected and an image processing parameter for the two types of image processing (i.e., ratios for the two types of image processing) is set in the setting area 52.

The user is able to customize setting areas 52 in the ring image 50 as he desires in the fifth embodiment as well (as will be explained in further detail later). Four setting areas 52f through 52i are set in the ring image 50 in the default state, as shown in FIG. 41. The setting areas 52f through 52i are each defined by a circular arc with a 90° central angle (a quarter circle), formed by dividing the ring image 50 into four equal portions. In this example, the setting area 52f, the setting area 52g, the setting area 52h and the setting area 52i are set in this order along the clockwise direction, starting at the top point in the ring image 50. In the ring image 50, the ranges of the setting area 52f through the setting area 52i are indicated with, for instance, lines dividing the ring image 50 into four equal portions.

In addition, the setting area 52f, for instance, is set as an area where "portrait" and "monochrome" are selected. The setting area 52g is set as an area where "monochrome" and "high key", are selected. The setting area 52h is set as an area where "high key" and "cross-process", are selected. The setting area 52i is set as an area where "cross-process" and "portrait", are selected. Text indicating the names of the corresponding types of processing is displayed in the setting area 52f through the setting area 52i in the ring image 50.

The user specifies the image processing to be executed on the captured image by moving the cursor 51 into a specific setting area 52. The image processing setting unit 14b sets the image processing corresponding to the setting area 52 where the cursor 51 is set as the image processing to be executed on the captured image. For instance, if the cursor 51 is set in the setting area 52f, the image processing setting unit 14b sets the two types of image processing "portrait" and "monochrome" as the processing to be executed on the captured image. The image processing is likewise set when the cursor 51 is a setting area among the setting area 52g through the setting area 52i.

In addition, the image processing setting unit 14b sets an image processing parameter for the processing to be executed on the captured image in correspondence to the position of the cursor 51 in the setting area 52. The ratios for the two types of image processing are set as the image processing parameter in the fifth embodiment. For instance, when the cursor 51 is set in the setting area 52f, the image processing setting unit 14b sets the ratios for "portrait" and "monochrome" in correspondence to the position of the cursor 51 in the setting area 52f. When the position of the cursor 51 in the setting area 52f is closer to the setting area 52g, adjacent to the setting area 52f along the clockwise direction, the image processing setting unit 14b sets a lower ratio for "portrait" and sets a higher ratio for "monochrome". When the position of the cursor 51 in the setting area 52f is closer to the setting area 52i, adjacent to the setting area 52f along the counterclockwise direction, the image processing setting unit 14b sets a higher ratio for "portrait" and sets a lower ratio for "monochrome". In other words, as the cursor 51 moves along the clockwise direction in the setting area 52f, the image processing setting unit 14b lowers the ratio for "portrait" and raises the ratio for "monochrome". Furthermore, as the cursor 51 moves along the counterclockwise direction in the setting area 52f, the image processing setting unit 14b raises the ratio for "portrait" and lowers the ratio for "monochrome" In addition, in order to enable the user to intuitively grasp how the image processing parameter is adjusted for the image processing, text "portrait" is displayed on the counterclockwise side and text "monochrome" is displayed on the clockwise side in the setting area 52f.

The image processing setting unit 14b adjusts the ratios for "portrait" and "monochrome" in a predetermined number of steps as the cursor 51 moves in the setting area 52f. For instance, as the cursor 51 moves along the clockwise direction, the ratios are adjusted from "portrait 100%" to "portrait 75%, monochrome 25%" (i.e., a setting at which the image processing "portrait" and the image processing "monochrome" are executed at a ratio of 75% to 25%, to "portrait 50%, monochrome 50%", to "portrait 25%, monochrome 75%" and finally to "monochrome 100%".

It is to be noted that at the settings "portrait 75%, monochrome 25%", "portrait 50%, monochrome 50%" and "portrait 25%, monochrome 75%", both "portrait" and "monochrome" are executed (i.e., combined application of "portrait" and "monochrome"). In addition, the image processing "portrait" executed at, for instance, a ratio of 75% means that relative to the extent of the change occurring in the captured image having undergone the image processing "portrait" alone, i.e., having undergone the image processing "portrait" executed at 100%, the image processing "portrait" is executed so that the captured image changes to an extent that is 75%.

As described above, the image processing setting unit 14b sets the ratios for the two types of image processing "portrait" and "monochrome" in correspondence to the position taken by the cursor 51 in the setting area 52f. The image processing unit 14c applies the two types of image processing in combination to the captured image with the ratios set by the image processing setting unit 14b. Through this processing, the captured image on display at the display unit 17 gradually changes from the state having undergone the image processing "portrait" alone toward the state having undergone the image processing "monochrome" alone as the cursor 51 moves along the clockwise direction in the setting area 52f.

It is to be noted that the ratios for the two types of image processing corresponding to any setting area among the setting area 52h through the setting area 52i are likewise adjusted when the cursor 51 is set in the particular setting area. This means that as the cursor 51 moves through the setting areas 52f through 52i along the clockwise direction (i.e., moves through a full cycle along the clockwise direction) in the default ring image 50, the image processing executed on the captured image gradually changes in the order of: "portrait", "monochrome", "high key" and "cross-process" before "portrait" is resumed as the image processing setting.

<Customize Mode>

A customize mode, in which the ring image 50 can be customized is also available in the digital camera 1D achieved in the fifth embodiment. As the user performs a predetermined operation at the operation member 16 to issue an instruction for shifting into the customize mode, the control unit 14 shifts into the customize mode.

As the operation shifts into the customize mode, a list display area 54 is formed to the right of the ring image 50, as shown in FIG. 42(a). The display control unit 14a displays image processing icons 53 (53a through 55d) bearing the names of the image processing that can be set in the ring image 50 in a single vertical row in the list display area 54. The image processing icons 53a through 53d in the example presented in FIG. 42(a) respectively represent "vivid", "toy camera", "landscape" and "avant-garde".

In the customize mode in the fifth embodiment, too, a setting area 52 used for image processing setting can be added to or removed from the ring image 50.

The user, wishing to add a new setting area 52 to the ring image 50, performs a drag-and-drop operation so as to move the image processing icon 34 corresponding to desired image processing, among the image processing icons 53 displayed in the list display area 54, into the ring image 50. For instance, a drag-and-drop operation may have been performed so as to move the image processing icon 53a ("vivid") into the setting area 52f ("portrait" and "monochrome") in the ring image 50. Upon detecting the operation via the touch panel 16b, the customize processing unit 14d adds a setting area 52j, in which the image processing "vivid" corresponding to the image processing icon 53a is to be set, to the ring image 50, as shown in FIG. 42(b). At this time, the setting area 52a through the setting area 52j are set by dividing the ring image 50 into five equal portions, each defined by a circular arc with a central angle of 72°. In addition, the setting area 52j is added so that it takes a position adjacent to the setting area 52f, where the image processing icon 53a has been dropped, along the clockwise direction (between the setting area 52f and the setting area 52g in the example presented in FIG. 42(b)).

In addition, while two types of image processing are set in each of the setting area 52f through the setting area 52i, a single type of image processing ("vivid") is set in the added setting area 52j. Text "vivid" indicating the contents of the image processing is displayed in the setting area 52j. The image processing is set in the setting area 52j so that as the cursor 51 moves along the counterclockwise direction in the setting area 52j, the effect level of the image processing "vivid" is lowered and as the cursor 51 moves along the clockwise direction, the effect level of the image processing "vivid" is raised.

The user, wishing to set a second type of image processing in the setting area 52j, performs a drag-and-drop operation to move the image processing icon 53, corresponding to the image processing he wishes to set, into the setting area 52j. For instance, he may perform a drag-and-drop operation to move the image processing icon 53b ("toy camera") into the setting area 52j ("vivid") as shown in FIG. 43(a). Upon detecting the operation via the touch panel 16b, the customize processing unit 14d adds the image processing "toy camera" corresponding to the image processing icon 53b into the setting area 52j, as shown in FIG. 43(b). Namely, the customize processing unit 14d alters the setting area 52j to a setting area where both "vivid" and "toy camera" are set. At this time, text "vivid" and text "toy camera" are respectively displayed on, for instance, the counterclockwise side and the clockwise side in the setting area 52j. In other words, the image processing is set so that as the cursor 51 moves along the counterclockwise direction in the setting area 52j, the ratio for "vivid" is raised and the ratio for "toy camera" is lowered, whereas as the cursor 51 moves along the clockwise direction in the setting area 52j, the ratio for "toy camera" is raised and the ratio for "vivid" is lowered.

Figure 44:
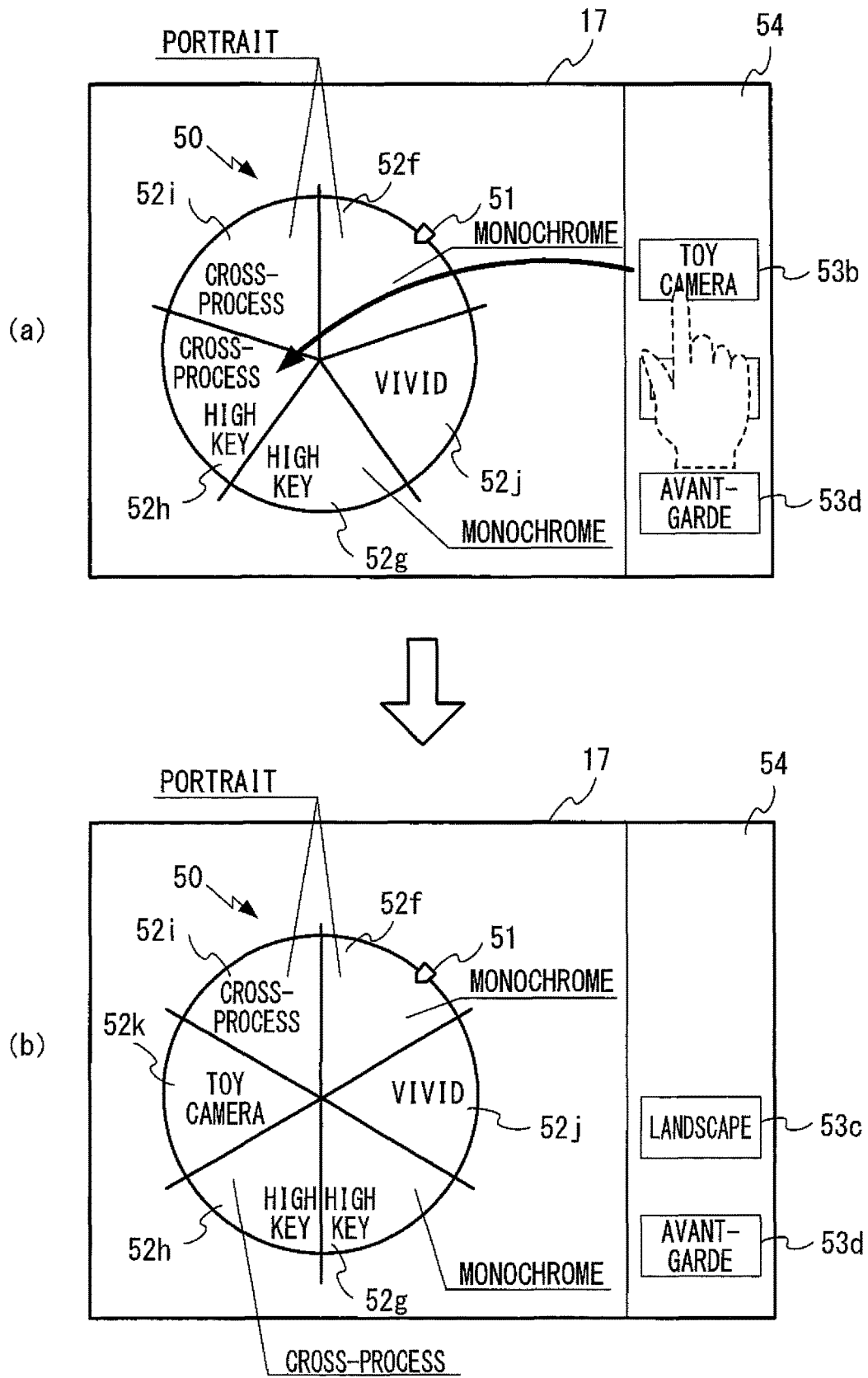

In addition, the ring image 50 may include two types of setting areas, i.e., the setting areas 52f through 52i, each having two types of image processing set therein, and the setting area 52j where only one type of image processing is set, as shown in FIG. 42(b). The user, wishing to add another setting area 52 in the ring image 50 in this state, performs a drag-and-drop operation to move the image processing icon 53 corresponding to the desired image processing into one of the setting areas, each having two types of image processing set therein (a setting area among the setting area 52f through the setting area 52i in this example). For instance, five setting areas 52f through 52j may be currently set in the ring image 50, as shown in FIG. 45(a). The user may perform a drag-and-drop operation to move the image processing icon 53b ("toy camera") into the setting area 52h ("high key" and "cross-process") in this state. In this situation, upon detecting the operation via the touch panel 16b, the customize processing unit 14d adds a setting area 52k, in which the image processing "toy camera" corresponding to the image processing icon 53b is to be set, to the ring image 50, as shown in FIG. 44(b). At this time, the setting area 52f through the setting area 52k are set by dividing the ring image 50 into six equal portions, each defined by a circular arc with a central angle of 60°. In addition, the setting area 52k is added so that it takes a position adjacent to the setting area 52h, where the image processing icon 53b has been dropped, along the clockwise direction (between the setting area 52*h* and the setting area 52*i* in the example presented in FIG. 44(*b*)).

As described above, if a drag-and-drop operation is performed to move an image processing icon 53 into a setting area 52 where two types of image processing are currently set, the customize processing unit 14*d* adds a setting area 52 corresponding to the particular image processing icon 53 to the ring image 50. If, on the other hand, a drag-and-drop operation is performed to move an image processing icon 53 into a setting area 52 where one type of image processing is set, the customize processing unit 14*d* alters the particular setting area 52 into a setting area 52 used to set both the existing image processing and the image processing corresponding to the image processing icon 53.

In addition, the user, wishing to remove a setting area 52 from the ring image 50 performs a drag-and-drop operation to move the setting area 52 to be removed from the ring image 50, as in the fourth embodiment. Upon detecting the operation via the touch panel 16*b*, the customize processing unit 14*d* removes the setting area 52 on which the operation has been performed from the ring image 50.

It is to be noted that in the fifth embodiment, too, the number of steps over which the image processing parameter can be adjusted in each setting area 52 increases/decreases as the size of the setting area 52 changes (as the central angle changes), as in the fourth embodiment.

Figure 45:
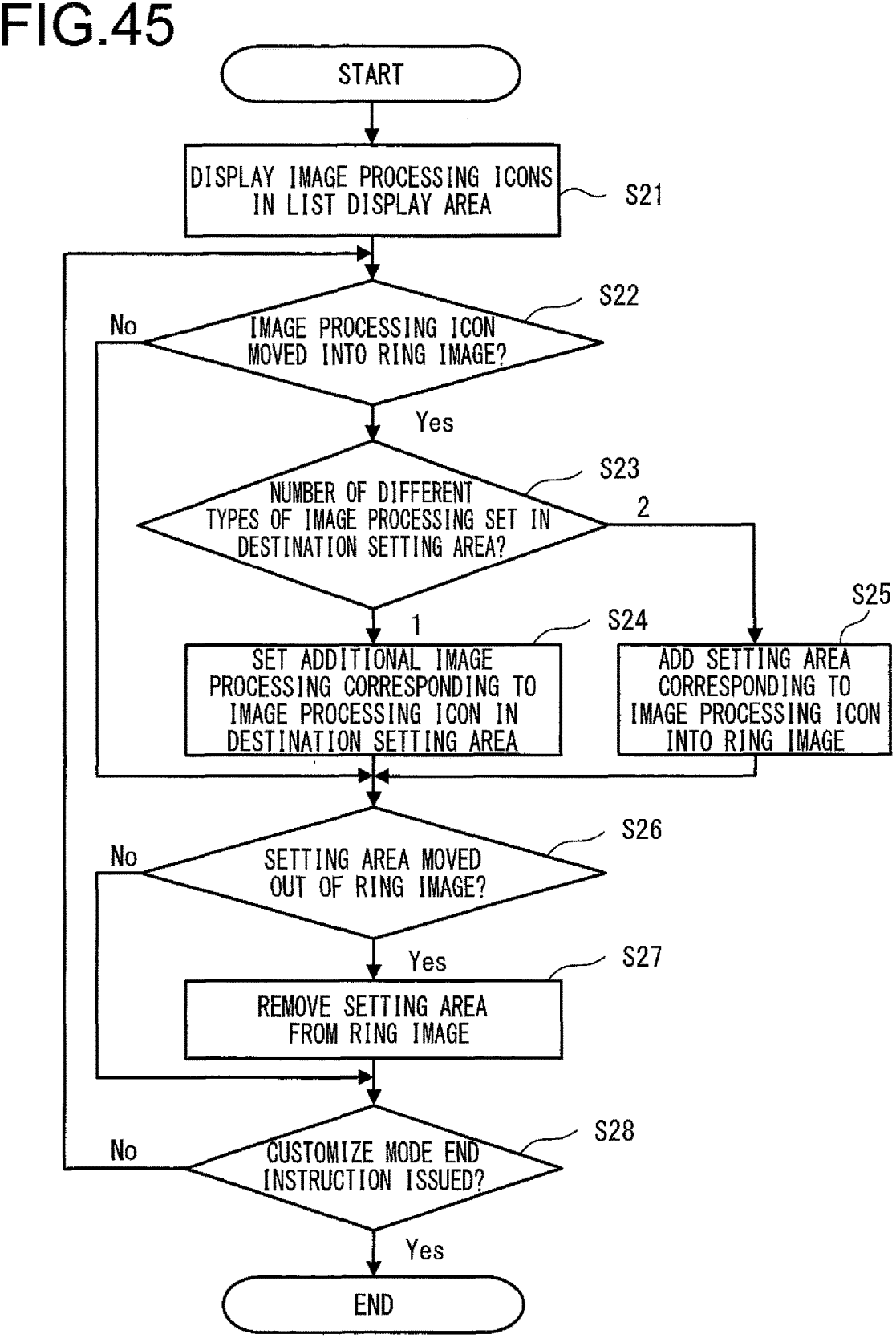

The flow of the processing executed by the control unit 14 in the customize mode described above will be explained next in reference to the flowchart presented in FIG. 45. As an instruction for a shift into the customize mode is issued through a user operation, the customize processing unit 14*d* starts up a program enabling the processing shown in FIG. 40, stored in a memory, and thus starts the processing.

In step S21, the display control unit 14*a* displays a plurality of image processing icons 53, bearing the names of the image processing that can be set in the ring image 50, in the list display area 54 set to the right of the ring image 50.

In step S22, the customize processing unit 14*d* makes a decision as to whether or not a drag-and-drop operation has been performed to move an image processing icon 53 in the list display area 54 into the ring image 50. If the customize processing unit 14*d* decides that such an operation has been performed, the operation proceeds to step S23, whereas if it decides that no such operation has been performed, the operation proceeds to step S26.

In step S23, the customize processing unit 14*d* determines the number of types of image processing currently set in the setting area 52 specified as the destination for the image processing icon 53. If the customize processing unit 14*d* determines that one type of image processing is currently set in the setting area 52 specified as the destination for the image processing icon 53, the operation proceeds to step S24. If, on the other hand, the customize processing unit 14*d* determines that two types of image processing are currently set in the setting area specified as the destination for the image processing icon 53, the operation proceeds to step S25.

In step S24, the customize processing unit 14*d* adds the image processing corresponding to the image processing icon 53 into the setting area 52 specified as the destination for the image processing icon 53, as explained earlier. Namely, the customize processing unit 14*d* alters the destination setting area 52 into a setting area 52 used to set both the existing image processing and the image processing corresponding to the image processing icon 53.

In step S25, the customize processing unit 14*d* adds a setting area 52, in which the image processing corresponding to the image processing icon 53 having been moved, to the ring image 50, as described earlier.

In step S26, the customize processing unit 14*d* makes a decision as to whether or not a drag-and-drop operation has been performed to move a setting area 52 in the ring image 50 out of the ring image 50. If the customize processing unit 14*d* decides that such an operation has been performed, the operation proceeds to step S27, whereas if it decides that no such operation has been performed, the operation proceeds to step S28.

In step S27, the customize processing unit 14*d* removes the setting area 52 on which the operation has been performed from the ring image 50, as described earlier.

In step S28, the customize processing unit 14*d* makes a decision as to whether or not a customize mode end instruction has been issued. If the customize processing unit 14*d* decides that a customize mode end instruction has not been issued, the operation returns to step S22, whereas if it decides that a customize mode end instruction has been issued, the processing in FIG. 45 ends and the operation exits the customize mode.

It is to be noted that the user may be allowed to perform a user operation in the customize mode described above so that when there are two setting areas 52 each having one type of image processing set therein, these two setting areas 52 are combined into a single setting area. In such a case, the customize processing unit 14*d* may recognize a holding operation performed at any positions within two different setting areas 52 as a user operation for combining the two setting areas 52. The term "holding operation" in this context refers to an operation performed by keeping fingers or the like in contact with the touch panel 16*b* at given positions over a length of time equal to or greater than a predetermined time length.

Figure 46:
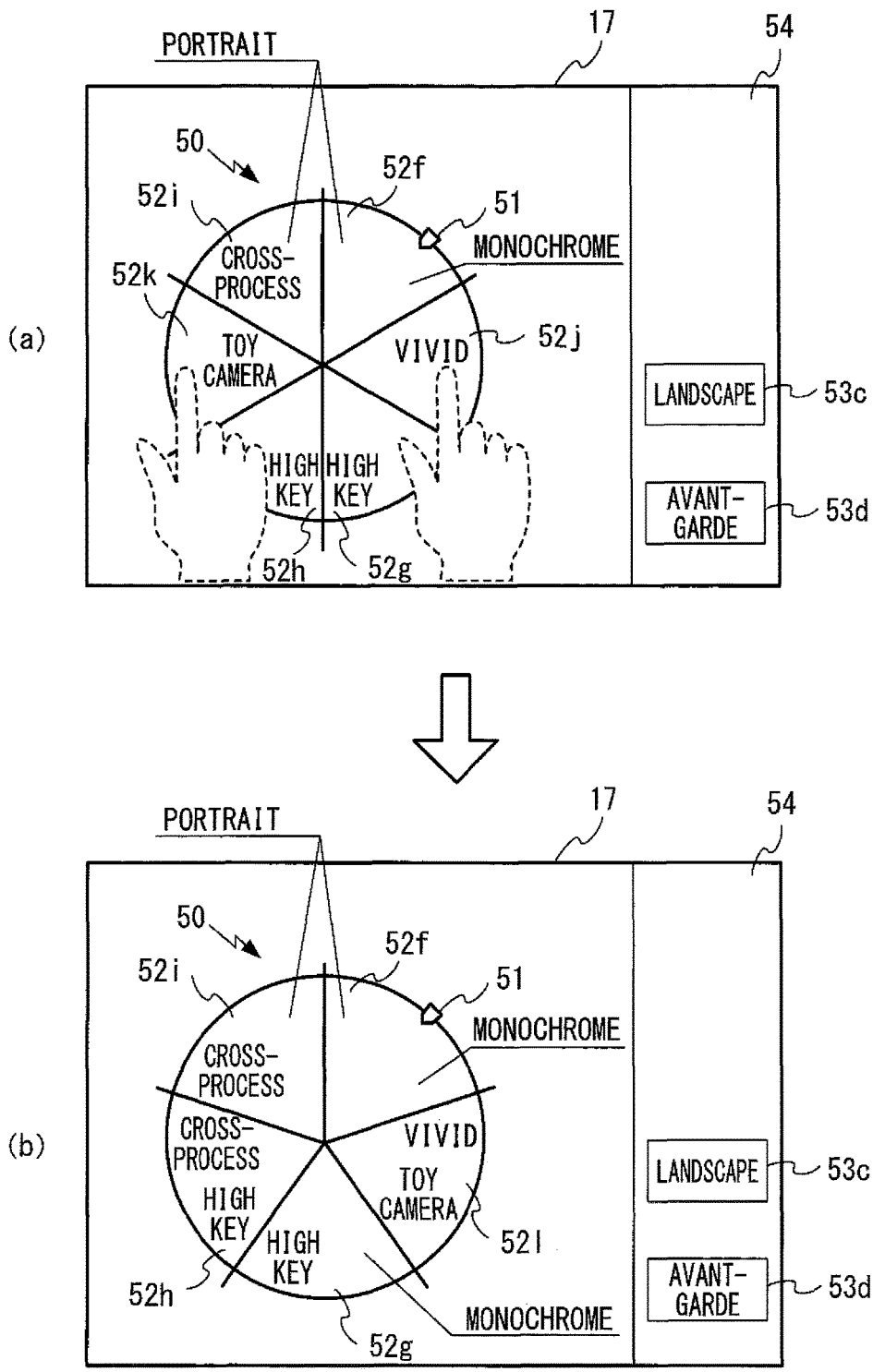

For instance, the ring image 50 may include a setting area 52*j* with one type of image processing ("vivid") set therein and a setting area 52*k* having one type of image processing ("toy camera") set therein, as shown in FIG. 46(*a*). This ring image 50 also includes four other setting areas 52*f* through 52*i*. In this state, the user may perform a holding operation by holding two fingers at a given position in the setting area 52*j* and at a given position in the setting area 52*k*. In this case, upon detecting the operation via the touch panel 16*b*, the customize processing unit 14*d* combines the setting area 52*j* and the setting area 52*k* to create a setting area 52*l* where the two types of image processing, i.e., the image processing "vivid" corresponding to the setting area 52*j* and the image processing "toy camera" corresponding to the setting area 52*k*, are set, as shown in FIG. 46(*b*). Namely, the customize processing unit 14*d* removes the setting area 52*j* and the setting area 52*k* and adds a new setting area 52*l* at the position formerly occupied by the setting area 52*j*.

In addition, when a drag-and-drop operation is performed so as to move an image processing icon 53 into a setting area 52 where one type of image processing is currently set, the image processing corresponding to the image processing icon 53 is added into the setting area 52 through the processing described above. However, the processing corresponding to the image processing icon 53 having been moved and the existing image processing set in the setting area 52 may not be compatible, i.e., dual application of the two types of image processing on the captured image may not be possible (e.g., "monochrome" and "vivid"). Under such circumstances, the customize processing unit 14*d* may add a new setting area 52, in which the image processing corresponding to the image processing icon 53 having been moved is to be set, to the ring image 50, instead of adding the image processing corresponding to the image processing icon 53 into the destination setting area 52. In addition, the customize processing unit 14*d* may provide a display of the image processing icon 53 appearing as if it is flicked away from the destination setting area 52. Such a display allows the user to recognize that the image processing corresponding to the image processing icon 53 cannot be added into the destination setting area 52. It is to be noted that information indicating different types of image processing that cannot be applied to the captured image in combination may be stored in advance in a memory (not shown) so that the customize processing unit 14*d* is able to reference the information stored in the memory.

The following advantages and operations are achieved through the fifth embodiment described above.

In response to a drag-and-drop operation performed to move an image processing icon 53 corresponding to first image processing (e.g., "toy camera") into a setting area 52 where second processing (e.g., "vivid") is set, the customize processing unit 14*d* in the digital camera ID alters the setting area 52 into a setting area 52 where both the first image processing and the second image processing can be set. In addition, in response to a drag-and-drop operation performed to move an image processing icon 53 corresponding to third image processing (e.g., "landscape") into a setting area 52 where first image processing (e.g. "toy camera") and second image processing (e.g., "vivid") are both currently set, the customize processing unit 14*d* creates another setting area 52 to be used to set the third image processing, as an addition to the existing setting area 52, in the ring image 50. Thus, the ring image 50 can be customized with ease at the digital camera 1D through drag-and-drop operations.

(Variation 1)

An image processing icon 53 corresponding to image processing for which a setting area 52 is already set in the ring image 50 may also be displayed in the list display area 54 in the fifth embodiment. In such a case, a drag-and-drop operation may be performed so as to move the image processing icon 53 corresponding to the image processing matching the image processing already set in the setting area 52, to the setting area 52 in the ring image 50. In this case, the customize processing unit 14*d* recognizes the operation as an instruction for altering the manner with which the corresponding image processing parameter is adjusted in the setting area 52.

Figure 47:
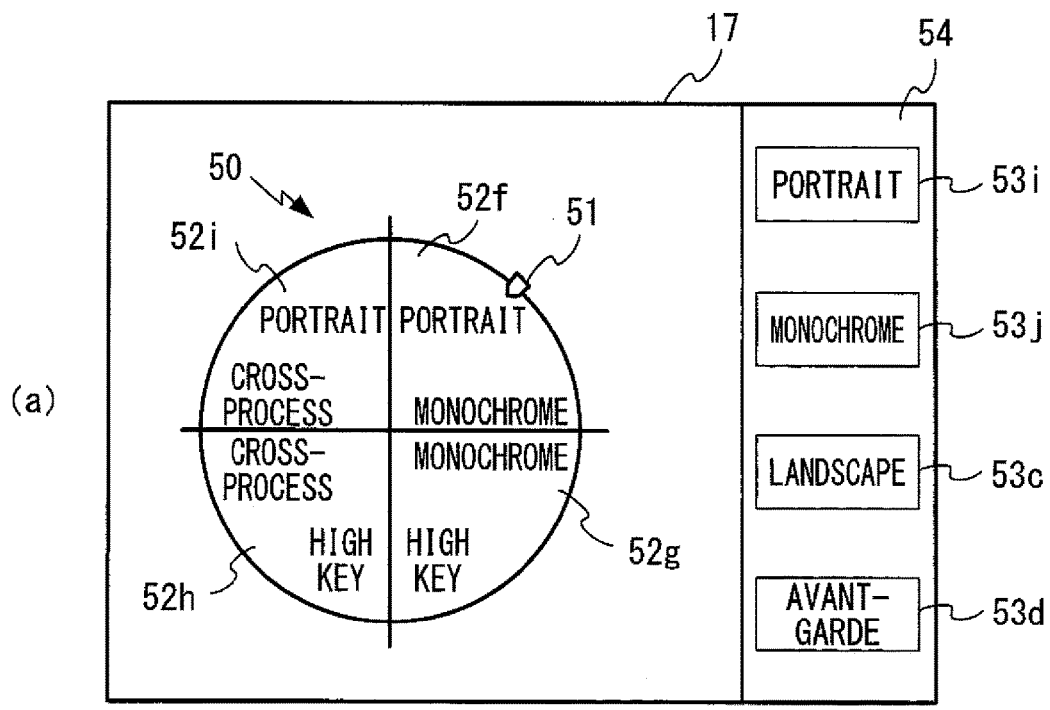

For instance, four setting areas 52*f* through 52*i* may be set in the ring image 50, as shown in FIG. 47. The setting area 52*f* is used to set "portrait" and "monochrome". In the setting area 52*f*, the ratios for the image processing "portrait" and the image processing "monochrome" executed on the captured image can be set as an image processing parameter. In the list display area 54, an image processing icon 53*i* corresponding to "portrait" and an image processing icon 53*j* corresponding to "monochrome" are displayed.

Figure 48:
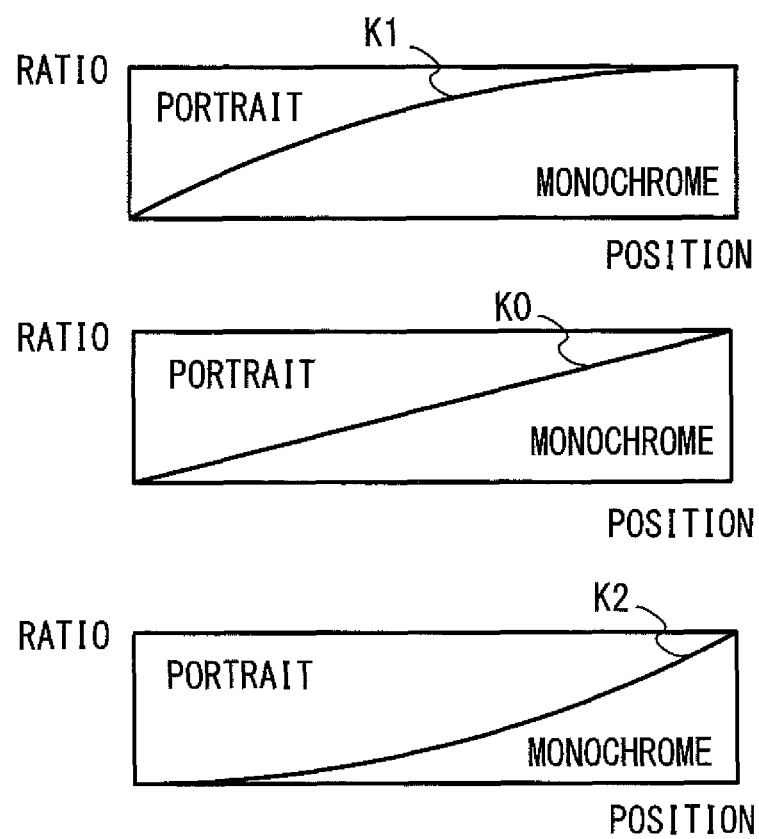
FIG. 48 Diagrams each indicating an image processing parameter change curve

FIG. 48 presents diagrams each showing a change curve based upon which the ratios for the image processing "portrait" and the image processing "monochrome" are adjusted in correspondence to the position taken by the cursor 51 in the setting area 52*f*. The figure provides three different change curves K0, K1 and K2. In FIG. 48, the positions of the cursor 51 in the setting area 52*f* are indicated along the horizontal axis. The direction running from left to right corresponds to the clockwise direction in the ring image 50. The ratio for the image processing "portrait" is indicated on the side of the vertical axis upward relative to the change curve, whereas the ratio for the image processing "monochrome" is indicated on the side of the vertical axis downward relative to the change curve. In each change curve, the ratio for the image processing "portrait" is 100% and the ratio for the image processing "monochrome" is 0% at the left end position and the ratio for "portrait" is 0% and the ratio for "monochrome" is 100% at the right end.

In the default state, the image processing setting unit 14*b* changes the ratio for the image processing "portrait" and the image processing "monochrome" as indicated by the change curve K0 in the setting area 52*f*. The change curve K0 is actually a straight line. Accordingly, when the image processing ratios change as indicated by the change curve K0, the ratio for "portrait" changes rectilinearly from 100% to 0% and the ratio for "monochrome" also changes rectilinearly from 0% to 100% as the cursor 51 moves along the clockwise direction (from left to right in FIG. 48).

The user may perform a drag-and-drop operation to move the image processing icon 53*j* ("monochrome") into the setting area 52*f* in the state shown in FIG. 47. Upon detecting the operation, the customize processing unit 14*d* alters the manner with which the image processing parameter (the ratios for the two types of image processing) changes in the setting area 52*f* so that the image processing setting unit 14*b* alters the ratios for "portrait" and "monochrome", as indicated by the change curve K1. The change curve K1 projects upward, as shown in FIG. 48. Accordingly, while the image processing ratios change as indicated by the change curve K1 as the cursor 51 moves along the clockwise direction, the ratio for "monochrome" is raised (i.e., the ratio for "portrait" is lowered) faster relative to the change curve K0.

The user may perform a drag-and-drop operation to move the image processing icon 53*i* ("portrait") into the setting area 52*f* in the state shown in. FIG. 47. Upon detecting the operation, the customize processing unit 14*d* alters the manner with which the image processing parameter (the ratios for the two types of image processing) changes in the setting area 52*f* so that the image processing setting unit 14*b* alters the ratios for "portrait" and "monochrome", as indicated by the change curve K2. The change curve K2 projects downward, as shown in FIG. 48. Accordingly, while the image processing ratios change as indicated by the change curve K2 as the cursor 51 moves along the clockwise direction, the ratio for "portrait" is lowered (i.e., the ratio for "monochrome" is raised) more slowly relative to the change curve K0.

As described above, the customize processing unit 14*d* adjusts the manner with which the image processing parameter (the ratios for the two types of image processing) changes in correspondence to the position taken by the cursor 51 in the setting area 52 in response to a drag-and-drop operation performed to move an image processing icon 53 corresponding to image processing matching the type of image processing already set in a setting area 52 where two types of image processing are currently set.

In addition, in response to a drag-and-drop operation performed to move an image processing icon 53 corresponding to image processing matching the image processing already set in the setting area 52 where a single type of image processing is currently set, the customize processing unit 14*d* may adjust the manner with which the image processing parameter (effect level) changes in correspondence to the position taken by the cursor 51 in the setting area 52. For instance, the user may perform a drag-and-drop operation to move the image processing icon 53*a* for "vivid" to the setting area 52*j* where the image processing "vivid" is already set. Under such circumstances, the customize processing unit 14*d* may adjust the maximum value for the effect level that can be set for "vivid" in the setting area 52*j* (e.g., may raise the maximum value). In addition, the customize processing unit 14*d* may alter the change curve representing the effect level that changes in correspondence to the position taken by the cursor 51 in the setting area 52*j*.

(Variation 2)

In the fourth embodiment and the fifth embodiment described above, the size for the various setting areas 52 is set so as to divide the ring image 50 into equal portions. However, the present invention is not limited to this example. For instance, a new setting area 52 assuming a size greater than that of the existing setting areas 52 may be added to the ring image 50.

The user may perform a drag-and-drop operation to move the image processing icon 53*a* ("vivid") into the ring image 50 in the fourth embodiment, where four setting areas 52*a* through 52*d* are currently set, as shown in FIG. 49(*a*). In response, the customize processing unit 14*d* adds a setting area 52*e* corresponding to the image processing icon 53*a*, in a size greater than that of the existing setting areas 52*a* through 52*d* (i.e., so that the new setting area is defined with a circular arc having a greater central angle), as shown in FIG. 49(*b*). At this time, the customize processing unit 14*d* increases/decreases the number of steps over which the image processing parameter in a given setting area 52, having undergone a change in the display size, can be set. Through this processing, a relatively large number of steps can be set for image processing parameter adjustment in the setting area 52 corresponding to the image processing represented by the image processing icon 53, which has been dragged and dropped by the user. In other words, the image processing parameter can be more finely adjusted in the setting area 52.

In addition, the size of a setting area 52 set in the ring image 50 may be freely adjusted in response to a user operation such as a pinch-in operation or a pinch-out operation. It is to be noted that a pinch-in operation is performed by narrowing the distance between two contact points at which two fingers are in contact with the touch panel 16*b* at the same time. A pinch-out operation is performed by widening the distance between two contact points at which two fingers are in contact with the touch panel 16*b* at the same time. In response to a pinch-out operation performed in a setting area 52, the customize processing unit 14*d* increases the size of the particular setting area 52 and, at the same time, reduces the size of the other setting areas 52. In addition, in response to a pinch-in operation performed in a setting area 52, the customize processing unit 14*d* reduces the size of the particular setting area 52 and, at the same time, increases the size of the other setting areas 52. Furthermore, if a pinch-in operation is performed in a setting area 52 already displayed in the smallest size, the customize processing unit 14*d* may remove the setting area.

(Variation 3)

In the fourth embodiment and the fifth embodiment described above, an image may be shot by applying a plurality of types of image processing in combination corresponding to a plurality of positions inside the ring image 50 that are held by the user at the same time. For instance, the ring image 50 in the fourth embodiment may include the setting areas 52*a* through 52*d* set therein, as shown in FIG. 37. The user may perform a holding operation by holding a position in the setting area 52*a* ("portrait") and a position in the setting area 52*d* ("cross-process") in the ring image at the same time. In this situation, the control unit 14 recognizes the holding operation as a shooting instruction for shooting an image resulting from multiple application of a plurality of types of image processing. The image processing setting unit 14*b* sets the effect level for "portrait" in correspondence to the position held in the setting area 52*a* and sets the effect level for "cross-process" in correspondence to the position held in the setting area 52*d*. The image processing unit 14*c* applies the image processing "portrait" and the image processing "cross-process" in combination at the effect levels individually set by the image processing setting unit 14*b* on the captured image captured by the image sensor 12 at the time point at which the holding operation was performed. The control unit 14 then records the captured image having undergone the image processing executed by the image processing unit 14*c* into the recording medium 18.

As described above, once a position inside a first setting area 52 and a position inside a second setting area 52 within the ring image 50 are specified through a user operation (a holding operation in this example), the image processing unit 14*c* executes both the image processing corresponding to the first setting area 52 and the image processing corresponding to the second setting area 52 on the captured image. As a result, the user of the digital camera 1D is able to obtain a captured image having undergone a plurality of types of image processing by performing a simple operation.

(Variation 4)

At the digital camera 1D achieved in the fourth embodiment or the fifth embodiment described above, a continuous shooting operation may be executed in response to a holding operation performed by the user by holding a plurality of positions within the ring image 50 at the same time. In this case, the digital camera 1D may then execute the plurality of types of image processing corresponding to the plurality of positions each on one of the plurality of captured images obtained through the continuous shooting operation and record the resulting captured images.

For instance, the ring image 50 in the fifth embodiment may include the setting areas 52*a* through 52*d* set therein as shown in FIG. 37. The user may perform a holding operation by holding a position in the setting area 52*a* ("portrait") and a position in the setting area 52*d* ("cross-process") in the ring image at the same time. In this case, the control unit 14 recognizes the holding operation as a continuous shooting instruction and executes a continuous shooting operation so as to obtain captured images in a quantity matching the number of positions held by the user. In this example, the holding operation has been performed at two positions, and accordingly, the control unit 14 executes a continuous shooting operation by engaging the image sensor 12 in execution of two successive sessions of still image-capturing processing to obtain two captured images.

The image processing setting unit 14*b* sets the effect level for "portrait" in correspondence to the position held in the setting area 52*a* and sets the effect level for "cross-process" in correspondence to the position held in the setting area 52*d*. The image processing unit 14*c* executes the image processing "portrait" on one of the two captured images obtained through the continuous shooting operation at the effect level having been set by the image processing setting unit 14*b*. The image processing unit 14*c* also executes the image processing "cross-process" on the other captured image obtained through the continuous shooting operation at the effect level having been set by the image processing setting unit 14*b*. The control unit 14 then records the two captured images having undergone the image processing executed by the image processing unit 14*c* into the recording medium 18.

(Variation 5)

The customize processing unit 14d in the fourth embodiment and the fifth embodiment described above may automatically rearrange the positions of the setting areas 52 when adding a new setting area 52 into the ring image 50. In such a case, the customize processing unit 14d may rearrange the setting areas so as to set setting areas 52 used to set types of image processing achieving a high level of affinity to each other, e.g., types of image processing with similar image effects, next to each other.

(Variation 6)

Figure 50:
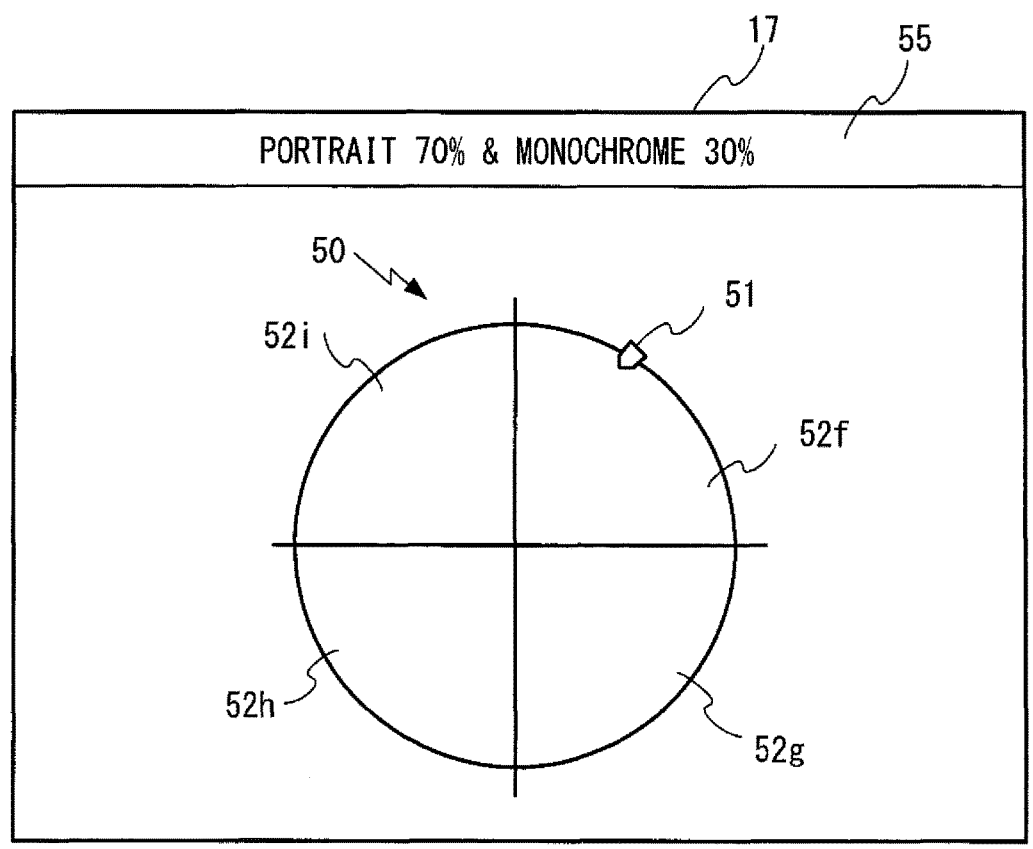
FIG. 50 A display screen brought up in variation 6

In the fourth embodiment and the fifth embodiment described above, text indicating the name of the image processing that can be selected in the various setting areas 52 is displayed in the setting areas 52 in the ring image 50. However, the ring image 50 may assume a display mode other than this. For instance, the ring image 50 may only include a ring, lines indicating the boundaries between the individual setting areas 52f through 52i and a cursor 51 without text indicating the names of the different types of image processing, as shown in FIG. 50. The ring image 50 is superimposed over the live view image, and for this reason, the user is likely to be able to view the live view image more clearly if the ring image 50 does not include the names of the image processing and the like. Details of the image processing and the image processing parameter set in correspondence to the position of the cursor 51 may be displayed in a details display area 55 set on the upper side of the display screen at the display unit 17 by the display control unit 14a. In the example presented in FIG. 50, "portrait 70% & monochrome 30%", indicating the two types of image processing set in the setting area and the ratios for the two types of image processing, is displayed in the details display area 55. It is to be noted that instead of providing the information with text, the contents of the image processing may be indicated with marks or the like.

(Variation 7)

Figure 51:
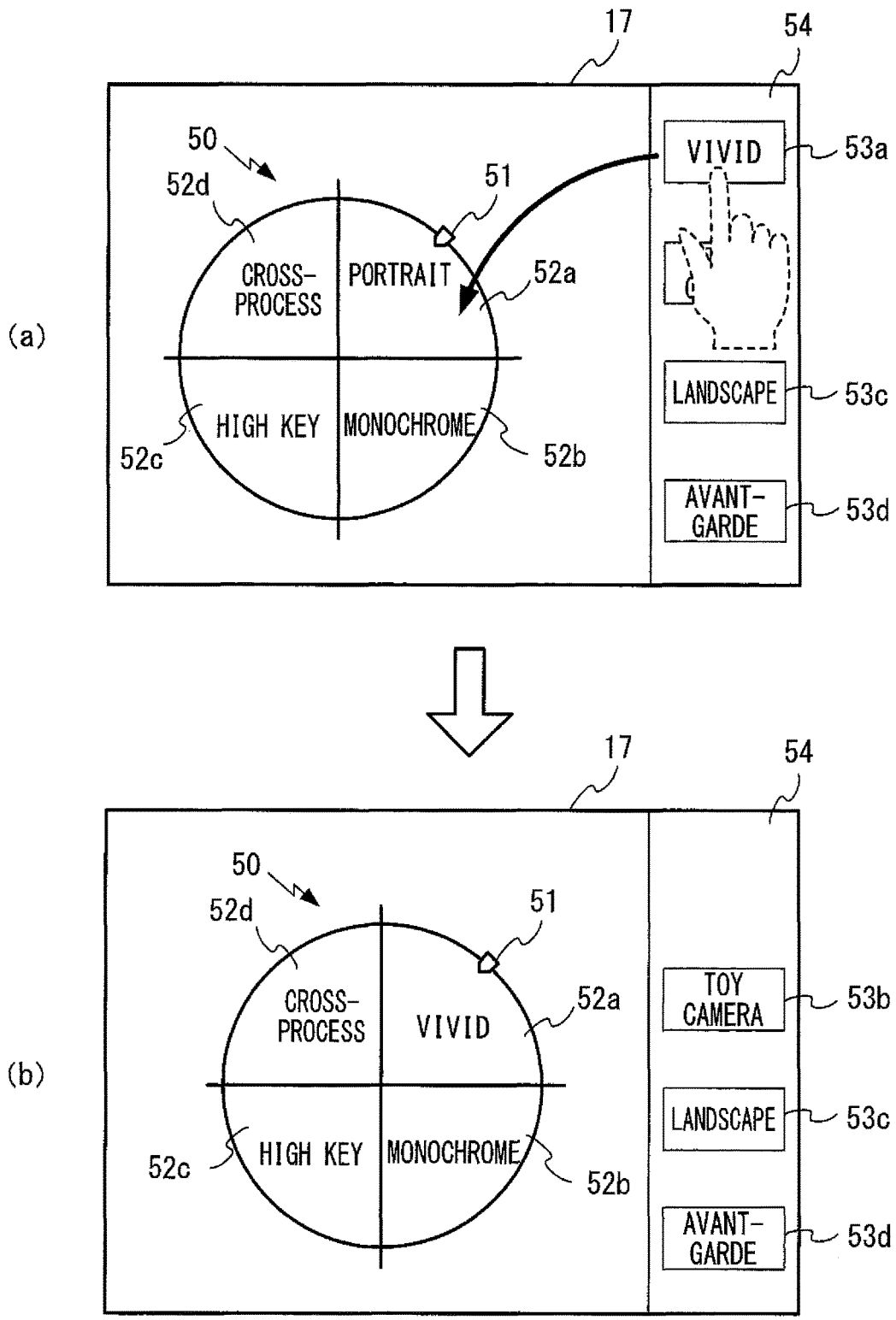
FIG. 51 Illustrations showing how a setting area is altered in variation 7

While the number of setting areas 52 in the ring image 50 can be increased/decreased in the customize mode in the fourth embodiment and the fifth embodiment described above, the present invention is not limited to this example and it may be adopted in conjunction with a ring image 50 that includes a fixed number of setting areas 52. For instance, four setting areas 52a through 52d may be set in the ring image 50 as shown in FIG. 51(a). The user may perform a drag-and-drop operation in this state to move the image processing icon 53a ("vivid") into the setting area 52a ("portrait") in this state. In response, the customize processing unit 14d switches the image processing that can be set in the setting area 52a from "portrait" to "vivid" as shown in FIG. 51(b). In other words, in response to a drag-and-drop operation performed to move an image processing icon 53 into a setting area 52, the customize processing unit 14d may switch the image processing that can be set in the particular setting area 52.

(Variation 8)

In the fourth embodiment and the fifth embodiment described above, the ring image 50, having the predetermined setting areas 52 set therein as the default setting, is customized. However, customization of the ring image 50 may be started in a state in which no setting area 52 is set therein.

(Variation 9)

While the number of steps over which the image processing parameter can be adjusted in each setting area 52 increases/decreases as the size of the setting area 52 changes in the fourth embodiment and the fifth embodiment described above, the number of adjustment steps may be fixed or the number of adjustment steps may be automatically switched to an optimal value.

(Variation 10)

While a specific type of image processing is set in correspondence to a setting area 52 in the ring image 50 in the embodiments described above, image processing may be set in correspondence to a setting point set within the ring image 50 instead. FIG. 52(a) shows an example of a ring image 50 achieved in variation 9. As the default setting, four setting points 56a through 56d are set in correspondence to specific types of image processing on the ring in the ring image 50. The setting point 56a through the setting point 56d are set at quarter mark positions, at which the ring in the ring image 50 is divided into four equal portions. In more specific terms, the setting point 56a is set at the top point of the ring image 50. The setting point 56b is set at a position set apart from the setting point 56a by 90° along the clockwise direction. The setting point 56c is set at a position set apart from the setting point 56a by 180°. The setting point 56d is set at a position set apart from the setting point 56a by 90° along the counterclockwise direction. In addition, "portrait" is set in correspondence to the setting point 56a. "monochrome" is set in correspondence to the setting point 56b. "high key" is set in correspondence to the setting point 56c. "cross-process" is set in correspondence to the setting point 56d. Near the setting points 56a through 56d, text indicating the names of the specific types of image processing set in correspondence to those setting points is displayed. In addition, line segments passing through the setting points 56a through 56d are displayed so as to indicate the positions of the setting points 56a through 56d clearly.

When the cursor 51 is set at the setting point 56a, the image processing setting unit 14b selects "portrait 100% ("a setting at which the image processing "portrait" alone is executed") for the image processing to be executed on the captured image. When the cursor 51 is set at the setting point 56b, the image processing setting unit 14b selects "monochrome 100%" for the image processing to be executed on the captured image. In addition, when the cursor 51 is set between the setting point 56a and the second point 56b, the image processing setting unit 14b selects a setting for executing both the image processing "portrait" and the image processing "monochrome" on the captured image. In this situation, the image processing setting unit 14b sets the ratios for "portrait" and "monochrome" in correspondence to the position of the cursor 51. The image processing setting unit 14b raises the ratio for "portrait" and lowers the ratio for monochrome" when the position of the cursor 51 is closer to the setting point 56a. If, on the other hand, the position of the cursor 51 is closer to the setting point 56b, the image processing setting unit 14b raises the ratio for "monochrome" and lowers the ratio for "portrait".

Likewise, when the cursor 51 is set at the setting point 56c, the image processing setting unit 14b selects "high key 100% for the image processing to be executed on the captured image. When the cursor 51 is set at the setting point 56d, the image processing setting unit 14b selects "cross-process 100% for the image processing to be executed on the captured image. When the cursor 51 is set between the setting point 56b and the second point 56c, between the setting point 56c and the setting point 56d, or between the setting point 56d and the setting point 56a, the setting for image processing is selected in much the same way as the image processing is selected when the cursor is set between the setting point 56a and the setting point 56b, as described above.

Figure 52:
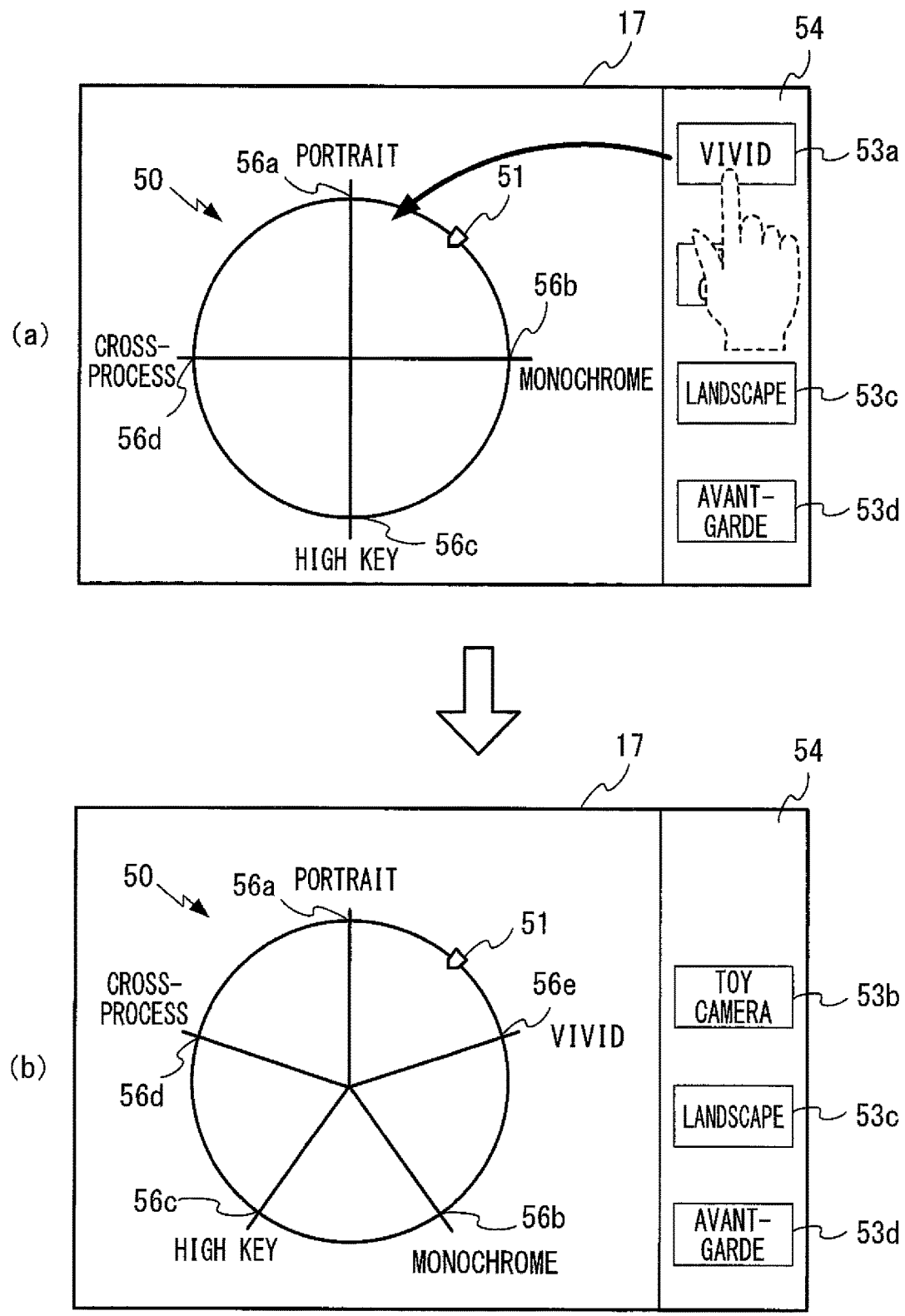
FIG. 52 Illustrations of the ring image displayed in variation 10

The ring image 50 can also be customized in variation 9. The user wishing to add a new setting point 56 in the ring image 50 performs a drag-and-drop operation to move the image processing icon 53 corresponding to desired image processing, among the image processing icons 53 displayed in the list display area 54, into the ring image 50. The user may perform a drag-and-drop operation to move, for instance, the image processing icon 53*a* ("vivid") to a position between the setting point 56*a* and the setting point 56*b* in the ring image 50. Upon detecting the operation via the touch panel 16*b*, the customize processing unit 14*d* adds a setting point 56*e* in correspondence to the image processing "vivid" represented by the image processing icon 53*a*, as shown in FIG. 52(*b*). At this time, the setting point 56*a* through the setting point 56*e* are set at positions at which the ring image 50 is divided into five equal portions. In addition, the setting point 56*e* is added at a position corresponding to the point at which the image processing icon 53*a* has been dropped (between the setting point 56*a* and the setting point 56*b* in the example presented in FIG. 52(*b*)).

When the cursor 51 is set at the setting point 56*e* in the ring image 50 in this state, a "vivid 100%" setting is selected for the image processing to be executed on the captured image. In addition, when the cursor 51 is set between the setting point 56*a* and the setting point 56*e*, both "portrait" and "vivid" are set. When the cursor 51 is set between the setting point 56*e* and the setting point 56*b*, both "vivid" and "monochrome" are set.

Furthermore, the user, wishing to remove a setting point 56 from the ring image 50 performs a drag-and-drop operation to move the text indicating the name of the image processing displayed near the setting point 56 to be removed, into the list display area 54. Upon detecting the operation via the touch panel 16*b*, the customize processing unit 14*d* removes the setting point 56 on which the operation was performed from the ring image 50.

(Variation 11)

In the embodiment described above, the position of the cursor 51 (selected position) on the ring is adjusted by moving the display position of the cursor 51. However, the selected position may instead be adjusted by rotating the ring image 50 without moving the cursor 51, so as to alter the positional relationship between a given point on the ring image 50 and the cursor 51.

(Variation 12)

In the embodiment described above, the circular ring image 50 is displayed as a setting image that is used to set image processing to be executed on the captured image. However, a setting image assuming a bar shape, instead of a circular shape, may be used.

(Variation 13)

In the embodiment described above, the processing described in reference to FIG. 36 is executed as the control unit 14 executes a program recorded in a memory (not shown). This program may be provided in advance at the time of product shipment or it may be provided in a recording medium such as a memory card or on a data signal via the Internet after product shipment. The program may be provided to the digital camera 1D in manners similar to those described in reference to FIG. 13 except that the digital camera taking in the program in this situation is the digital camera 1D instead of the digital camera 1 in FIG. 13.

(Variation 14)

While the present invention is adopted in a digital camera in the fourth embodiment and the fifth embodiment described above, the present invention is not limited to this example and it may be adopted in a portable telephone, a tablet terminal or the like.

While the present invention is adopted in the still image shooting mode or the video-shooting mode in the first embodiment through the fifth embodiment described above, the present invention is not limited to this example and it may be adopted in a reproduce mode in which captured image data recorded in the recording medium 18 are reproduced and the reproduced image is displayed at the display unit. As the still image shooting mode is switched to the creative mode with a reproduced image on display at the display unit, the control unit 14 displays the ring image 50 by superimposing it over the reproduced image. Upon deciding that the rotary multi-selector 16*c* has been rotated, the control unit 14 executes the image processing corresponding to the position taken by the cursor 52 in the ring image 50 on the reproduced image. Upon detecting a depression at an operation member such as the OK button, the control unit determines that the image processing for the reproduced image has been confirmed and records the reproduced image having undergone the image processing into the recording medium 18. The control unit 14 may record the image having undergone the image processing alone into the recording medium 18 by deleting the initial reproduced image, i.e., the reproduced image that has not undergone the image processing, or it may record both the reproduced image that has not undergone the image processing and the initial reproduced image that has undergone the image processing into the recording medium.

While various embodiments and variations thereof have been described, the present invention is in no way limited to the particulars of these examples. Any other modes conceivable within the scope of the technical teachings of the present invention are also within the scope of the present invention.

The disclosures of the following priority applications are herein incorporated by reference:

Japanese Patent Application No. 2013-179597 filed Aug. 30, 2013

Japanese Patent Application No. 2013-246539 filed Nov. 28, 2013

Japanese Patent Application No. 2013-246540 filed Nov. 28, 2013

Japanese Patent Application No. 2013-246541 filed Nov. 28, 2013

REFERENCE SIGNS LIST

1, 1B, 1C, 1D . . . digital camera
11 . . . image-capturing optical system
12 . . . image sensor
14 . . . control unit
14*a* . . . display control unit
14*b* . . . position selection unit, selection unit, image processing setting unit
14*c* . . . image processing selection unit, image processing unit, parameter adjustment unit
14*d* . . . image processing unit, parameter adjustment unit, customize processing unit
14*e* scene categorizing unit, processing execution unit, operation detection unit
16 . . . operation member
16*b* . . . touch panel
17 . . . display unit
18 . . . recording medium

The invention claimed is:

1. An image processing device comprising a controller that includes at least a processor and memory, the controller configured to:
   alter an image by executing first image processing and second image processing on the image;
   bring up, on display at a display unit, a selection image that allows a selection to be made in response to an operation with regard to image processing to be executed on the image by the controller; and
   detect that a position is selected among a first position, a second position set apart from the first position and a position between the first position and the second position on the selection image displayed at the display unit, wherein:
   the controller executes the first processing on the image as the first position is selected, executes the second image processing on the image as the second position is selected and executes the first image processing and the second image processing on the image as the position between the first position and the second position is selected, and
   the controller raises an extent to which the image is altered through the second image processing while an extent to which the image is altered through the first image processing is lowered.

2. The image processing device according to claim 1, wherein:
   for executing the first image processing and the second image processing on the image, the controller raises the extent to which the image is altered through the first image processing and lowers the extent to which the image is altered through the second image processing if the position detected by the controller is closer to the first position, and raises the extent to which the image is altered through the second image processing and lowers the extent to which the image is altered through the first image processing if the position detected by the controller is closer to the second position.

3. The image processing device according to claim 2, wherein the controller is further configured to:
   categorize a photographic scene in the image; and
   select at least the first image processing and the second image processing among a predetermined plurality of types of image processing corresponding to the photographic scene categorized by the controller.

4. The image processing device according to claim 1, wherein:
   the controller further detects that a third position is selected, which is different from the first position, the second position and the position between the first position and the second position, on the selection image; and
   the controller does not execute the second image processing on the image as the third position is selected on the selection image.

5. The image processing device according to claim 4, wherein:
   the controller further detects that a position between the first position and the third position on the selection image is selected; and
   the controller executes third image processing on the image as the third position is selected and executes the first image processing and the third image processing on the image as the position between the first position and the third position is selected.

6. The image processing device according to claim 4, wherein:
   the controller does not execute the first image processing on the image as the third position is selected on the selection image.

7. The image processing device according to claim 6, wherein:
   the controller further detects that a fourth position on the selection image is selected; and
   the controller executes the first image processing on the image as the fourth position is selected on the selection image.

8. The image processing device according to claim 4, wherein:
   positions are set on the selection image in an order of: the third position, the first position and the second position.

9. The image processing device according to claim 7, wherein:
   positions are set on the selection image in an order of: the fourth position, the third position, the first position and the second position.

10. The image processing device according to claim 1, wherein:
    a ring having the first position and the second position set thereupon and a mark indicating a position currently detected by the controller on the ring are displayed as the selection image; and
    the controller detects that a position is selected, among the first position, the second position and the position between the first position and the second position, on the ring in the selection image.

11. The image processing device according to claim 1, wherein the controller is further configured to:
    adjust a parameter for processing to be executed on the image, which is different from the first image processing and the second image processing, in response to an operation performed on an adjustment image brought up on display for adjusting the parameter; and
    execute the processing by using the parameter adjusted by the controller, wherein:
    the controller differentiates the processing executed as the controller detects that the first position or the second position is selected from the processing executed as the controller detects that the position between the first position and the second position is selected.

12. The image processing device according to claim 11, wherein:
    as the controller detects that the first position or the second position is selected, the processing is executed by the controller so as to switch the image processing set as the first image processing or the second image processing.

13. The image processing device according to claim 11, wherein:
    as the controller detects that the position between the first position and the second position is selected, the processing is executed by the controller so as to alter a manner with which, ratios representing the extent to which the image is altered through the first image processing and the extent to which the image is altered through the second image processing, change.

14. The image processing device according to claim 11, wherein:
    as the controller detects that the position between the first position and the second position is selected, the processing is executed by the controller so as to fine-adjust ratios representing the extent to which the image is altered through the first image processing executed by the controller and the extent to which the image is altered through the second image processing executed by the controller.

15. The image processing device according to claim 11, wherein:
   as the controller detects that the position between the first position and the second position is selected, the processing is executed by the controller so as to adjust levels of strength of the first image processing and the second image processing executed by the controller.

16. The image processing device according to claim 11, wherein:
   the controller further detects that a third position, which is not located between the first position and the second position and is set next to the first position, on the selection image is selected;
   as the controller detects that the third position is selected, the controller does not execute either the first image processing or the second image processing on the image; and
   the controller differentiates the processing executed as the controller detects that the third position is selected, the processing executed as the controller detects that the first position or the second position is selected and the processing executed as the controller detects that the position between the first position and the second position is selected from one another.

17. The image processing device according to claim 16, wherein:
   as the controller detects that the third position is selected, the controller changes a photographic setting for the image.

* * * * *